United States Patent
Matsuda et al.

(10) Patent No.: US 11,929,954 B2
(45) Date of Patent: Mar. 12, 2024

(54) COMMUNICATION APPARATUS AND COMMUNICATION METHOD

(71) Applicant: SONY GROUP CORPORATION, Tokyo (JP)

(72) Inventors: Hiroki Matsuda, Tokyo (JP); Kazuyuki Shimezawa, Kanagawa (JP); Naoki Kusashima, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 17/549,480

(22) Filed: Dec. 13, 2021

(65) Prior Publication Data

US 2022/0103329 A1 Mar. 31, 2022

Related U.S. Application Data

(63) Continuation of application No. 16/620,076, filed as application No. PCT/JP2018/020090 on May 25, 2018, now Pat. No. 11,212,055.

(30) Foreign Application Priority Data

Jun. 15, 2017 (JP) ................. 2017-117564

(51) Int. Cl.
 *H04W 72/04* (2023.01)
 *H04L 5/00* (2006.01)
 (Continued)

(52) U.S. Cl.
 CPC .......... *H04L 5/0053* (2013.01); *H04L 5/0028* (2013.01); *H04L 5/0092* (2013.01); *H04L 27/26* (2013.01); *H04W 72/23* (2023.01)

(58) Field of Classification Search
 CPC ... H04L 5/0053; H04L 5/0028; H04L 5/0092; H04L 27/26; H04W 72/23
 See application file for complete search history.

(56) References Cited

U.S. PATENT DOCUMENTS

2009/0175161 A1* 7/2009 Yi ................. H04B 7/0623
 370/328
2010/0074191 A1* 3/2010 Lee ................ H04B 7/0604
 370/329
(Continued)

FOREIGN PATENT DOCUMENTS

CN 107258067 A 10/2017
EP 3041299 A1 7/2016
(Continued)

OTHER PUBLICATIONS

3GPP TSP RAN meeting #82, RP-182630 Title: NoMA Link and System Level Performance (Year: 2018).*

(Continued)

*Primary Examiner* — Diane L Lo
*Assistant Examiner* — Abusayeed M Haque
(74) *Attorney, Agent, or Firm* — CHIP LAW GROUP

(57) ABSTRACT

There is provided a communication system in which a base station apparatus communicates with a terminal apparatus and a communication apparatus flexibly designed to address diverse use cases so as to significantly enhance the transmission efficiency of the system as a whole. The communication apparatus includes an acquisition section that acquires information from an apparatus in wireless communication, and a control section that selects either orthogonal multiple access communication or non-orthogonal multiple access communication for communication with the apparatus on the basis of the information acquired by the acquisition section.

16 Claims, 29 Drawing Sheets

(51) Int. Cl.
*H04L 27/26* (2006.01)
*H04W 72/23* (2023.01)

(56) References Cited

U.S. PATENT DOCUMENTS

| | | | |
|---|---|---|---|
| 2015/0312074 | A1 | 10/2015 | Zhu et al. |
| 2015/0351081 | A1* | 12/2015 | Zhu ................. H04J 11/003 370/329 |
| 2016/0219529 | A1 | 7/2016 | Benjebbour et al. |
| 2016/0360542 | A1* | 12/2016 | Elsherif ............ H04B 7/0452 |
| 2016/0381664 | A1* | 12/2016 | Ghosh ............... H04L 69/22 370/329 |
| 2017/0126274 | A1* | 5/2017 | Kang ............... H04W 74/006 |
| 2017/0273056 | A1 | 9/2017 | Papasakellariou |
| 2018/0027544 | A1 | 1/2018 | Kimura |
| 2018/0124684 | A1 | 5/2018 | Kwon et al. |
| 2018/0152257 | A1 | 5/2018 | Seo |
| 2018/0160372 | A1 | 6/2018 | Benjebbour et al. |
| 2018/0227805 | A1* | 8/2018 | Jang ................ H04W 72/1215 |
| 2018/0234839 | A1* | 8/2018 | Tenny .............. H04W 36/0033 |
| 2019/0029031 | A1 | 1/2019 | Kumar et al. |
| 2019/0045489 | A1 | 2/2019 | He et al. |
| 2019/0124601 | A1 | 4/2019 | Sano et al. |
| 2019/0182824 | A1 | 6/2019 | Chatterjee |
| 2019/0357266 | A1* | 11/2019 | Ren .................. H04W 80/02 |
| 2020/0029283 | A1 | 1/2020 | Lei et al. |
| 2021/0100002 | A1 | 4/2021 | Pan et al. |

FOREIGN PATENT DOCUMENTS

| | | |
|---|---|---|
| EP | 3138227 A1 | 3/2017 |
| EP | 3275280 A1 | 3/2017 |
| EP | 3280080 A1 | 2/2018 |
| JP | 2015-050575 A | 3/2015 |
| JP | 2017-515361 A | 6/2017 |
| JP | 6441377 B2 | 12/2018 |
| JP | 6606735 B2 | 11/2019 |
| KR | 10-2016-0124223 A | 10/2016 |
| WO | 2015/029729 A1 | 3/2015 |
| WO | 2015/167714 A1 | 11/2015 |
| WO | WO-2016013458 A1 * | 1/2016 ............ H04L 1/0038 |
| WO | 2016/153555 A1 | 9/2016 |
| WO | WO-2016136779 A1 * | 9/2016 ............ H04J 1/004 |
| WO | 2016/157918 A1 | 10/2016 |
| WO | WO-2017020777 A1 * | 2/2017 ............ H04L 25/02 |
| WO | WO-2017077971 A1 * | 5/2017 ............ H04W 28/06 |

OTHER PUBLICATIONS

3GPP TSG RAN meeting #82, RP-182630 Title: NoMA Link and System Level Performance (Year: 2018).*
3GPP TSG RAN meeting #65, RP-141165 (Year: 2014).*
3GPP TSG RAN WG1 Meeting#95, R1-1814043 Title: NoMA receiver structure and complexity analysis (Year: 2018).*
Office Action for JP Patent Application No. 2017-117564 dated Aug. 24, 2021, 05 pages of Office Action and 04 pages of English Translation.
NTT DOCOMO., "Evaluation methodologies for downlink multiuser superposition transmissions", 3GPP TSG RAN VVG1, Meeting 81, R1-153332, Fukuoka, Japan, May 25-29, 2015, 8 pages.
Shinagawa, et al., "1 Examination of Optimum Control Technology Which Went Up with 8-5-148 NOMA and United Multiuser MIMO Transmission", Institute of Electronics, Information and Communication Engineers 2016 Synthesis Convention Lecture Collected—Papers Communication Mar. 1, 2016, p. 541.
SAMSUNG., "Discussion on non-orthogonal multiple access", 3GPP TSG RAN WG1, Meeting 88b, R.1-1706119, Spokane, Washington, USA, Apr. 3-7, 2017, 5 pages.
Sony, "Discussion on Non-contention and Contention based transmission without Grant", 3GPP TSG RAN WG1 NR, Meeting 88, R1-1703137, Athens, Greece, Feb. 13-17, 2017, 3 pages.
Extended European Search Report for EP Application No. 18817829. 7, dated Apr. 17, 2020, 08 pages.
Saito, et al, "Non-Orthogonal Multiple Access (NOMA) for Future Radio Access", IEEE VTC, Germany, Jun. 2013, 05 pages.
International Search Report and Written Opinion of PCT Application No. PCT/JP2018/020090, dated Aug. 14, 2018, 08 pages of English Translation and 07 pages of ISRWO.
Notice of Allowance for U.S. Appl. No. 16/620,076 dated Nov. 17, 2021, 2 pages.
Notice of Allowance for U.S. Appl. No. 16/620,076 dated Aug. 4, 2021, 8 pages.
Non-Final Office Action for U.S. Appl. No. 16/620,076, dated Apr. 14, 2021, 17 pages.
International Preliminary Report on Patentability of PCT Application No. PCT/JP2018/020090, dated Dec. 26, 2019, 04 pages of English Translation and 08 pages of IPRP.

* cited by examiner

F I G. 3

| | SUBCARRIER INTERVAL | MAXIMUM BANDWIDTH OF COMPONENT CARRIER | CP LENGTH TYPE | NO. OF SYMBOLS PER SUBFRAME | SUBFRAME LENGTH | RADIO FRAME LENGTH | NO. OF SUBCARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

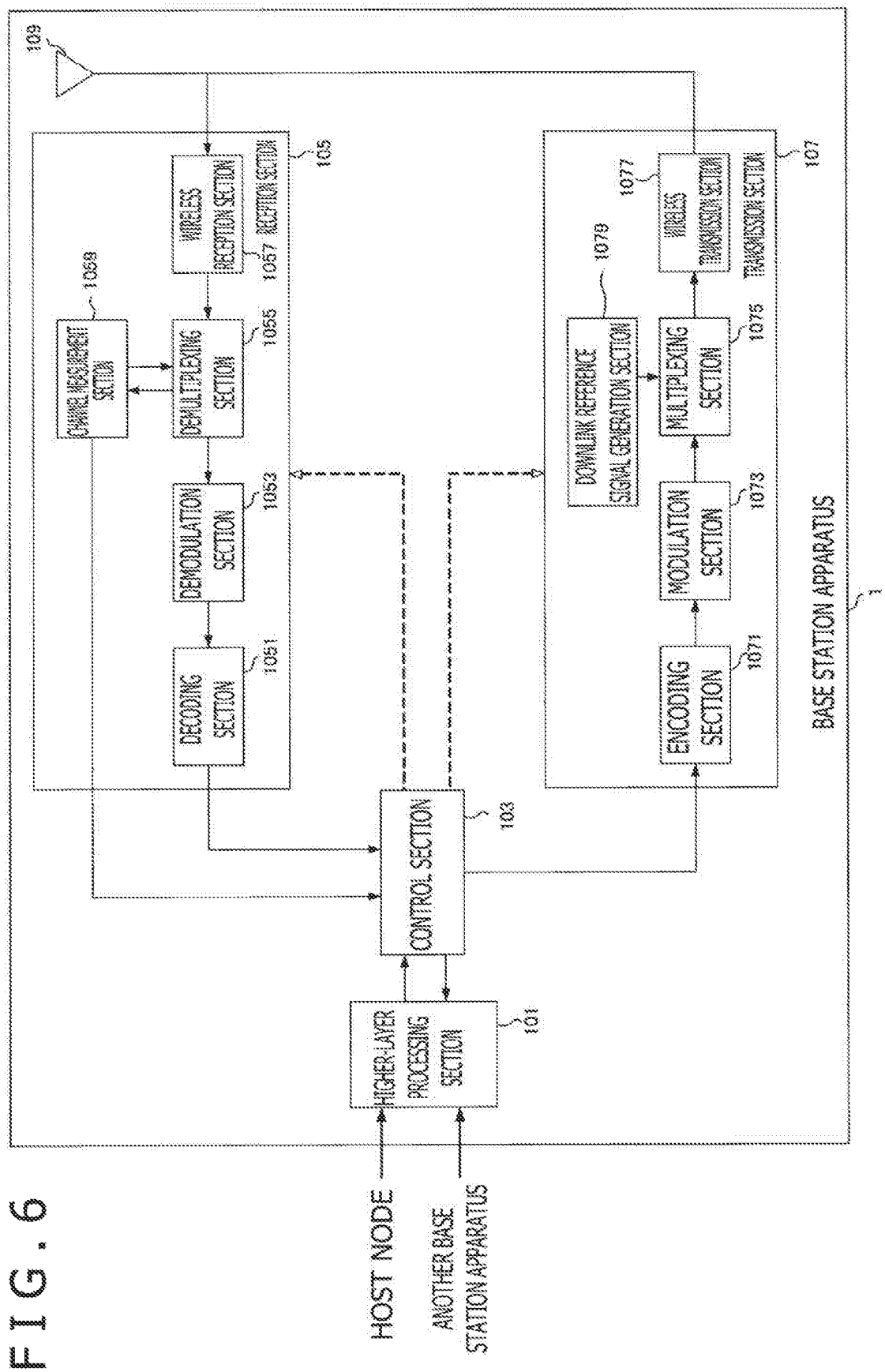
F I G. 6

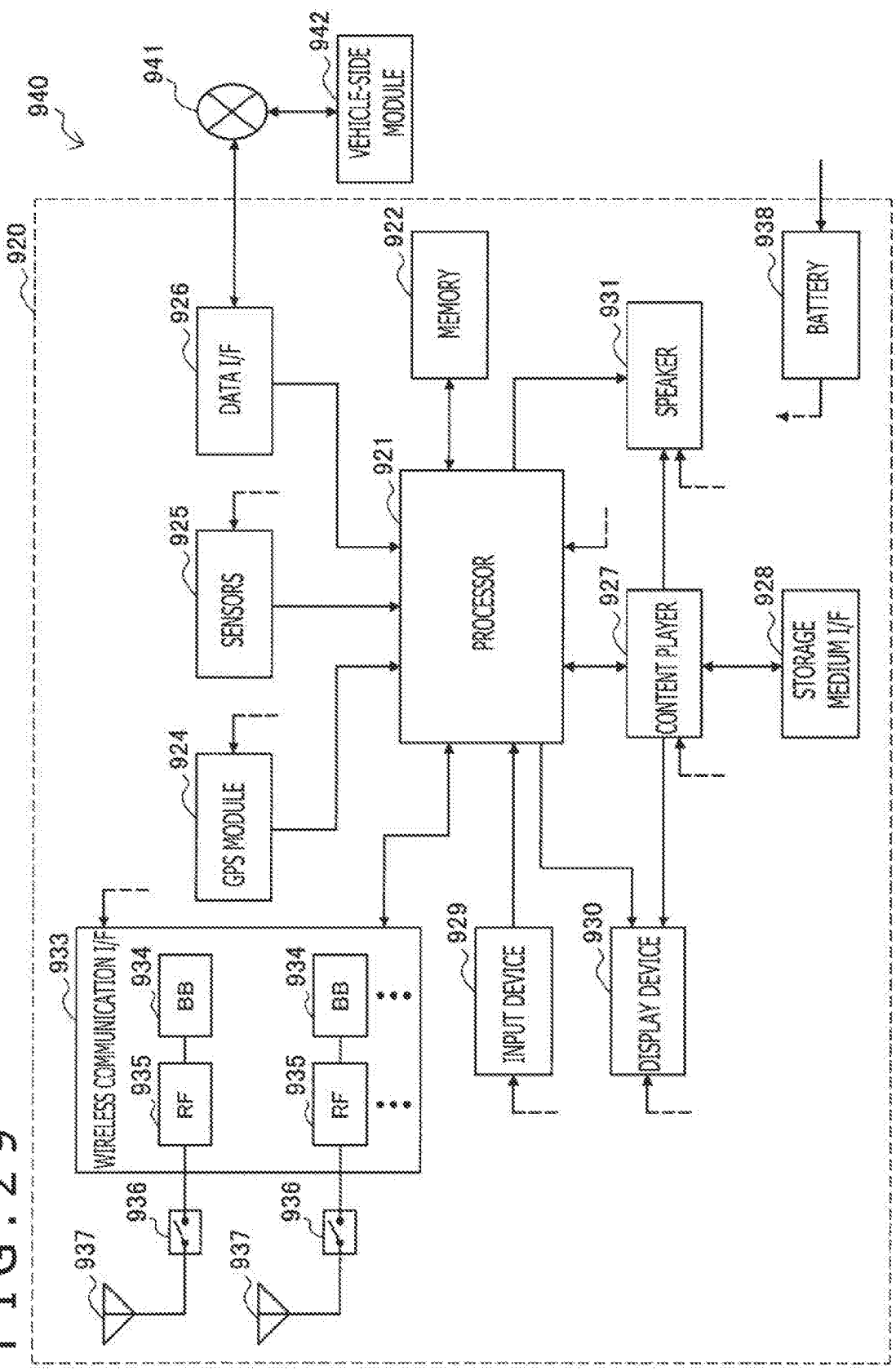

COMMUNICATION APPARATUS AND COMMUNICATION METHOD

CROSS REFERENCE TO RELATED APPLICATIONS

The present application is a continuation application of U.S. patent application Ser. No. 16/620,076, filed on Dec. 6, 2019, which is a U.S. National Phase of International Patent Application No. PCT/JP2018/020090 filed on May 25, 2018, which claims priority benefit of Japanese Patent Application No. JP 2017-117564 filed in the Japan Patent Office on Jun. 15, 2017. Each of the above-referenced applications is hereby incorporated herein by reference in its entirety.

TECHNICAL FIELD

The present disclosure relates to a communication apparatus and a communication method.

BACKGROUND ART

Wireless access systems and wireless networks for cellular mobile communication (referred to as "Long Term Evolution (LTE)," "LTE-Advanced (LTE-A)," "LTE-Advanced Pro (LTE-A Pro)," "New Radio (NR)," "New Radio Access Technology (NRAT)," "Evolved Universal Terrestrial Radio Access (EUTRA)," or "Further EUTRA (FEUTRA)" hereunder) are under study by the 3rd Generation Partnership Project (3GPP). In the ensuing description, LTE will include LTE-A, LTE-A Pro, and EUTRA and that NR will include NRAT and FEUTRA. In LTE and NR, the base station apparatus (base station) is also referred to as an eNode B (evolved NodeB), and the terminal apparatus (mobile station, mobile station apparatus, or terminal) is also referred to as UE (User Equipment). LTE and NR provide a cellular communication system in which multiple areas each covered by a base station apparatus are arranged in a cellular pattern. A single base station apparatus may manage multiple cells.

NR provides RAT (Radio Access Technology) that serves as a next-generation wireless access system different from and improving on LTE. NR offers access technology that supports diverse use cases including eMBB (Enhanced mobile broadband), mMTC (Massive machine type communications), and URLLC (Ultra reliable and low latency communications). NR is under study aiming at a technical framework supporting the use scenarios, requirements, and deployment scenarios of these use cases. NR is called on to provide further frequency usage efficiency in view of such sought-after capabilities as supporting a maximum data rate approximately 20 times that of LTE and supporting simultaneous communication with approximately 10 times as many terminals as LTE. One technique for boosting frequency usage efficiency is non-orthogonal multiple access (NOMA) currently attracting attention. Technical details of NOMA are disclosed in NPL 1.

CITATION LIST

Non Patent Literature

[NPL 1]
Yuya Saito, Yoshihisa Kishiyama, Anass Benjebbour, Takehiro Nakamura, Anxin Li, and Kenichi Higuchi, "Non-Orthogonal Multiple Access (NOMA) for Future Radio Access," Vehicular Technology Conference (VTC Spring), 2013 IEEE 77th, pp. 1-5, June 2013.

SUMMARY

Technical Problem

NR is required to provide communication with higher frequency usage efficiency than LTE in order to address diverse use cases.

The present disclosure has been devised in view of the above problem. An object of the disclosure is therefore to provide a communication apparatus, a communication method, and a computer program for use in a communication system allowing base station apparatuses to communicate with terminal apparatuses, the communication apparatus, communication method, and computer program being flexibly designed and newly improved to address diverse use cases so as to significantly enhance the transmission efficiency of the system as a whole.

Solution to Problem

According to the present disclosure, there is provided a communication apparatus including: an acquisition section configured to acquire information from an apparatus in wireless communication; and a control section configured to select either orthogonal multiple access communication or non-orthogonal multiple access communication for communication with the apparatus on the basis of the information acquired by the acquisition section.

Also according to the present disclosure, there is provided a communication method including: causing a processor to acquire information from an apparatus in wireless communication; and causing the processor to select either orthogonal multiple access communication or non-orthogonal multiple access communication for communication with the apparatus on the basis of the acquired information.

Also according to the present disclosure, there is provided a computer program for causing a computer to perform: acquisition of information from an apparatus in wireless communication; and selection of either orthogonal multiple access communication or non-orthogonal multiple access communication for communication with the apparatus on the basis of the acquired information.

Advantageous Effect of Invention

According to the present disclosure outlined above, there are provided a communication apparatus, a communication method, and a computer program for use in a communication system allowing base station apparatuses to communicate with terminal apparatuses, the communication apparatus, communication method, and computer program being flexibly designed and newly improved to address diverse use cases so as to significantly enhance the transmission efficiency of the entire system.

The advantageous effects outlined above are not limitative of the present disclosure. There may be other advantageous effects found in, or not covered by but derived from, this description.

BRIEF DESCRIPTION OF DRAWINGS

FIG. 3 is a tabular diagram depicting examples of parameter sets regarding transmission signals in NR cells.

FIG. 6 is a schematic block diagram depicting a configuration of a base station apparatus 1 in the embodiment.

FIG. 29 is a block diagram depicting an example of a schematic configuration of a car navigation system 920 to which the technology of the present disclosure may be applied.

DESCRIPTION OF EMBODIMENT

Figure 1:
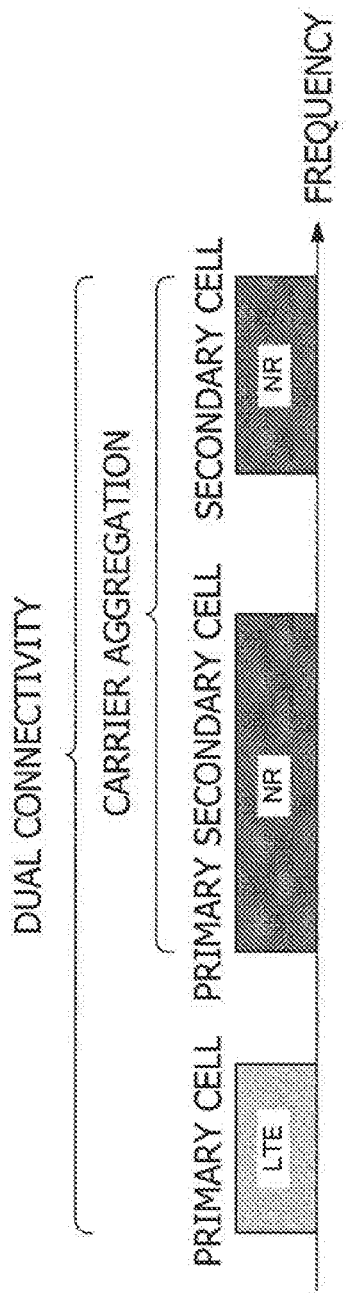
FIG. 1 is a schematic diagram depicting an example of component carrier settings in an embodiment of the present disclosure.

A preferred embodiment of the present disclosure is described below with reference to the accompanying drawings. Throughout the description and the drawings, like reference characters designate like or corresponding components having like functions, and the explanations of such components will be omitted where redundant.

The description will be given under the following headings:
1. Embodiment of the present disclosure
2. Application examples
3. Conclusion Unless otherwise noted, the techniques, functions, methods, configurations, procedures, and all other things described hereunder apply to both LTE and NR.

1. EMBODIMENT OF THE PRESENT DISCLOSURE

Wireless Communication System of the Present Embodiment

In the present embodiment, a wireless communication system includes at least a base station apparatus 1 and a terminal apparatus 2. The base station apparatus 1 may accommodate multiple terminal apparatuses. The base station apparatus 1 may connect with another base station apparatus through X2 interface means. The base station apparatus 1 may also connect with an EPC (Evolved Packet Core) through S1 interface means. Furthermore, the base station apparatus 1 may connect with an MME (Mobility Management Entity) through S1-MME interface means and connect with an S-GW (Serving Gateway) through S1-U interface means. The S1 interface supports many-to-many connection between the MMEs and/or the S-GWs on the one hand and the base station apparatuses 1 on the other hand. In the present embodiment, the base station apparatus 1 and the terminal apparatus 2 support LTE and/or NR.

Wireless Access Technology of the Present Embodiment

In the present embodiment, the base station apparatus 1 and the terminal apparatus 2 each support at least one radio access technology (RAT). For example, RAT includes LTE and NR. One RAT corresponds to one cell (component carrier). That is, in a case where multiple RATs are supported, each of the RATs corresponds to a different cell. In the present embodiment, a cell is a combination of downlink resources, uplink resources, and/or a sidelink. In the description that follows, a cell corresponding to LTE will be referred to as an LTE cell, and a cell corresponding to NR will be referred to as an NR cell.

Downlink communication occurs from the base station apparatus 1 to the terminal apparatus 2. Uplink communication occurs from the terminal apparatus 2 to the base station apparatus 1. Sidelink communication occurs from the terminal apparatus 2 to another terminal apparatus 2.

Sidelink communication is defined for direct proximity detection and direct proximity communication between terminal apparatuses. Sidelink communication may utilize frame configurations similar to those of uplink and downlink. Further, sidelink communication may be limited to part of the uplink resources and/or downlink resources (subsets).

The base station apparatus 1 and the terminal apparatus 2 support downlink, uplink, and/or sidelink communication using an aggregate of one or more cells. The aggregate of multiple cells is also referred to as carrier aggregation or dual connectivity. Carrier aggregation and dual connectivity will be discussed later in detail. Each of the cells uses a predetermined frequency bandwidth. Maximum and minimum values as well as configurable values of a given frequency bandwidth may be stipulated beforehand.

FIG. 1 depicts an example of component carrier settings in the present embodiment. In the example of FIG. 1, one LTE cell and two NR cells are set. The single LTE cell is set as a primary cell. The two NR cells are set as a primary secondary cell and a secondary cell. The two NR cells are integrated by carrier aggregation. The LTE cell and the NR cells are integrated by dual connectivity. Alternatively, the LTE cell and the NR cells may be integrated by carrier aggregation. In the example of FIG. 1, the NR cells may be assisted in connection by the LTE cell as the primary cell, so that the NR cells need not support some functions such as those for performing communication in stand-alone mode. The functions for the communication in stand-alone mode include those necessary for establishing initial connection.

Figure 2:
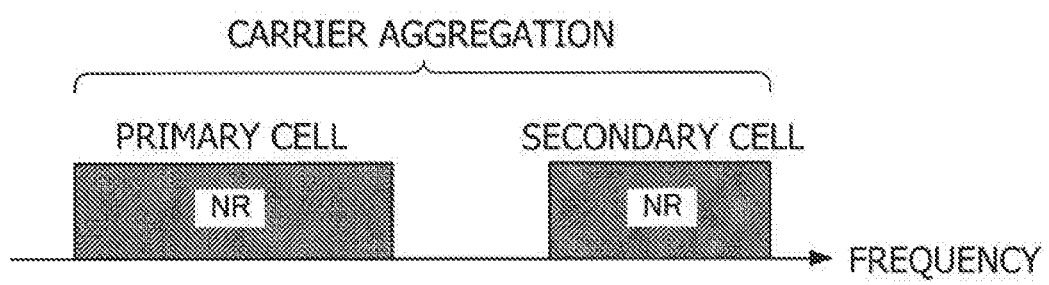
FIG. 2 is a schematic diagram depicting another example of component carrier settings in the embodiment of the present disclosure.

FIG. 2 depicts another example of component carrier settings in the present embodiment. In the example of FIG. 2, two NR cells are set. The two NR cells are set as a primary cell and as a secondary cell, and are integrated by carrier aggregation. In this case, the NR cells support the functions for performing communication in stand-alone mode, so that the assistance by an LTE cell is not needed. Alternatively, the two NR cells may be integrated by dual connectivity.

Radio Frame Configuration in the Present Embodiment

In the present embodiment, wireless frames (radio frames) of 10 ms (milliseconds) each are stipulated. Each radio frame includes two half-frames. The half-frame has a time span of 5 ms. Each of the half-frames includes five subframes. Each subframe has a time span of 1 ms and is defined by two successive slots. The slot has a time span of 0.5 ms. The i-th subframe in a radio frame includes a (2×i)th slot and a (2×i+1)th slot. That is, 10 subframes are stipulated in each radio frame. The subframes include a downlink subframe, an uplink subframe, a special subframe, and a sidelink subframe.

The downlink subframe is a subframe reserved for downlink transmission. The uplink subframe is a subframe reserved for uplink transmission. The special subframe includes three fields. The three fields include a DwPTS (Downlink Pilot Time Slot), a GP (Guard Period), and an UpPTS (Uplink Pilot Time Slot). The DwPTS, GP, and UpPTS have a total length of 1 ms. The DwPTS is a field reserved for downlink transmission. The UpPTS is a field reserved for uplink transmission. The GP is a field in which neither downlink transmission nor uplink transmission is carried out. Alternatively, the special subframe may be constituted solely by the DwPTS and GP or by the GP and UpPTS. The special subframe is arranged between a downlink subframe and an uplink subframe in TDD, and is used to switch from the downlink subframe to the uplink subframe. The sidelink subframe is a subframe reserved or set for sidelink communication. The sidelink is used for direct proximity detection and direct proximity communication between terminal apparatuses.

A single radio frame includes a downlink subframe, an uplink subframe, a special subframe, and/or a sidelink subframe. Alternatively, one radio frame may be constituted solely by a downlink subframe, an uplink subframe, a special subframe, or a sidelink subframe.

Multiple radio frame configurations are supported. The radio frame configurations are stipulated by frame configuration type. Frame configuration type 1 applies only to TDD. Frame configuration type 2 applies only to TDD. Frame configuration type 3 applies only to the operation of LAA (Licensed Assisted Access) secondary cells.

In frame configuration type 2, multiple uplink-downlink configurations are stipulated. In an uplink-downlink configuration, each of 10 subframes in one radio frame corresponds to a downlink subframe, an uplink subframe, or a special subframe. Subframe 0, subframe 5, and a DwPTS are always reserved for downlink transmission. An UpPTS and a subframe immediately following the special subframe are always reserved for uplink transmission.

In frame configuration type 3, 10 subframes in one radio frame are reserved for downlink transmission. The terminal apparatus 2 handles as a free subframe the subframe in which a PDSCH or a detection signal is not transmitted. The terminal apparatus 2 assumes that as long as a predetermined signal, a channel, and/or a downlink transmission is not detected in a given subframe, that subframe does not have any signal and/or channel. A downlink transmission is occupied exclusively by one or multiple successive subframes. The first subframe of the downlink transmission may be started anywhere in that subframe. The last subframe of the downlink transmission may be fully occupied or may be occupied exclusively over a time span stipulated by a DwPTS.

In frame configuration type 3, 10 subframes in one radio frame may alternatively be reserved for uplink transmission. As another alternative, each of 10 subframes in one radio frame may correspond to a downlink subframe, to an uplink subframe, to a special subframe, or to a sidelink subframe.

In a DwPTS of the special subframe, the base station apparatus 1 may transmit physical downlink channels and physical downlink signals. Also in the DwPTS of the special subframe, the base station apparatus 1 may limit PBCH transmissions. In an UpPTS of the special subframe, the terminal apparatus 2 may transmit physical uplink channels and physical uplink signals. Also in the UpPTS of the special subframe, the terminal apparatus 2 may limit the transmission of some physical uplink channels and some physical uplink signals.

NR Frame Configuration in the Present Embodiment

In each NR cell, one or more predetermined parameters are used over a predetermined time period (e.g., in a subframe). That is, in the NR cell, a downlink signal and an uplink signal are each generated using one or more predetermined parameters over the predetermined time period. In other words, the terminal apparatus 2 assumes that a downlink signal transmitted from the base station apparatus 1 and an uplink signal transmitted to the base station apparatus 1 are each generated using one or more predetermined parameters over the predetermined time period. Further, the base station apparatus 1 may configure a downlink signal transmitted to the terminal apparatus 2 and an uplink signal transmitted from the terminal apparatus 2 in such a manner that each of the signals is generated using one or more predetermined parameters over the predetermined time period. In a case where multiple predetermined parameters are used, the signals generated by use of these parameters are multiplexed by a predetermined method. Such methods include, for example, FDM (Frequency Division Multiplexing), TDM (Time Division Multiplexing), CDM (Code Division Multiplexing), and/or SDM (Spatial Division Multiplexing).

Multiple combinations of predetermined parameters to be set in NR cells may be stipulated beforehand as parameter sets.

FIG. 3 depicts examples of parameter sets regarding transmission signals in NR cells. In the examples of FIG. 3, the parameters in a parameter set regarding a transmission signal include a subframe interval, the number of subcarriers per resource block in an NR cell, the number of symbols per subframe, and a CP length type. The CP length type refers to the type of the length of a CP used by the NR cell. For example, CP length type 1 corresponds to a normal CP in LTE, and CP length type 2 corresponds to an extended CP in LTE.

The parameter set regarding a transmission signal in an NR cell may be stipulated individually for a downlink and for an uplink. Also, the parameter set regarding the transmission signal in the NR cell may be set independently for a downlink and for an uplink.

Figure 4:
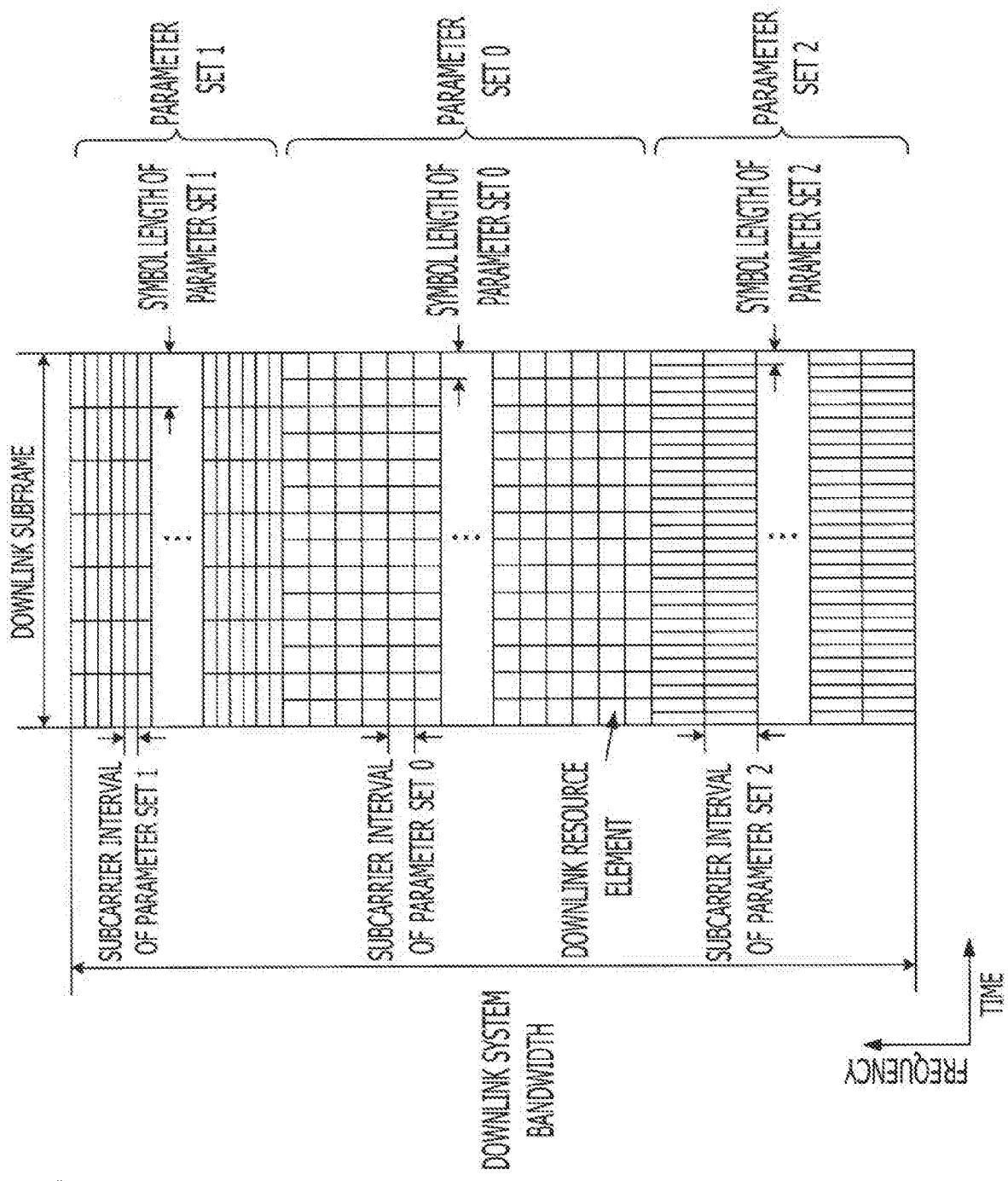
FIG. 4 is a schematic diagram depicting an example of a downlink subframe of NR in the embodiment.

FIG. 4 depicts an example of a downlink subframe of NR in the present embodiment. In the example of FIG. 4, the signals generated by use of parameter set 1, parameter set 0, and parameter set 2 are FDMed in a cell (system bandwidth). The illustration in FIG. 4 is also referred to as a downlink resource grid of NR. The base station apparatus 1 may transmit a physical downlink channel of NR and/or a physical downlink signal of NR in a downlink subframe to the terminal apparatus 2. The terminal apparatus 2 may receive the physical downlink channel or NR and/or the physical downlink signal of NR in the downlink subframe from the base station apparatus 1.

Figure 5:
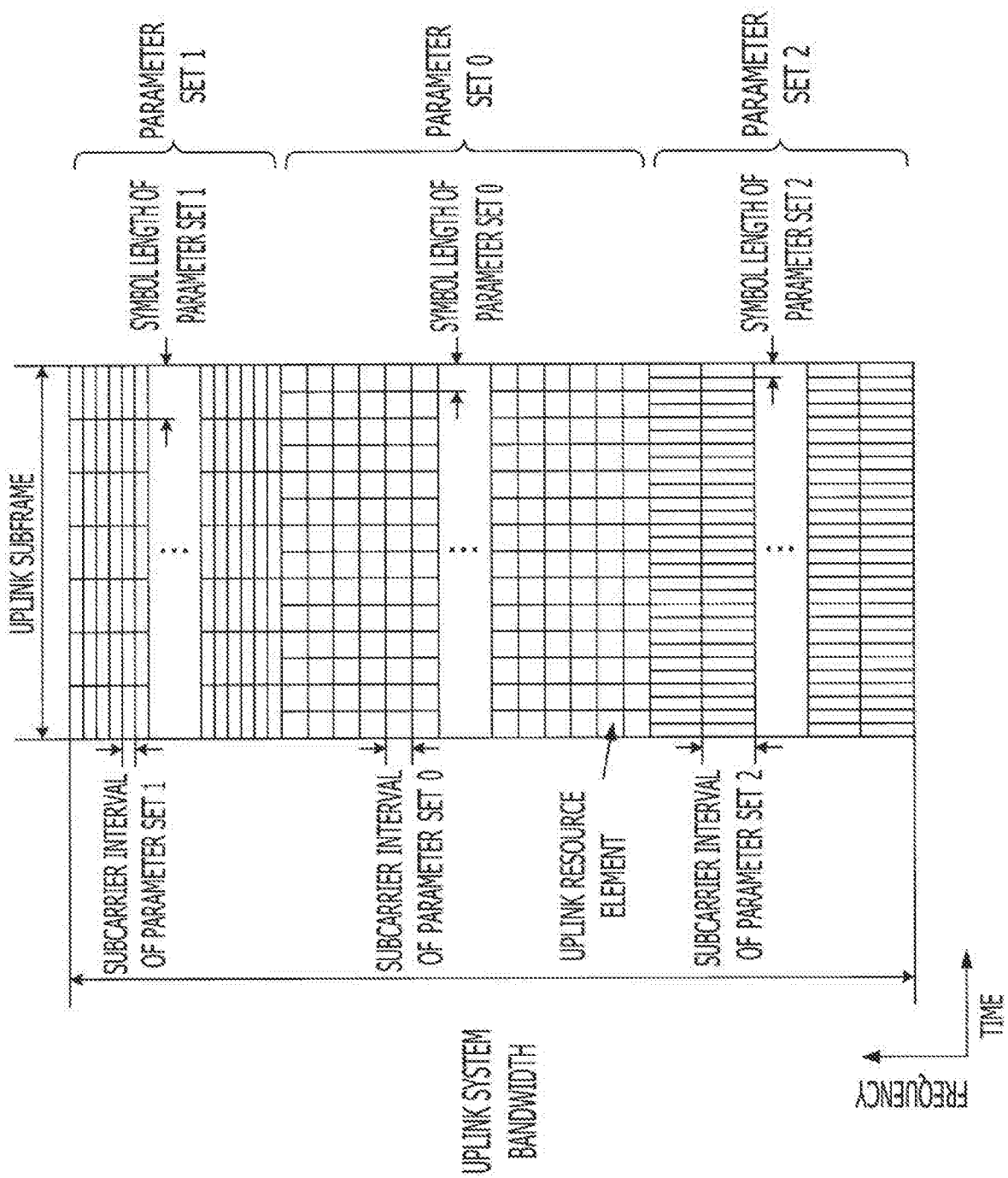
FIG. 5 is a schematic diagram depicting an example of an uplink subframe of NR in the embodiment.

FIG. 5 depicts an example of an uplink subframe of NR in the present embodiment. In the example of FIG. 5, the signals generated by use of parameter set 1, parameter set 0, and parameter set 2 are FDMed in a cell (system bandwidth). The illustration in FIG. 5 is also referred to as an uplink resource grid of NR. The base station apparatus 1 may transmit a physical uplink channel of NR and/or a physical uplink signal of NR in an uplink subframe to the terminal apparatus 2. The terminal apparatus 2 may receive the physical uplink channel or NR and/or the physical uplink signal of NR in the uplink subframe from the base station apparatus 1.

Exemplary Configuration of the Base Station Apparatus 1 in the Present Embodiment FIG. 6 is a schematic block diagram depicting a configuration of the base station apparatus 1 in the present embodiment. As depicted in FIG. 6, the base station apparatus 1 includes a higher-layer processing section 101, a control section 103, a reception section 105, a transmission section 107, and a transmitting/receiving antenna 109. The reception section 105 includes a decoding section 1051, a demodulation section 1053, a demultiplexing section 1055, a wireless reception section 1057, and a channel measurement section 1059. The transmission section 107 includes an encoding section 1071, a modulation section 1073, a multiplexing section 1075, a wireless transmission section 1077, and a downlink reference signal generation section 1079.

As discussed above, the base station apparatus 1 supports one or more RATs. Some or all of the components in the base station apparatus 1 in FIG. 6 may be configured individually with regard to each RAT. For example, the reception section 105 and the transmission section 107 may be configured individually for LTE and for NR. In an NR cell, some or all of the components in the base station apparatus 1 in FIG. 6 may be configured individually for each parameter set regarding the transmission signal. For example, in a given NR cell, the wireless reception section 1057 and the wireless transmission section 1077 may be configured individually for each parameter set regarding the transmission signal.

The higher-layer processing section 101 performs processing in a medium access control (MAC) layer, a packet data convergence protocol (PDCP) layer, a radio link control (RLC) layer, and a radio resource control (RRC) layer. The higher-layer processing section 101 further generates control information and outputs the generated information to the control section 103 for control over the reception section 105 and transmission section 107.

On the basis of the control information from the higher-layer processing section 101, the control section 103 controls the reception section 105 and the transmission section 107. The control section 103 generates control information destined for the higher-layer processing section 101 and outputs the generated information to the latter. The control section 103 receives input of a decoded signal from the decoding section 1051 and a result of channel estimation from the channel measurement section 1059. The control section 103 outputs the signal to be encoded to the encoding section 1071. Also, the control section 103 is used to control the base station apparatus 1 partially or as a whole.

The higher-layer processing section 101 performs processing and management regarding RAT control, wireless resource control, subframe setting, scheduling control, and/or CSI report control. The processing and management in the higher-layer processing section 101 are either specific to each terminal apparatus or common to the terminal apparatuses connected with the base station apparatus. The processing and management in the higher-layer processing section 101 may be either performed by the higher-layer processing section 101 alone or acquired from a host node or from another base station apparatus. As another alternative, the processing and management in the higher-layer processing section 101 may be performed individually for each RAT. For example, the higher-layer processing section 101 carries out processing and management individually for LTE and for NR.

The RAT control in the higher-layer processing section 101 involves management regarding RAT. For example, during RAT control, management is performed regarding LTE and/or with respect to NR. The management with respect to NR includes setting and processing the parameter sets for transmission signals in NR cells.

The wireless resource control in the higher-layer processing section 101 involves generating and/or managing downlink data (transport block), system information, an RRC message (RRC parameter), and/or a MAC control element (CE).

The subframe setting in the higher-layer processing section 101 involves managing subframe settings, subframe pattern settings, uplink-downlink settings, uplink reference UL-DL settings, and/or downlink reference UL-DL settings. The subframe setting in the higher-layer processing section 101 is also referred to as base station subframe setting. The subframe setting in the higher-layer processing section 101 may be determined on the basis of uplink traffic volume and downlink traffic volume. The subframe setting in the higher-layer processing section 101 may be determined on the basis of a scheduling result of scheduling control in the higher-layer processing section 101.

The scheduling control in the higher-layer processing section 101 determines the frequency and subframe to which to allocate a physical channel, the encoding rate and modulation method for the physical channel, and transmission power on the basis of received channel state information and an estimate of the propagation path and channel quality input from the channel measurement section 1059. For example, the control section 103 generates control information (DCI format) based on the scheduling result of scheduling control in the higher-layer processing section 101.

The CSI report control in the higher-layer processing section 101 involves controlling CSI reporting of the terminal apparatus 2. For example, the settings regarding the CSI reference resource assumed to calculate the CSI in the terminal apparatus 2 are controlled.

Under control of the control section 103, the reception section 105 receives the signal transmitted from the terminal apparatus 2 via the transmitting/receiving antenna 109, performs reception processes such as demultiplexing, demodulation, and decoding on the received signal, and outputs the received and processed information to the control section 103. The reception processes in the reception section 105 are performed on the basis of predetermined settings or the settings conveyed to the terminal apparatus 2 from the base station apparatus 1.

Given an uplink signal received via the transmitting/receiving antenna 109, the wireless reception section 1057 subjects the received signal to conversion (down-conversion) to an intermediate frequency, removal of unnecessary frequency components, control of the amplification level for maintaining an appropriate signal level, orthogonal demodulation based on the in-phase and orthogonal components of the received signal, conversion from analog signal to digital signal, removal of a guard interval (GI), and/or extraction of a frequency domain signal through fast Fourier transform (FFT).

The demultiplexing section 1055 demultiplexes the signal input from the wireless reception section 1057 into an uplink channel such as PUCCH or PUSCH and/or an uplink reference signal. The demultiplexing section 1055 outputs the uplink reference signal to the channel measurement section 1059. Given the estimate of the propagation path input from the channel measurement section 1059, the demultiplexing section 1055 compensates the propagation path for the uplink channel.

Given an uplink channel modulation symbol, the demodulation section 1053 demodulates the received signal using a modulation method such as BPSK (Binary Phase Shift Keying), QPSK (Quadrature Phase Shift Keying), 16 QAM (Quadrature Amplitude Modulation), 64 QAM, or 256 QAM. The demodulation section 1053 demultiplexes and demodulates a MIMO-multiplexed uplink channel.

The decoding section 1051 performs the process of decoding the encoded bits on the demodulated uplink channel. The decoded uplink data and/or uplink control information is output to the control section 103. The decoding section 1051 performs the decoding process on the PUSCH for each transport block.

The channel measurement section 1059 measures the estimate of the propagation path and/or the channel quality from the uplink reference signal input from the demultiplexing section 1055, and outputs the measurements to the demultiplexing section 1055 and/or to the control section 103. For example, an UL-DMRS is for measuring the estimate of the propagation path for performing propagation path compensation on the PUCCH or on the PUSCH, and an SRS is for measuring the channel quality of an uplink channel.

Under control of the control section 103, the transmission section 107 performs transmission processes such as encoding, modulation, and multiplexing on the downlink control information and the downlink data input from the higher-layer processing section 101. For example, the transmission section 107 generates a transmission signal by generating and multiplexing a PHICH, a PDCCH, an EPDCCH, a PDSCH, and a downlink reference signal. The transmission section 107 performs the transmission processes based on predetermined settings, on the settings conveyed from the base station apparatus 1 to the terminal apparatus 2, or on the settings conveyed via the PDCCH or EPDCCH transmitted in the same subframe.

The encoding section 1071 encodes an HARQ indicator (HARQ-ACK), downlink control information, and downlink data input from the control section 103 using a predetermined encoding method such as block encoding, convolutional encoding, or turbo encoding. The modulation section 1073 modulates the encoded bits input from the encoding section 1071 using a predetermined modulation method such as BPSK, QPSK, 16 QAM, 64 QAM, or 256 QAM. The downlink reference signal generation section 1079 generates a downlink reference signal based on physical cell identification (PCI) and on the RRC parameter set in the terminal apparatus 2. The multiplexing section 1075 multiplexes modulation symbols and downlink reference signals on different channels and places what is multiplexed in a predetermined resource element.

Upon receipt of a signal from the multiplexing section 1075, the wireless transmission section 1077 generates a transmission signal by performing on the received signal such processes as conversion to a time domain signal through inverse fast Fourier transform (IFFT), addition of a guard interval, generation of a digital signal in a baseband, conversion to an analog signal, orthogonal modulation, conversion from intermediate frequency signal to high frequency signal (up-conversion), removal of unnecessary frequency components, and amplification of power. The transmission signal output from the wireless transmission section 1077 is transmitted from the transmitting/receiving antenna 109.

Exemplary Configuration of the Terminal Apparatus 2 in the Present Embodiment

Figure 7:
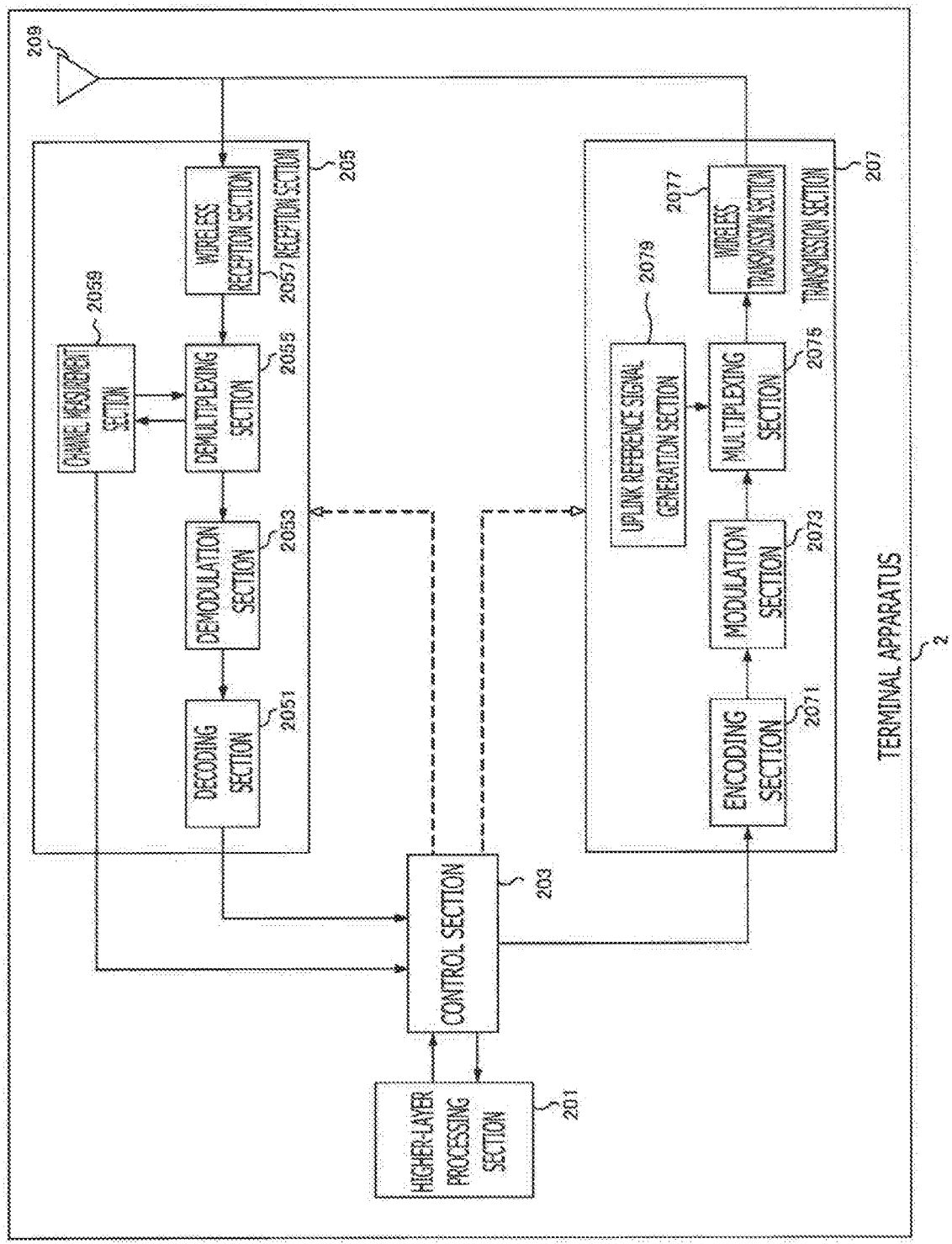
FIG. 7 is a schematic block diagram depicting a configuration of a terminal apparatus 2 in the embodiment.

FIG. 7 is a schematic block diagram depicting a configuration of the terminal apparatus 2 in the present embodiment. As depicted, the terminal apparatus 2 includes a higher-layer processing section 201, a control section 203, a reception section 205, a transmission section 207, and a transmitting/receiving antenna 209. The reception section 205 includes a decoding section 2051, a demodulation section 2053, a demultiplexing section 2055, a wireless reception section 2057, and a channel measurement section 2059. The transmission section 207 includes an encoding section 2071, a modulation section 2073, a multiplexing section 2075, a wireless transmission section 2077, and an uplink reference signal generation section 2079.

As discussed above, the terminal apparatus 2 supports one or more RATs. Some or all of the components in the terminal apparatus 2 in FIG. 7 may be configured individually with regard to each RAT. For example, the reception section 205 and the transmission section 207 may be configured individually for LTE and for NR. In an NR cell, some or all of the components in the terminal apparatus 2 in FIG. 7 may be configured individually for each parameter set regarding the transmission signal. For example, in a given NR cell, the wireless reception section 2057 and the wireless transmission section 2077 may be configured individually for each parameter set with respect to the transmission signal.

The higher-layer processing section 201 outputs uplink data (transport block) to the control section 203. The higher-layer processing section 201 performs processing in a medium access control (MAC) layer, a packet data convergence protocol (PDCP) layer, a radio link control (RLC) layer, and a radio resource control (RRC) layer. The higher-layer processing section 201 further generates control information and outputs the generated information to the control section 203 for control over the reception section 205 and transmission section 207.

On the basis of the control information from the higher-layer processing section 201, the control section 203 controls the reception section 205 and the transmission section 207. The control section 203 generates control information destined for the higher-layer processing section 201 and outputs the generated information to the latter. The control section 203 receives input of a decoded signal from the decoding section 2051 and a result of channel estimation from the channel measurement section 2059. The control section 203 outputs the signal to be encoded to the encoding section 2071. Also, the control section 203 may be used to control the terminal apparatus 2 partially or as a whole.

The higher-layer processing section 201 performs processing and management regarding RAT control, wireless resource control, subframe setting, scheduling control, and/or CSI report control. The processing and management in the higher-layer processing section 201 are performed on the basis of either predetermined settings or the settings based on the control information established by or conveyed from the base station apparatus 1. For example, the control information from the base station apparatus 1 includes an RRC parameter, a MAC control element, or DCI. Also, the processing and management in the higher-layer processing section 201 may be performed individually for each RAT. For example, the higher-layer processing section 201 carries out processing and management individually for LTE and for NR.

The RAT control in the higher-layer processing section 201 involves management regarding RAT. For example, during RAT control, management regarding LTE is performed and/or management with respect to NR is carried out. The management regarding NR includes configuring and processing the parameter sets for transmission signals in NR cells.

The wireless resource control in the higher-layer processing section 201 involves management of the setting information in the own apparatus. The wireless resource control in the higher-layer processing section 201 generates and/or manages uplink data (transport block), system information, an RRC message (RRC parameter), and/or a MAC control element (CE).

The subframe setting in the higher-layer processing section 201 involves managing the subframe settings in the base station apparatus 1 and/or in a base station apparatus different from the base station apparatus 1. The subframe settings include uplink or downlink settings for subframes, subframe pattern settings, uplink-downlink settings, uplink reference UL-DL settings, and/or downlink reference UL-DL settings. The subframe setting in the higher-layer processing section 201 is also referred to as terminal subframe setting.

The scheduling control in the higher-layer processing section 201 generates control information for controlling the scheduling of the reception section 205 and transmission section 207 on the basis of DCI (scheduling information) from the base station apparatus 1.

The CSI report control in the higher-layer processing section 201 involves controlling a CSI report of the base station apparatus 1. For example, what is controlled in CSI report control are the settings regarding the CSI reference resource assumed for the channel measurement section 2059 to calculate the CSI. During CSI report control, the resource (timing) used for reporting the CSI is controlled on the basis of the DCI and/or the RRC parameter.

Under control of the control section 203, the reception section 205 receives the signal transmitted from the base station apparatus 1 via the transmitting/receiving antenna 209, performs reception processes such as demultiplexing, demodulation, and decoding on the received signal, and outputs the received and processed information to the control section 203. The reception processes in the reception section 205 are performed on the basis of predetermined settings or the settings conveyed from or established by the base station apparatus 1.

Given an uplink signal received via the transmitting/receiving antenna 209, the wireless reception section 2057 subjects the received signal to conversion (down-conversion) to an intermediate frequency, removal of unnecessary frequency components, control of the amplification level for maintaining an appropriate signal level, orthogonal demodulation based on the in-phase and orthogonal components of the received signal, conversion from analog signal to digital signal, removal of a guard interval (GI), and/or extraction of a frequency domain signal through fast Fourier transform (FFT).

The demultiplexing section 2055 demultiplexes the signal input from the wireless reception section 2057 into a downlink channel such as PHICH, PDCCH, EPDCCH, or PDSCH, a downlink synchronizing signal, and/or a downlink reference signal. The demultiplexing section 2055 outputs the downlink reference signal to the channel measurement section 2059. Given the estimate of the propagation path input from the channel measurement section 2059, the demultiplexing section 2055 compensates the propagation path for the downlink channel.

Given a downlink channel modulation symbol, the demodulation section 2053 demodulates the received signal using a modulation method such as BPSK, QPSK, 16 QAM, 64 QAM, or 256 QAM. The demodulation section 2053 demultiplexes and demodulates a MIMO-multiplexed downlink channel.

The decoding section 2051 performs the process of decoding the encoded bits of the demodulated downlink channel. The decoded downlink data and/or downlink control information is output to the control section 203. The decoding section 2051 performs the decoding process on the PDSCH for each transport block.

The channel measurement section 2059 measures an estimate of the propagation path and/or the channel quality from the downlink reference signal input from the demultiplexing section 2055, and outputs the measurements to the demultiplexing section 2055 and/or to the control section 203. The downlink reference signal used by the channel measurement section 2059 for measurement may be determined in accordance with the transmission mode established by use of at least the RRC parameter and/or with some other RRC parameter. For example, a DL-DMRS is for measuring the estimate of the propagation path for performing propagation path compensation on the PDSCH or on the EPDCCH. A CRS is for measuring the estimate of the propagation path for performing propagation path compensation on the PDCCH or on the PDSCH, and/or measuring the channel of the downlink for reporting the CSI. A CSI-RS is for measuring the channel of the downlink for reporting the CSI. The channel measurement section 2059 calculates RSRP (Reference Signal Received Power) and/or RSRQ (Reference Signal Received Quality) based on the CRS, on the CSI-RS or on the detected signal, and outputs what is calculated to the higher-layer processing section 201.

Under control of the control section 203, the transmission section 207 performs transmission processes such as encoding, modulation, and multiplexing on the uplink control information and uplink data input from the higher-layer processing section 201. For example, the transmission section 207 generates a transmission signal by generating and multiplexing an uplink channel such as PUSCH or PUCCH and/or an uplink reference signal. The transmission section 207 performs the transmission processes based on predetermined settings or on the settings established by or conveyed from the base station apparatus 1.

The encoding section 2071 encodes a HARQ indicator (HARQ-ACK), uplink control information, and uplink data input from the control section 203 using a predetermined encoding method such as block encoding, convolutional encoding, or turbo encoding. The modulation section 2073 modulates the encoded bits input from the encoding section 2071 using a predetermined modulation method such as BPSK, QPSK, 16 QAM, 64 QAM, or 256 QAM. The uplink reference signal generation section 2079 generates an uplink reference signal based on the RRC parameter set in the terminal apparatus 2. The multiplexing section 2075 multiplexes modulation symbols and uplink reference signals on different channels and places what is multiplexed in a predetermined resource element.

Upon receipt of a signal from the multiplexing section 2075, the wireless transmission section 2077 generates a transmission signal by performing on the received signal such processes as conversion to a time domain signal through inverse fast Fourier transform (IFFT), addition of a guard interval, generation of a digital signal in a baseband, conversion to an analog signal, orthogonal modulation, conversion from intermediate frequency signal to high frequency signal (up-conversion), removal of unnecessary frequency components, and amplification of power. The transmission signal output from the wireless transmission section 2077 is transmitted from the transmitting/receiving antenna 209.

Signaling of the Control Information in the Present Embodiment

The base station apparatus 1 and the terminal apparatus 2 may use diverse methods for signaling control information (notification, broadcasting, or setting). The signaling of the control information may be performed in various layers. The signaling of the control information includes physical layer signaling, which is signaling through the physical layer; RRC signaling, which is signaling through the RRC layer; and MAC signaling, which is signaling through the MAC layer. The RRC signaling is either dedicated RRC signaling for giving notification of the control information specific to the terminal apparatus 2, or common RRC signaling for giving notification of the control information specific to the base station apparatus 1. The signaling used for a layer higher than the physical layer such as RRC signaling and MAC signaling is also referred to as higher-layer signaling.

The RRC signaling is implemented by signaling the RRC parameter. The MAC signaling is implemented by signaling the MAC control element. The physical layer signaling is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are thus referred to as semi-static signaling. The physical layer signaling is used for signaling dynamic control information and is thus referred to as dynamic signaling. The DCI is used for scheduling the PDSCH or the PUSCH. The UCI is used for the CSI report, HARQ-ACK report, and/or scheduling request (SR).

Details of the Downlink Control Information in the Present Embodiment

Notification is given of the DCI using a DCI format having a field stipulated beforehand. Predetermined information bits are mapped in the field stipulated by the DCI format. The DCI gives notification of downlink scheduling information, uplink scheduling information, sidelink scheduling information, a request for a noncyclic CSI report, or an uplink transmission power command.

The DCI format monitored by the terminal apparatus 2 is determined in accordance with the transmission mode set for each serving cell. That is, part of the DCI format monitored by the terminal apparatus 2 may vary depending on the transmission mode. For example, the terminal apparatus 2 on which downlink transmission mode 1 is set monitors DCI format 1A and DCI format 1. As another example, the terminal apparatus 2 on which downlink transmission mode 4 is set monitors DCI format 1A and DCI format 2. As a further example, the terminal apparatus 2 on which uplink transmission mode 1 is set monitors DCI format 0. As yet another example, the terminal apparatus 2 on which uplink transmission mode 2 is set monitors DCI format 0 and DCI format 4.

Notification is not given of a control domain in which the PDCCH for notifying the terminal apparatus 2 of the DCI is placed. The terminal apparatus 2 detects the DCI addressed thereto through blind decoding (blind detection). Specifically, the terminal apparatus 2 monitors a set of PDCCH candidates in the serving cell. The monitoring means attempting to decode each of the PDCCH candidates in the set using all DCI formats monitored. For example, the terminal apparatus 2 attempts to decode all aggregation levels, PDCCH candidates, and DCI formats that may possibly be transmitted to the terminal apparatus 2. The terminal apparatus 2 recognizes the DCI (PDCCH) that is successfully decoded as the DCI (PDCCH) for the terminal apparatus 2.

A cyclic redundancy check (CRC) is added to the DCI. The CRC is used for DCI error detection and for DCI blind detection. A CRC parity bit is scrambled using a RNTI (Radio Network Temporary Identifier). The terminal apparatus 2 detects whether the DCI is destined for the terminal apparatus 2 on the basis of the RNTI. Specifically, the terminal apparatus 2 descrambles the bit corresponding to the CRC using a predetermined RNTI to extract the CRC so as to determine whether the corresponding DCI is correct.

The RNTI is stipulated or set in accordance with the purpose or use of the DCI. The RNTI includes a C-RNTI (Cell-RNTI), an SPS C-RNTI (Semi-Persistent Scheduling C-RNTI), an SI-RNTI (System Information-RNTI), a P-RNTI (Paging-RNTI), an RA-RNTI (Random Access- RNTI), a TPC-PUCCH-RNTI (Transmit Power Control-PUCCH-RNTI), a TPC-PUSCH-RNTI (Transmit Power Control-PUSCH-RNTI), a temporary C-RNTI, an M-RNTI (MBMS (Multimedia Broadcast Multicast Services)-RNTI), and an eIMTA-RNTI.

The C-RNTI and the SPS C-RNTI are RNTIs specific to the terminal apparatus 2 in the base station apparatus 1 (cell), and serve as identifiers identifying the terminal apparatus 2. The C-RNTI is used for scheduling the PDSCH or the PUSCH in a given subframe. The SPS C-RNTI is used to activate or release periodic scheduling of the resources for the PDSCH or for the PUSCH. A control channel having a CRC scrambled using the SI-RNTI is used for scheduling an SIB (System Information Block). A control channel having a CRC scrambled using the P-RNTI is used to control paging. A control channel having a CRC scrambled using the RA-RNTI is used for scheduling a response to a RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel having a CRC scrambled using the temporary C-RNTI is used by a mobile station apparatus in which no C-RNTI is set or recognized. A control channel having a CRC scrambled using the M-RNTI is used for scheduling the MBMS. A control channel having a CRC scrambled using the eIMTA-RNTI is used to give notification of information regarding the TDD UL/DL settings of a TDD serving cell in dynamic TDD (eIMTA). Further, the DCI format may be scrambled using a new RNTI instead of the above RNTIs.

Scheduling information (downlink scheduling information, uplink scheduling information, or sidelink scheduling information) includes information for carrying out scheduling in units of resource blocks or resource block groups for the scheduling of the frequency domain. The resource block group refers to a set of successive resource blocks that are allocated as the resources to the scheduled terminal apparatus. The size of the resource block group is determined in accordance with the system bandwidth in use.

Details of the Downlink Control Channel in the Present Embodiment

The DCI is transmitted using the control channel such as the PDCCH or the EPDCCH. The terminal apparatus 2 monitors a set of PDCCH candidates and/or a set of EPDCCH candidates in one or more activated serving cells set by RRC signaling. Here, the monitoring means attempting to decode the PDCCH and/or the EPDCCH in the sets corresponding to all DCI formats to be monitored.

The set of PDCCH candidates or the set of EPDCCH candidates is also referred to as a search space. The search space is defined in two types: a common search space (CSS) and a terminal specific search space (USS). The CSS may be defined only as the search space for the PDCCH.

The CSS (Common Search Space) is a search space set on the basis of the parameters specific to the base station apparatus 1 and/or the parameters stipulated beforehand. For example, the CSS is a search space used in common to multiple terminal apparatuses. Thus the base station apparatus 1 maps the control channels common to multiple terminal apparatuses so as to reduce the resources for transmitting the control channel.

The USS (UE-specific Search Space) is a search space set using at least the parameters specific to the terminal apparatus 2. Thus the USS is a search space specific to the terminal apparatus 2, permitting individual transmission of the control channel specific to each terminal apparatus 2. This makes it possible for the base station apparatus 1 to efficiently map the control channels specific to multiple terminal apparatuses.

The USS may be set to be used in common to multiple terminal apparatuses. With the USS set in common to multiple terminal apparatuses, a parameter specific to a given terminal apparatus 2 is set to have the same value among multiple terminal apparatuses. For example, the unit set for the parameters that are the same for multiple terminal apparatuses is a cell, a transmission point, or a group of predetermined terminal apparatuses.

The search space of each aggregation level is defined by a set of PDCCH candidates. Each PDCCH is transmitted using one or more sets of CCE (Control Channel Elements). The number of CCEs used in one PDCCH is also referred to as an aggregation level. For example, the number of CCEs used in one PDCCH is 1, 2, 4, or 8.

The search space of each aggregation level is defined by the set of EPDCCH candidates. Each EPDCCH is transmitted using one or more sets of ECCE (Enhanced Control Channel Elements). The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is determined on the basis of at least the search space and the aggregation level. For example, in the CSS, the numbers of PDCCH candidates in the aggregation levels 4 and 8 are 4 and 2, respectively. For example, in the USS, the numbers of PDCCH candidates in the aggregations 1, 2, 4, and 8 are 6, 6, 2, and 2, respectively.

Each ECCE is configured with multiple EREG (Enhanced Resource Element Groups). The EREG is used to define the mapping of the resource elements for the EPDCCH. Sixteen EREGs numbered from 0 to 15 are defined for each RB pair. That is, EREG 0 to EREG 15 are defined for each RB pair. For each RB pair, EREG 0 to EREG 15 are defined preferentially in the frequency direction at regular intervals for resource elements other than those to which predetermined signals and/or channels are mapped. For example, no EREG is defined for the resource elements to which is mapped a demodulation reference signal associated with an EPDCCH transmitted through antenna ports 107 to 110.

The number of ECCEs used in one EPDCCH depends on the EPDCCH format and is determined on the basis of other parameters. The number of ECCEs used in one EPDCCH is also referred to as an aggregation level. For example, the number of ECCEs used in one EPDCCH is determined on the basis of the number of resource elements that may be used for transmission of the EPDCCH in one RB pair and in accordance with the transmission method of the EPDCCH. For example, the number of ECCEs used in one EPDCCH is 1, 2, 4, 8, 16, or 32. Further, the number of EREGs used in one ECCE, which is determined on the basis of a subframe type and a cyclic prefix type, is 4 or 8. Distributed transmission and localized transmission are supported as the transmission method for the EPDCCH.

Distributed transmission or localized transmission may be used for the EPDCCH. Distributed transmission and localized transmission vary in the mapping of ECCEs to the EREG and the RB pair. For example, in distributed transmission, one ECCE is configured using the EREGs of multiple RB pairs. In localized transmission, one ECCE is configured using the EREG of one RB pair.

The base station apparatus 1 performs settings regarding the EPDCCH on the terminal apparatus 2. The terminal apparatus 2 monitors multiple EPDCCHs on the basis of the settings from the base station apparatus 1. A set of RB pairs for which the terminal apparatus 2 monitors the EPDCCHs may be configured. The set of RB pairs is also referred to as an EPDCCH set or an EPDCCH-PRB set. One or more EPDCCH sets may be configured for one terminal apparatus 2. Each EPDCCH set is configured with one or more RB pairs. Further, the settings related to the EPDCCH may be performed individually for each EPDCCH set.

The base station apparatus 1 may configure a predetermined number of EPDCCH sets for the terminal apparatus 2. For example, up to two EPDCCH sets may be configured as EPDCCH set 0 and/or EPDCCH set 1. Each of the EPDCCH sets may be configured with a predetermined number of RB pairs. Each EPDCCH sets configures one set of multiple ECCEs. The number of ECCEs configured in one EPDCCH set is determined on the basis of the number of RB pairs configured as the EPDCCH set and the number of EREGs used in one ECCE. In a case where the number of ECCEs configured in one EPDCCH set is N, each EPDCCH set configures ECCEs numbered from 0 to N−1. For example, in a case where the number of EREGs used in one ECCE is 4, the EPDCCH set constituted by four RB pairs configures 16 ECCEs.

Details of Multicarrier Transmission in the Present Embodiment

Multiple cells are set for the terminal apparatus 2 so that the terminal apparatus 2 may perform multicarrier transmission. The communication in which the terminal apparatus 2 uses multiple cells is referred to as CA (Carrier Aggregation) or DC (Dual Connectivity). The description herein regarding the present embodiment may be applied to each or some of the multiple cells set for the terminal apparatus 2. The cell set for the terminal apparatus 2 is also referred to as a serving cell.

In the CA, multiple serving cells to be set include one primary cell (PCell) and one or more secondary cells (SCell). One primary cell and one or more secondary cells may be set for the terminal apparatus 2 that supports the CA.

The primary cell is a serving cell in which an initial connection establishment procedure is performed, a serving cell in which a connection re-establishment procedure is started, or a cell designated as the primary cell in a handover procedure. The primary cell operates with a primary frequency. The secondary cell may be set after connection is established or re-established. The secondary cell operates with a secondary frequency. Incidentally, the connection is also referred to as an RRC connection.

The DC is an operation in which a predetermined terminal apparatus 2 consumes wireless resources provided from at least two different network points. The network points are a master base station apparatus (master eNB (MeNB)) and a secondary base station apparatus (secondary eNB (SeNB)). The dual connectivity involves the terminal apparatus 2 making RRC connection with at least two network points. In the dual connectivity, the two network points may be connected through a non-ideal backhaul.

In the DC, the base station apparatus 1 connected at least to an S1-MME (Mobility Management Entity) and playing the role of a mobility anchor is referred to as a master base station apparatus. Further, the base station apparatus 1 that is not the master base station apparatus while providing additional wireless resources to the terminal apparatus 2 is referred to as a secondary base station apparatus. A group of serving cells associated with the master base station apparatus is also referred to as a master cell group (MCG). A group of serving cells associated with the secondary base station apparatus is also referred to as a secondary cell group (SCG).

In the DC, the primary cell belongs to the MCG. Further, in the SCG, the secondary cell corresponding to the primary cell is referred to as a primary secondary cell (PSCell). The PSCell (the base station apparatus configuring the PSCell) may support functions (capability and performance) equivalent to those of the PCell (the base station apparatus configuring the PCell). Further, the PSCell may support only some of the functions of the PCell. For example, the PSCell may support a function of performing PDCCH transmission using a search space different from the CSS or the USS. Also, the PSCell may be constantly in an active state. Furthermore, the PSCell is a cell capable of receiving the PUCCH.

In the DC, a radio bearer (data radio bearer (DRB)) and/or a signaling radio bearer (SRB) may be individually allocated to the MeNB and to the SeNB. A duplex mode may be set individually for the MCG (PCell) and for the SCG (PSCell). The MCG (PCell) and the SCG (PSCell) need not be synchronized with each other. A parameter (a timing advance group (TAG)) for adjusting multiple timings may be set independently for the MCG (PCell) and for the SCG (PSCell). In the dual connectivity, the terminal apparatus 2 transmits the UCI corresponding to the cells in the MCG only through the MeNB (PCell) and transmits the UCI corresponding to the cells in the SCG solely through the SeNB (PSCell). In the transmission of each UCI, the transmission method using the PUCCH and/or the PUSCH is applied to the respective cell groups.

The PUCCH and the PBCH (MIB) are transmitted only through the PCell or the PSCell. Further, the PRACH is transmitted only through the PCell or the PSCell as long as multiple TAGs (Timing Advance Groups) are not set between the cells in the CG.

In the PCell or the PSCell, SPS (Semi-Persistent Scheduling) or DRX (Discontinuous Transmission) may be performed. In the secondary cell, the same DRX as in the PCell or the PSCell of the same cell group may be carried out.

In the secondary cell, the information/parameters regarding the MAC settings are basically shared with the PCell or the PSCell in the same cell group. Some of the parameters may be set for each secondary cell. Some timers or counters may be applied only to the PCell or to the PSCell.

In the CA, the cells to which the TDD scheme is applied and the cells to which the TDD scheme is applied may be aggregated. In a case where the cells to which the TDD scheme is applied and the cells to which the TDD scheme is applied are aggregated, the present disclosure may be applied to either the cells to which the TDD scheme is applied or to the cells to which the TDD scheme is applied.

The terminal apparatus 2 transmits to the base station apparatus 1 information indicating combinations of bands in which the CA is supported by the terminal apparatus 2. The terminal apparatus 2 transmits to the base station apparatus 1 information indicating whether simultaneous transmission/reception is supported in the multiple serving cells in different multiple bands for each of the band combinations.

Details of Downlink Resource Element Mapping of NR in the Present Embodiment

Figure 8:
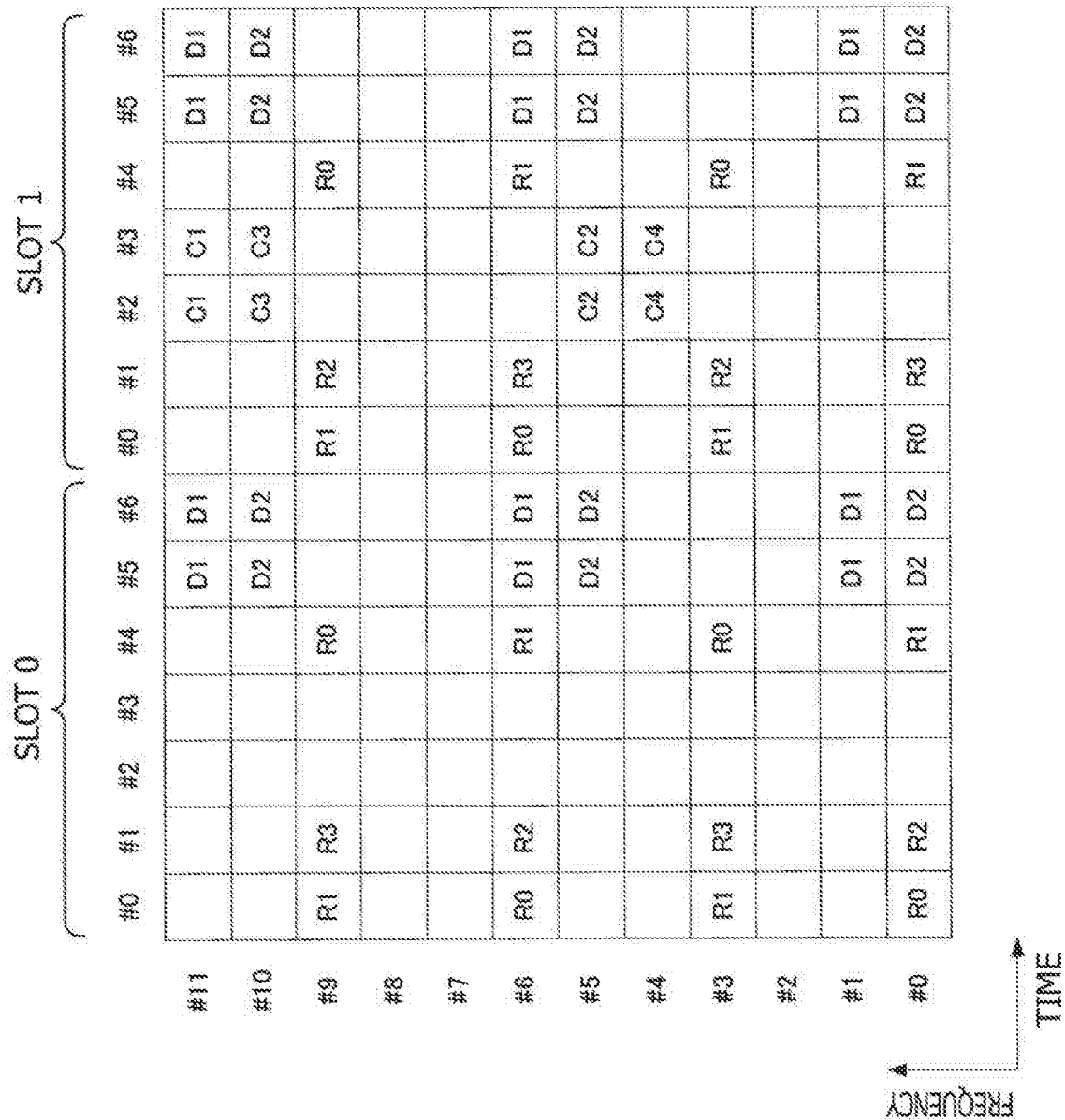
FIG. 8 is a schematic diagram depicting an example of downlink resource element mapping of NR in the embodiment.

FIG. 8 depicts an example of downlink resource element mapping of NR in the present embodiment. Illustrated in FIG. 8 is a set of resource elements in predetermined resources in a case where parameter set 0 is used. The resources depicted in FIG. 8 are constituted by the same time lengths and frequency bandwidths as those of one resource block pair in LTE.

In NR, a predetermined resource is also referred to as an NR-RB (NR resource block). The predetermined resource may be used as a unit in which to allocate the NR-PDSCH or the NR-PDCCH, as a unit in which to define the mapping of resource elements for a predetermined channel or a predetermined signal, or as a unit in which to configure parameter sets.

In the example of FIG. 8, the predetermined resources include 14 OFDM symbols indicated by OFDM symbol numbers 0 to 13 in the time direction and 12 subcarriers denoted by subcarrier numbers 0 to 11 in the frequency direction. In a case where the system bandwidth includes multiple predetermined resources, the subcarrier numbers are allocated throughout the system bandwidth.

The resource elements indicated by C1 to C4 denote reference signals (CSI-RS) for measuring transmission path states of antenna ports 15 to 22. The resource elements indicated by D1 and D2 denote the DL-DMRS of CDM group 1 and that of CDM group 2, respectively.

Figure 9:
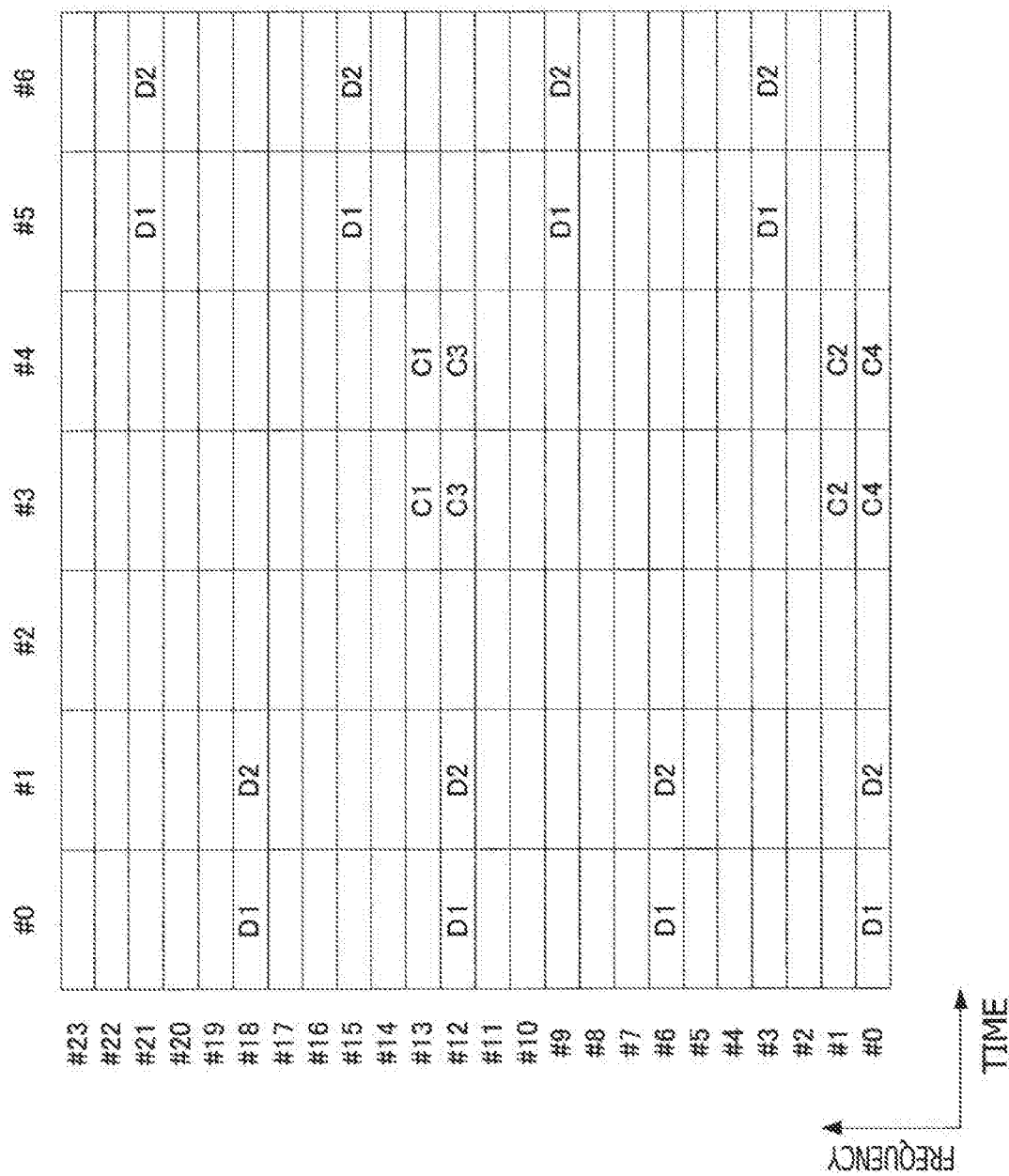
FIG. 9 is a schematic diagram depicting another example of downlink resource element mapping of NR in the embodiment.

FIG. 9 depicts another example of downlink resource element mapping of NR in the present embodiment. Illustrated in in FIG. 9 is a set of resource elements in predetermined resources in a case where parameter set 1 is used. The resources depicted in FIG. 9 are constituted by the same time lengths and frequency bandwidths as those of one resource block pair in LTE.

In the example of FIG. 9, the predetermined resources include 7 OFDM symbols indicated b OFDM symbol numbers 0 to 6 in the time direction and 24 subcarriers denoted by subcarrier numbers 0 to 23 in the frequency direction. In a case where the system bandwidth includes multiple predetermined resources, the subcarrier numbers are allocated throughout the system bandwidth.

The resource elements indicated by C1 to C4 denote reference signals (CSI-RS) for measuring transmission path states of antenna ports 15 to 22. The resource elements indicated by D1 and D2 denote the DL-DMRS of CDM group 1 and that of CDM group 2, respectively.

Figure 10:
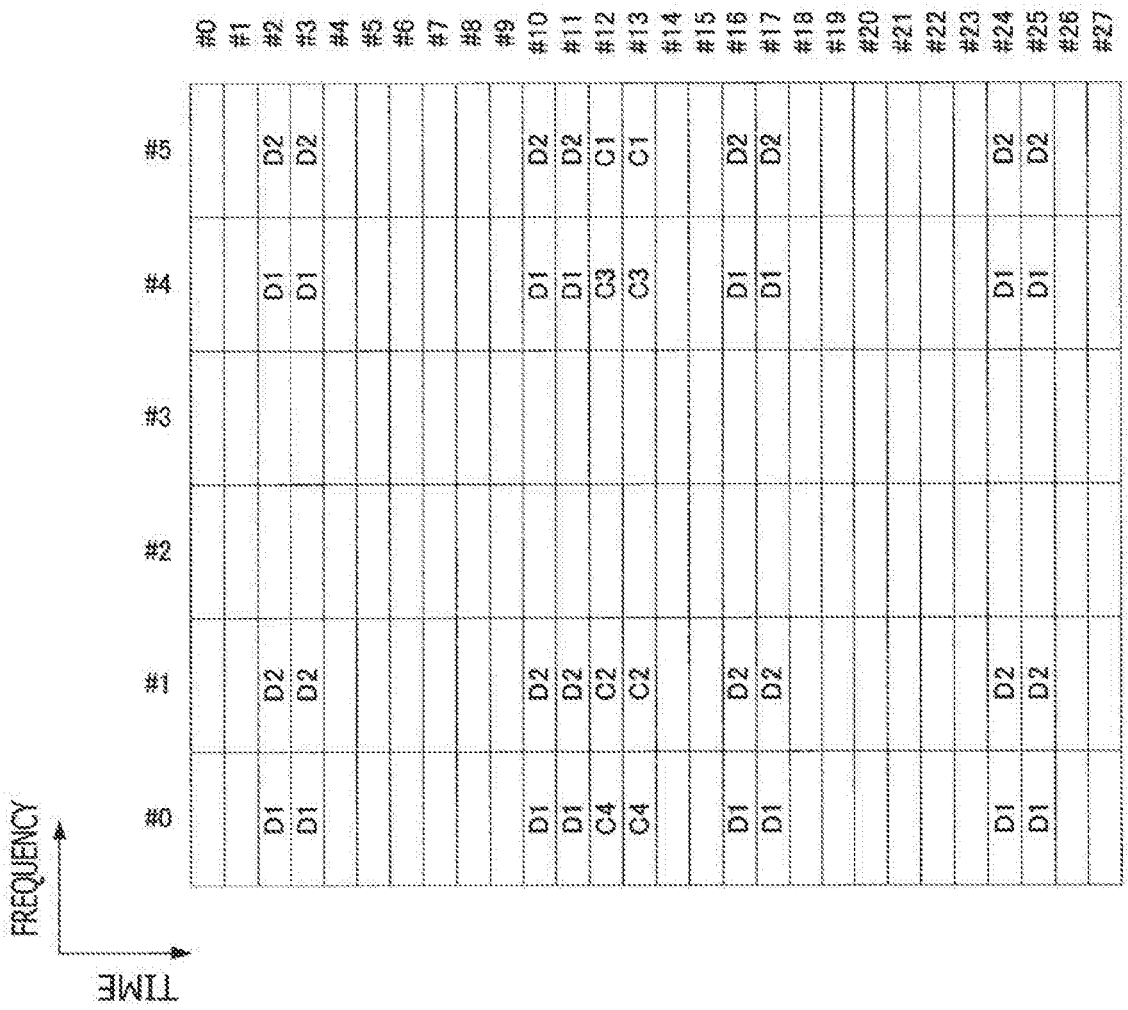
FIG. 10 is a schematic diagram depicting yet another example of downlink resource element mapping of NR in the embodiment.

FIG. 10 depicts yet another example of downlink resource element mapping of NR in the present embodiment. Illustrated in FIG. 10 is a set of resource elements in predetermined resources in a case where parameter set 1 is used. The resources depicted in FIG. 10 are constituted by the same time lengths and frequency bandwidths as those of one resource block pair in LTE.

In the example of FIG. 10, the predetermined resources include 28 OFDM symbols indicated by OFDM symbol numbers 0 to 27 in the time direction and 6 subcarriers denoted by subcarrier numbers 0 to 6 in the frequency direction. In a case where the system bandwidth includes multiple predetermined resources, the subcarrier numbers are allocated throughout the system bandwidth.

The resource elements indicated by C1 to C4 denote reference signals (CSI-RS) for measuring transmission path states of antenna ports 15 to 22. The resource elements indicated by D1 and D2 denote the DL-DMRS of CDM group 1 and that of CDM group 2, respectively.

Frame Configuration of NR in the Present Embodiment

Figure 11:
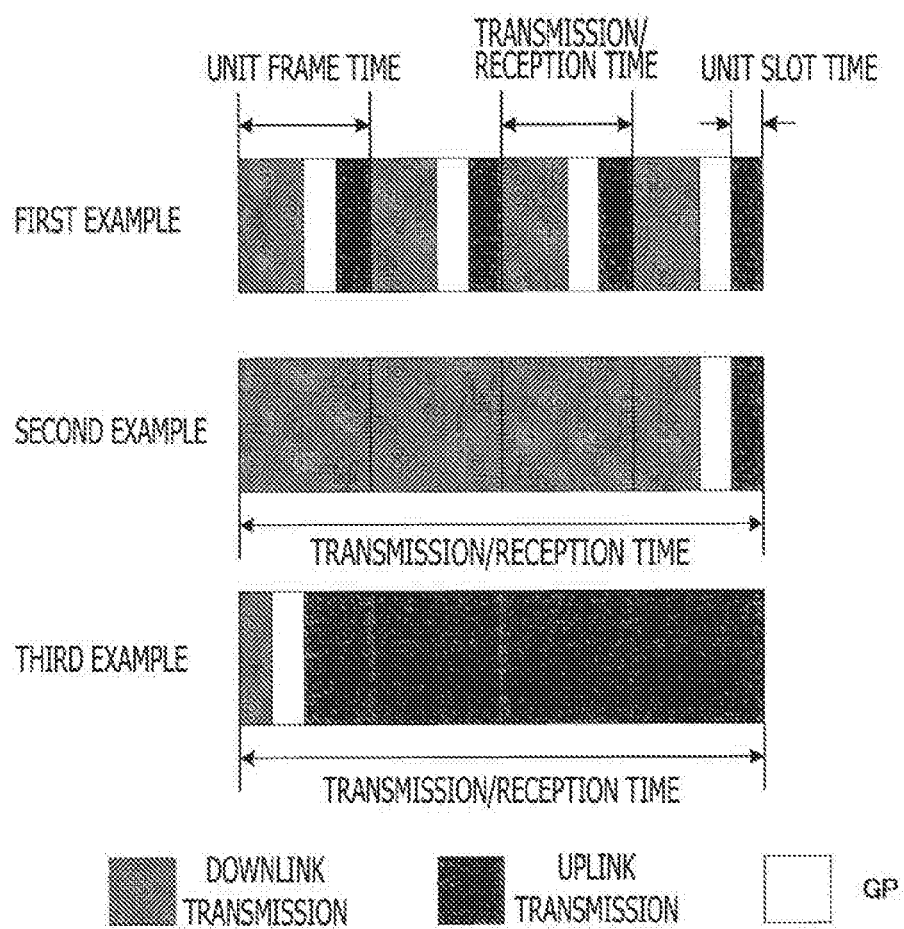
FIG. 11 is a schematic diagram depicting examples of the frame configuration for self-contained transmission in the embodiment.

In NR, a physical channel and/or a physical signal may be transmitted through self-contained transmission. FIG. 11 depicts examples of the frame configuration for self-contained transmission in the present embodiment. In the self-contained transmission, a single transmission/reception is configured with a consecutive downlink transmission, a GP, and a consecutive downlink transmission, in that order. The consecutive downlink transmission includes at least one piece of downlink control information and a DMRS. The downlink control information gives an instruction to receive a downlink physical channel included in the consecutive downlink transmission or to transmit an uplink physical channel included in the consecutive uplink transmission. In a case where the downlink control information gives the instruction to receive the downlink physical channel, the terminal apparatus 2 attempts to receive the downlink physical channel on the basis of the downlink control information. Then the terminal apparatus 2 transmits information indicating whether the downlink physical channel is successfully received (successfully decoded) through the uplink control channel included in the uplink transmission allocated subsequent to the GP. On the other hand, in a case where the downlink control information gives the instruction to transmit the uplink physical channel, the uplink physical channel to be transmitted on the basis of the downlink control information is included in the uplink transmission when the latter is transmitted. Thus the downlink control information provides flexible switching between uplink data transmission and downlink data transmission in a manner responding instantaneously to the increase or decrease in the ratio between uplink traffic and downlink traffic. Further, the notification of whether the downlink channel is successfully received is given by the immediately succeeding uplink transmission. This provides low latency downlink communication.

A unit slot time is a minimum time unit in which to define the downlink transmission, GP, or uplink transmission. The unit slot time is reserved for any one of the downlink transmission, GP, and uplink transmission. The downlink transmission and the uplink transmission are not included together in the unit slot time. The unit slot time may also be used as a minimum transmission time for the channel associated with the DMRS in that unit slot time. One unit slot time is defined, for example, as an integer multiple of a sampling interval (Ts) or a symbol length of NR.

A unit frame time may be a minimum time designated by scheduling. The unit frame time may also be a minimum unit in which a transport block is transmitted. The unit slot time may also be a maximum transmission time for the channel associated with the DMRS included in that unit slot time. The unit frame time may also be a unit time for determining uplink transmission power in the terminal apparatus 2. The unit frame time may be referred to as a subframe. The unit frame time comes in three types: a unit frame time for a downlink transmission only, a unit frame time for an uplink transmission only, and a unit frame time for a combination of uplink and downlink transmissions. One unit frame time is defined, for example, as an integer multiple of a sampling interval (Ts), a symbol length, or a unit slot time of NR.

A transmission/reception time is a time of a single transmission/reception. The interval between a single transmission/reception on one hand and another transmission/reception on the other hand is occupied by a time (gap) in which neither a physical channel nor a physical signal is transmitted. It is not preferred that the terminal apparatus 2 average CSI measurements between different transmission/receptions. The transmission/reception time may also be referred to as a TTI. One transmission/reception time is defined, for example, as an integer multiple of a sampling interval (Ts), a symbol length, a unit slot time, or a unit frame time of NR.

Non-Orthogonal Multiple Access (NOMA)

Figure 12:
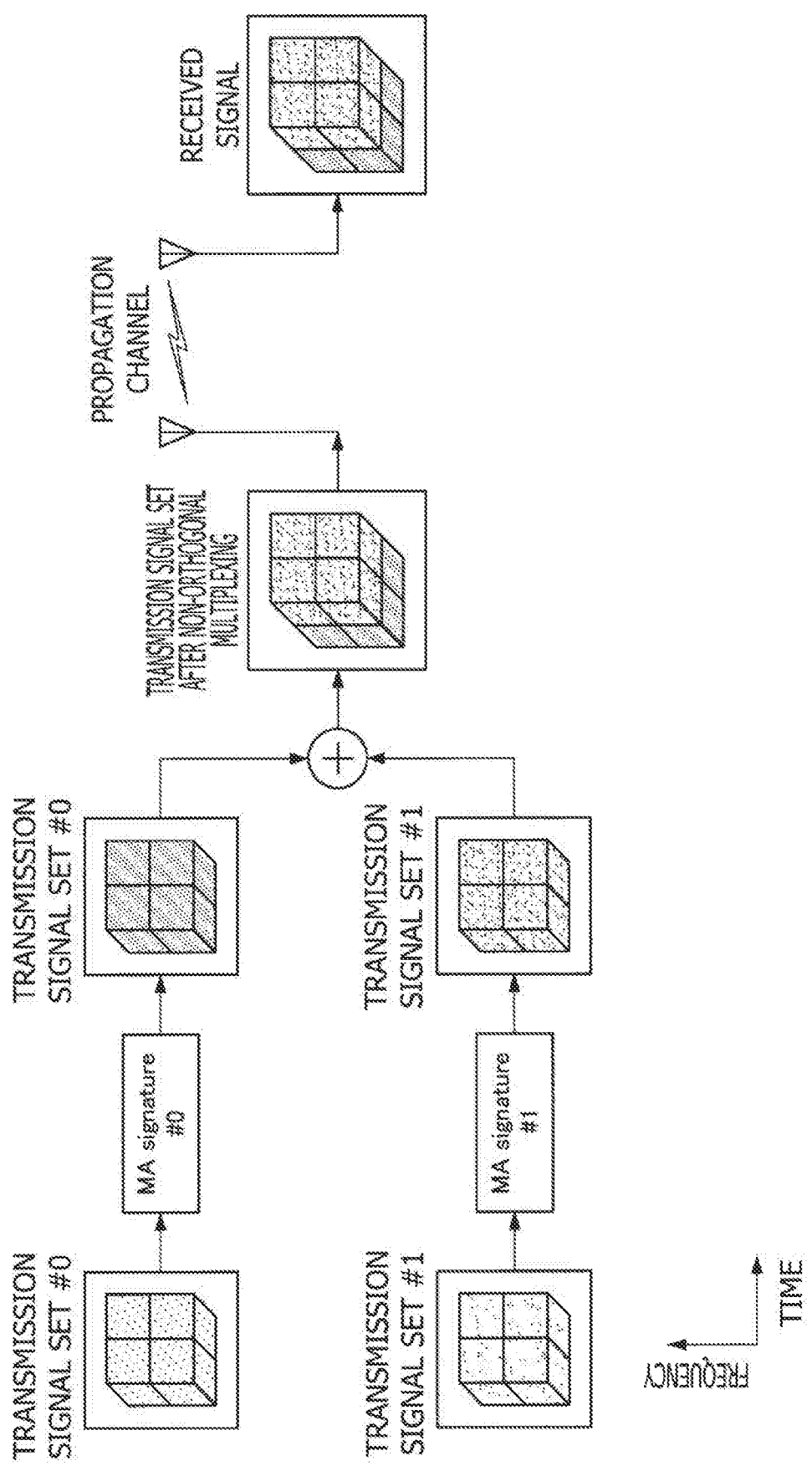
FIG. 12 is an explanatory diagram depicting parameter sets with which a transmission apparatus multiplexes transmission signals on non-orthogonal axes in a case where the resources multiplexed on the non-orthogonal axes are the same for all parameter sets.
Figure 13:
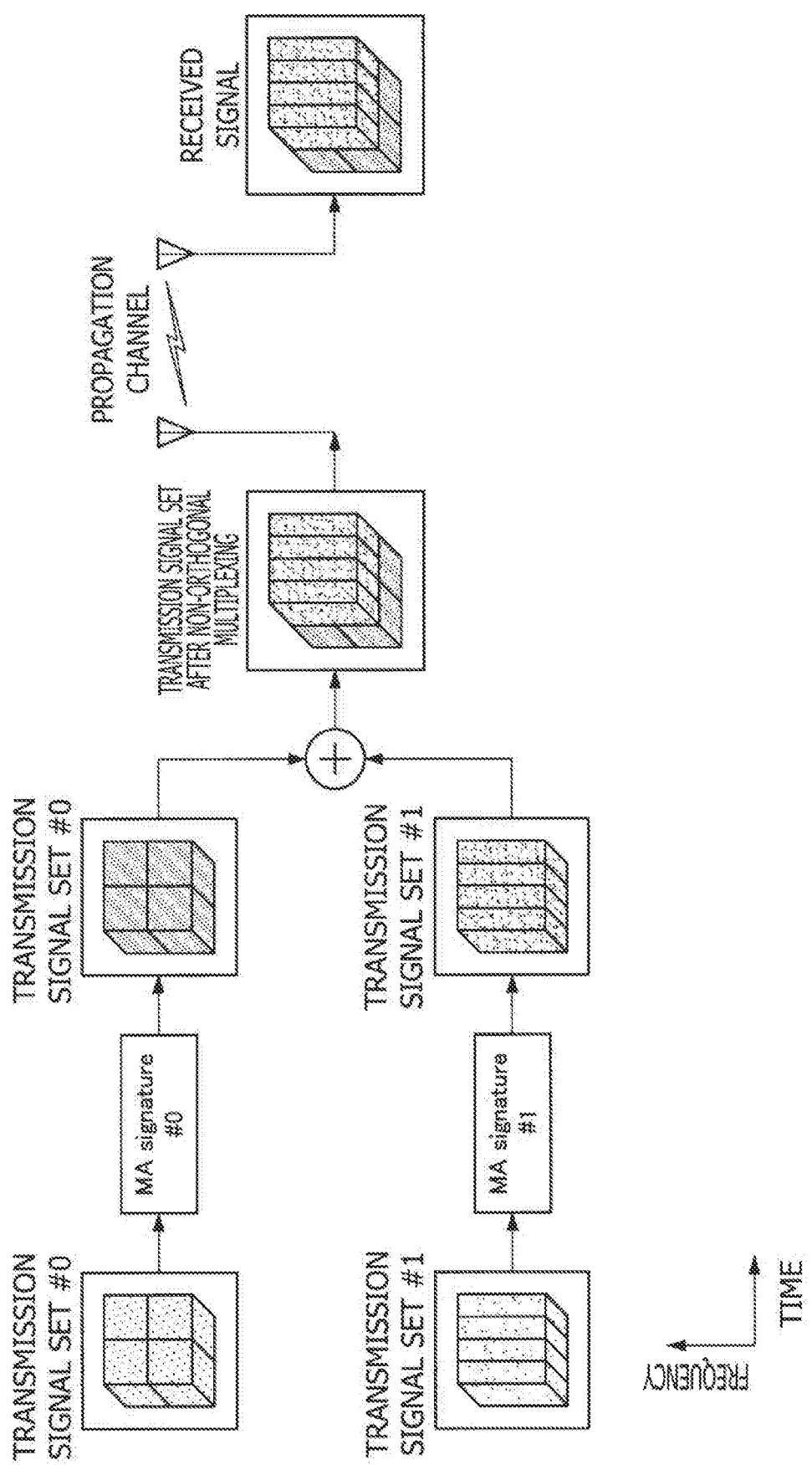
FIG. 13 is an explanatory diagram depicting parameter sets with which a transmission apparatus multiplexes transmission signals on non-orthogonal axes in a case where the resources multiplexed on the non-orthogonal axes are different for all parameter sets.

In orthogonal multiple access (OMA) transmission, transmission and reception are performed using, for example, a frequency axis and a time axis orthogonal to each other. At this time, a frame configuration of frequency and time resources is determined on the basis of the subcarrier interval. It is impossible to use resources more numerous than the resource elements. On the other hand, in NOMA transmission, the frame configuration is determined on the basis of non-orthogonal axes such as an interleave pattern axis, a spreading pattern axis, a scrambling pattern axis, a codebook axis, and a power axis in addition to the orthogonally intersecting frequency axis and time axis. For example, FIG. 12 depicts the case of a parameter set in which transmission signals are multiplexed on non-orthogonal axes by the transmission apparatus and in which all the resources multiplexed on the non-orthogonal axes are the same. Here, the transmission apparatus refers to either the base station apparatus 1 or the terminal apparatus 2. The transmission apparatus prepares multiple transmission signal sets to be multiplexed. In FIG. 12, two transmission signal sets are assumed to be multiplexed. Although two transmission signal sets are used in the case of FIG. 12, three or more transmission signal sets may be used instead. Further, the transmission signal sets may each be addressed to a different reception apparatus or to the same reception apparatus. Here, the reception apparatus refers to either the base station apparatus 1 or the terminal apparatus 2. To each of the transmission signet sets, a corresponding multiple access (MA) signature is applied. Here, exemplary MA signatures include an interleave pattern, a spreading pattern, a scrambling pattern, a codebook, power allocation, and repetition. Although the term "MA signature" is used here, some other simple term such as a pattern or an index may be used instead. The term refers to the identifier such as a pattern or an index used in the above-cited NOMA transmission or to the pattern itself. Signals after application of the MA signatures are multiplexed on the same frequency and time resources before being sent to the same antenna port. Whereas in FIG. 12 the transmission signal sets of the same parameter set are multiplexed, transmission signal sets of different parameter sets may be multiplexed instead as depicted in FIG. 13. What is illustrated in FIG. 13 is the same as in FIG. 13 except that transmission signal sets of different parameters are multiplexed.

Figure 14:
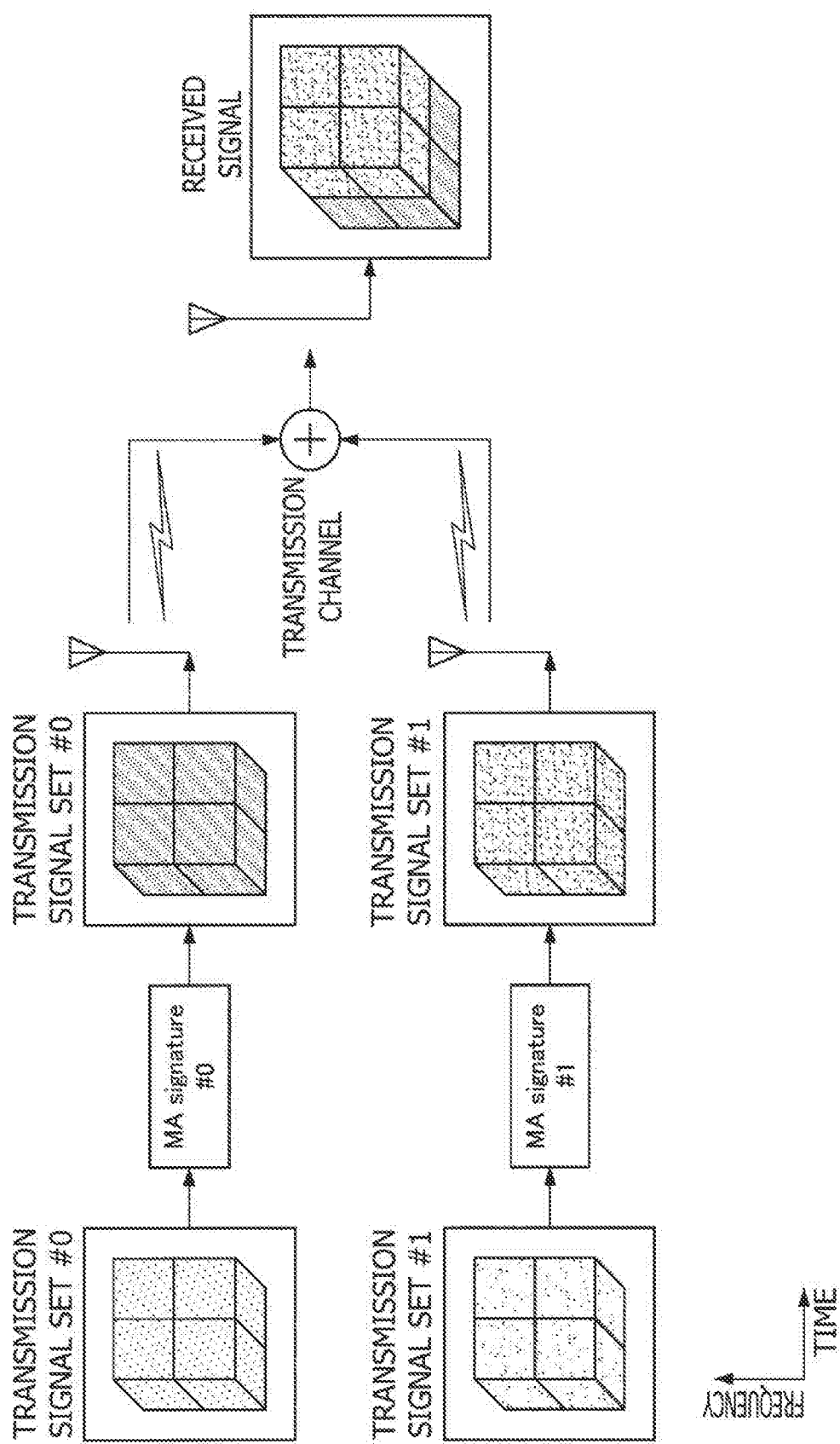
FIG. 14 is an explanatory diagram depicting an example in which a transmission apparatus transmits signals using MA signatures without recourse to multiplexing.
Figure 15:
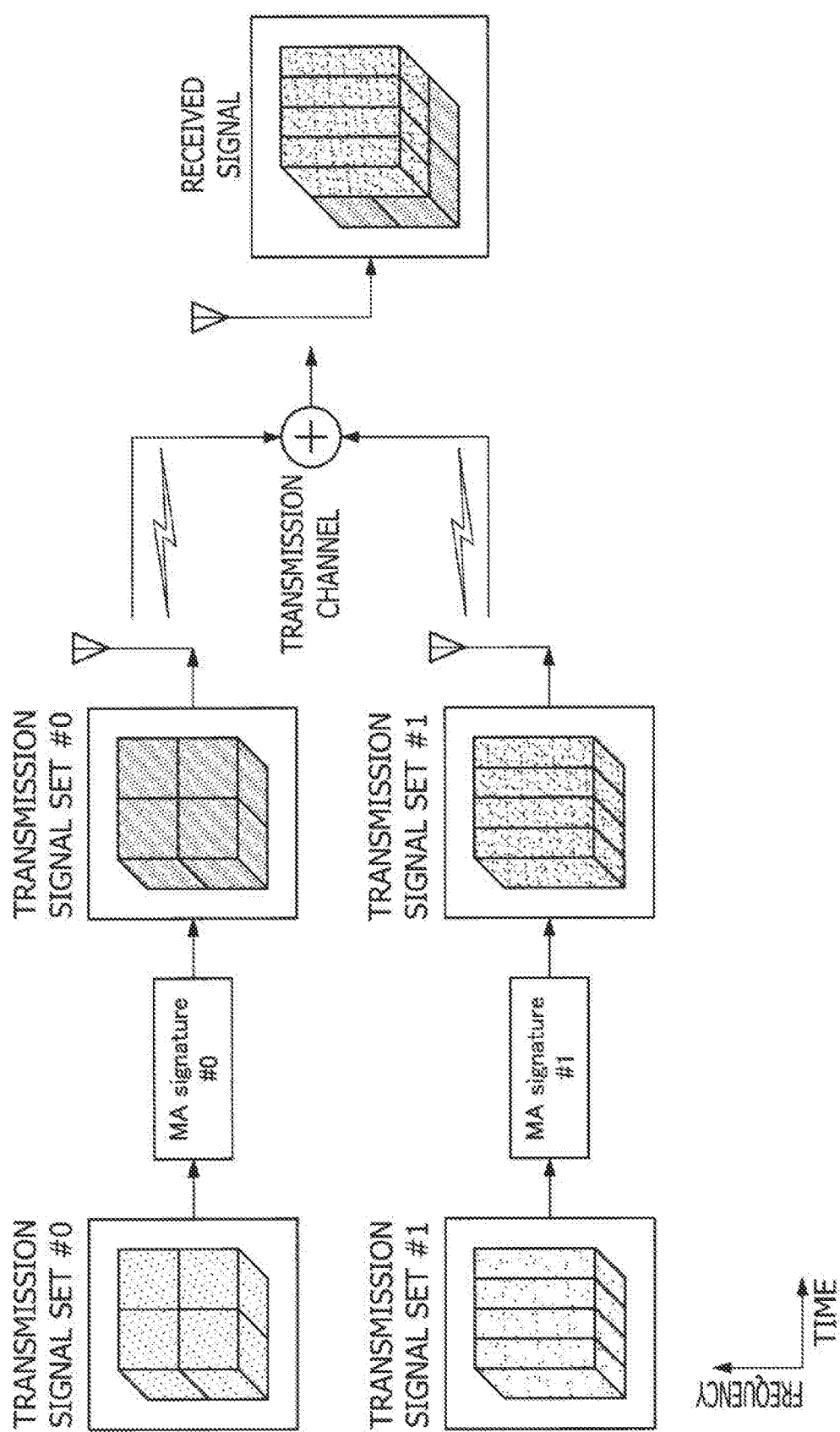
FIG. 15 is an explanatory diagram depicting another example in which a transmission apparatus transmits signals using MA signatures without recourse to multiplexing.

On the other hand, as depicted in FIGS. 14 and 15, a transmission method is considered by which signals with MA signatures applied thereto are transmitted without being multiplexed by the transmission apparatus so that the signals are subjected to non-orthogonal multiplexing by the reception apparatus. To each of the transmission signal sets, the corresponding MA signature is applied. Here, exemplary MA signatures include an interleave pattern, a spreading pattern, a scrambling patter, a codebook, power allocation, and repetition. The signals after application of the MA signatures are transmitted on the same frequency and time resources and multiplexed through a propagation channel. In this case, the transmission signal sets may each be transmitted by a different transmission apparatus. Further, as depicted in FIG. 15, the parameter sets of the transmission signals transmitted on the same frequency and time resources may be different parameter sets.

Figure 16:
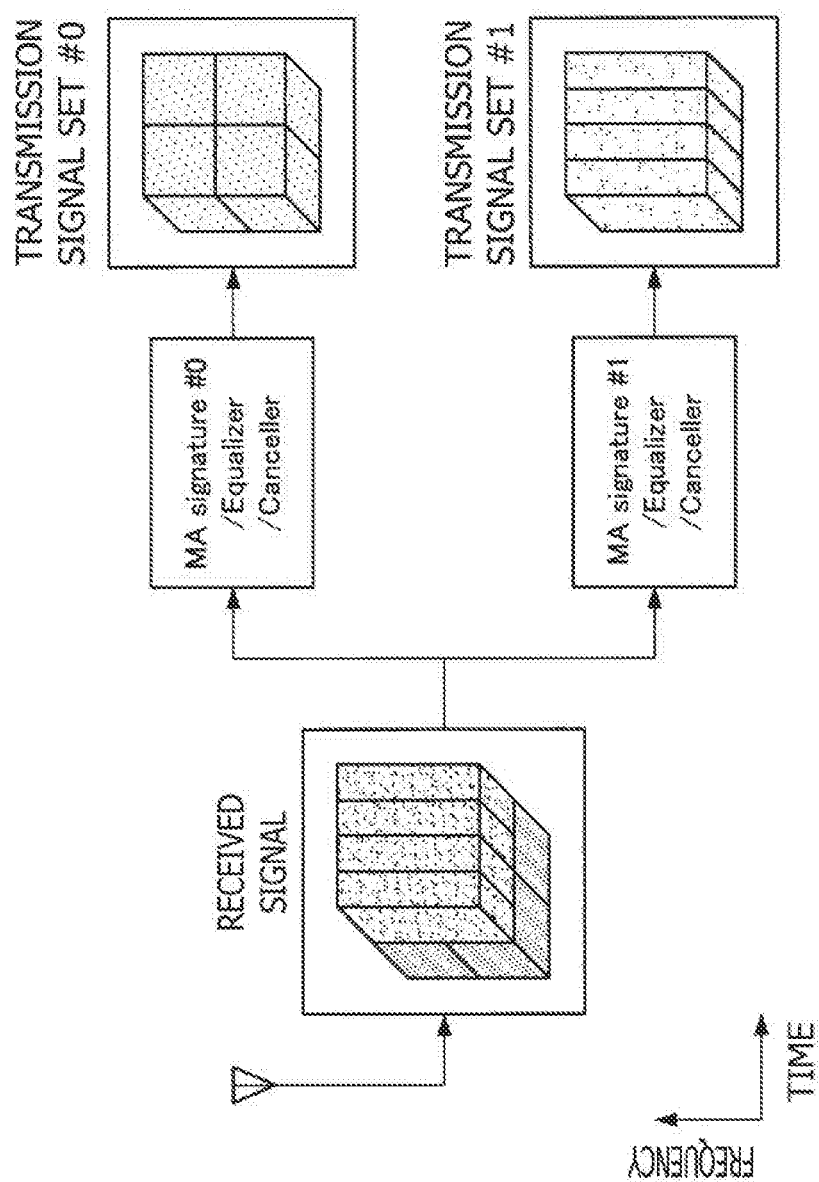
FIG. 16 is an explanatory diagram depicting an example of a reception apparatus.

FIG. 16 depicts an example of the reception apparatus. As illustrated in FIG. 16, a received signal arrives in a state in which multiple transmission signals are multiplexed on the same frequency and time resources. The reception apparatus applies the MA signatures adopted by the transmission apparatus to decoding the multiplexed transmission signal sets, thereby extracting desired signals through channel equalization and by an interference signal canceller. At this time, if the signals are multiplexed using the same MA signature, the effect of interference between the multiplexed signals increases, which makes signal decoding difficult.

As described above, NOMA transmission requires that the transmission apparatus and the reception apparatus share the applied MA signatures therebetween and that the MA signatures be applied without duplication. Where the term "resources" is used in the ensuing discussion, the MA signature will be assumed to be included as one of the resources. It is to be noted here that the resources including the frequency, time, and MA signatures altogether may be referred to as multiple access (MA) resources and that the resources of the frequency and time only may be referred to as multiple access (MA) physical resources hereunder.

Grant-Free Transmission

Figure 17:
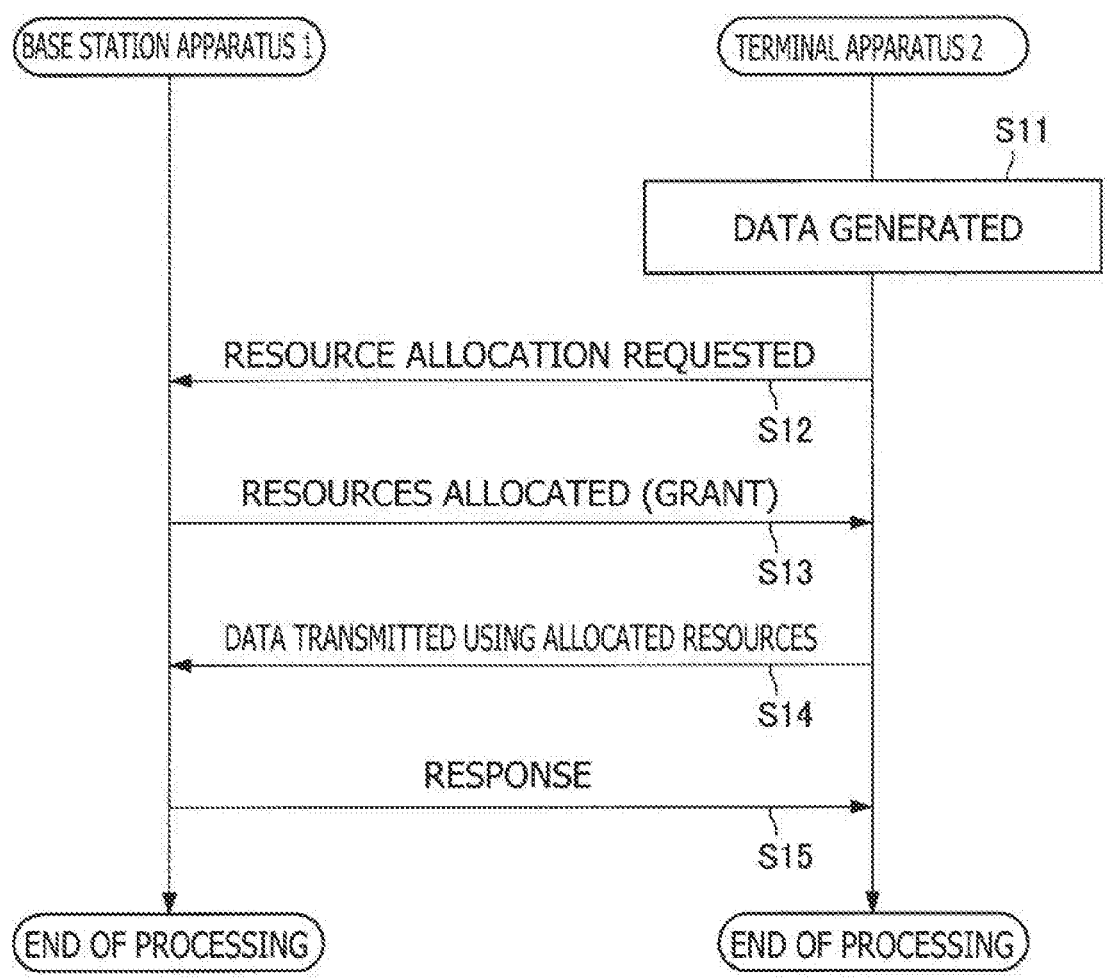
FIG. 17 is a flowchart depicting an example of grant-based transmission.

Grant-free transmission signifies that the terminal apparatus 2 performs transmission using the resources partitioned by suitable frequency and time axes without receiving the resource allocation (i.e., grant) from the base station apparatus 1. That is, grant-free transmission means data transmission being carried out with no grant included in the downlink control information. The base station apparatus 1 may designate beforehand frequency and time resource candidates that are selectable by the terminal apparatus 2. The main objective of grant-free transmission is to reduce signaling overhead so as to bring about reduced power consumption of the terminal apparatus 2 and implement low latency communication thereby. Heretofore, the base station apparatus 1 has notified the terminal apparatus 2 of the resources for use in uplink and sidelink, thereby permitting communication without resource conflict with other terminal apparatuses 2. On the other hand, such notification generates signaling overhead of its own. FIG. 17 is a flowchart depicting an example of grant-based transmission. In the case of grant-based transmission depicted in FIG. 17, for example, when data is generated in the terminal apparatus 2 (step S11), the terminal apparatus 2 outputs a resource allocation request to the base station apparatus 1 (step S12). Given the resource allocation request, the base station apparatus 1 allocates resources to the terminal apparatus 2 (step S13). Using the resources allocated by the base station apparatus 1, the terminal apparatus 2 transmits the data (step S14). The base station apparatus 1 returns a response (step S15). The transmission here entails those amounts of signaling overhead incurred in steps S12 and S13.

Figure 18:
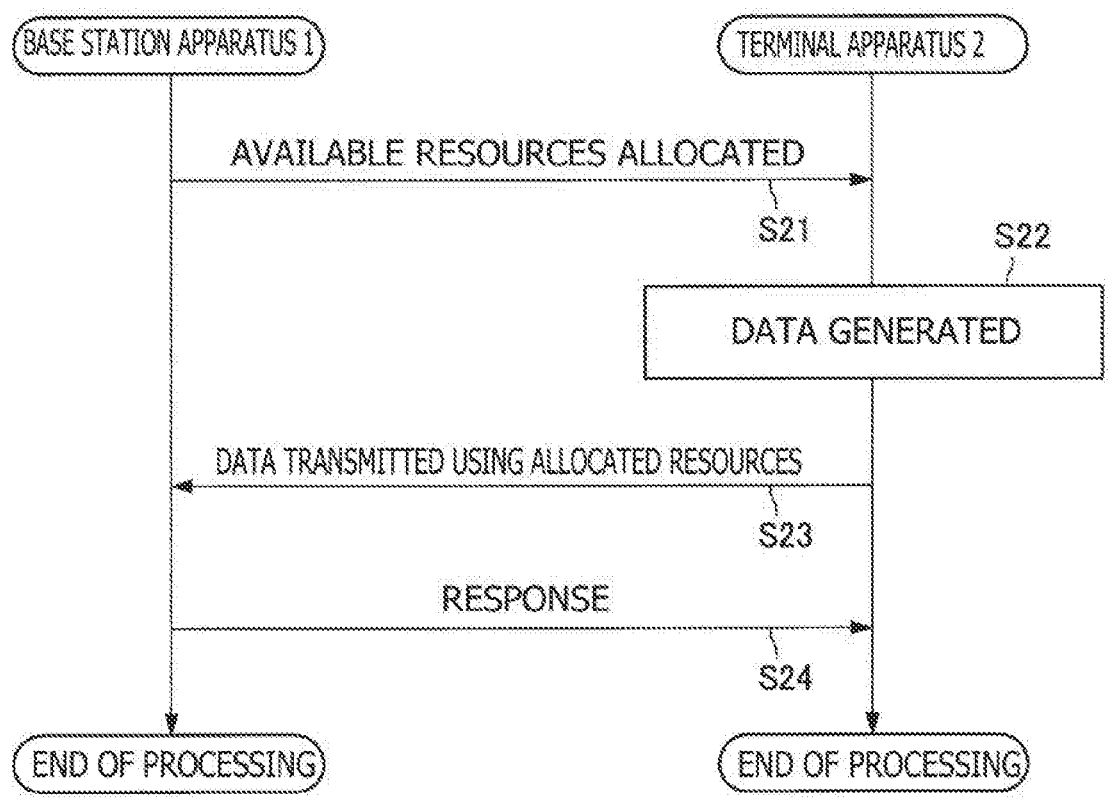
FIG. 18 is a flowchart depicting an example of grant-free transmission.

FIG. 18 is a flowchart depicting an example of grant-free transmission. In the case of grant-free transmission depicted in FIG. 18, the processing of steps S12 and S13 in FIG. 17 is eliminated. Specifically, the base station apparatus 1 allocate available resources to the terminal apparatus 2. Given a resource allocation request, the base station apparatus 1 allocates resources to the terminal apparatus 2 (step S21). When data is generated in the terminal apparatus 2 (step S22), the terminal apparatus 2 transmits the data using the resources allocated by the base station apparatus 1 (step S23). The base station apparatus 1 returns a response (step S24). Thus the grant-free transmission with no need for the notification of resource allocation is considered a promising technology candidate for implementing reduced power consumption and low latency communication required of next-generation communication. The transmission resources for grant-free transmission may be selected from all available bandwidth or from the resources designated beforehand by the base station apparatus 1.

Here, enabling the terminal apparatus 2 to switch between OMA transmission and NOMA transmission offers the following advantages:

In the case of performing NOMA transmission, the terminal apparatus 2 applies the above-mentioned MA signatures. Whereas NOMA transmission is expected to improve frequency usage efficiency, the transmitting side needs to perform the MA signature application process and the receiving side is required to carry out the interference cancelation process. Furthermore, depending on the MA signature type, there may be cases in which more time and frequency resources are needed than in OMA transmission. One exemplary case is when spreading and repetition are used as the MA signatures. In the case of a shortage of transmission resources for OMA transmission, NOMA transmission is very effective. On the other hand, where sufficient resources are available for OMA transmission, OMA transmission may be better than NOMA transmission in view of the processing load of the transmission and reception terminals and the usage efficiency of time and frequency resources. This is the advantage of switching from NOMA transmission to OMA transmission.

In the case of performing OMA transmission, the terminal apparatus 2 is required to use time and frequency resources different from those of other terminal apparatuses. This can lead to a shortage of time and frequency resources in cases where numerous terminal apparatuses transmit data. Given a shortage of time and frequency resources, the terminal apparatus 2 may attempt transmission at the next transmission timing. This, however, results in a transmission delay. Thus when using NOMA transmission, the terminal apparatus 2 needs to deal with the processing load of interference cancelation but is able to use non-orthogonal resources in addition to the time and frequency resources. This makes it possible to increase the number of terminal apparatuses allowed to perform transmission. This is the advantage of switching from OMA transmission to NOMA transmission.

Sequence of Switching Between NOMA Transmission and OMA Transmission

Figure 19:
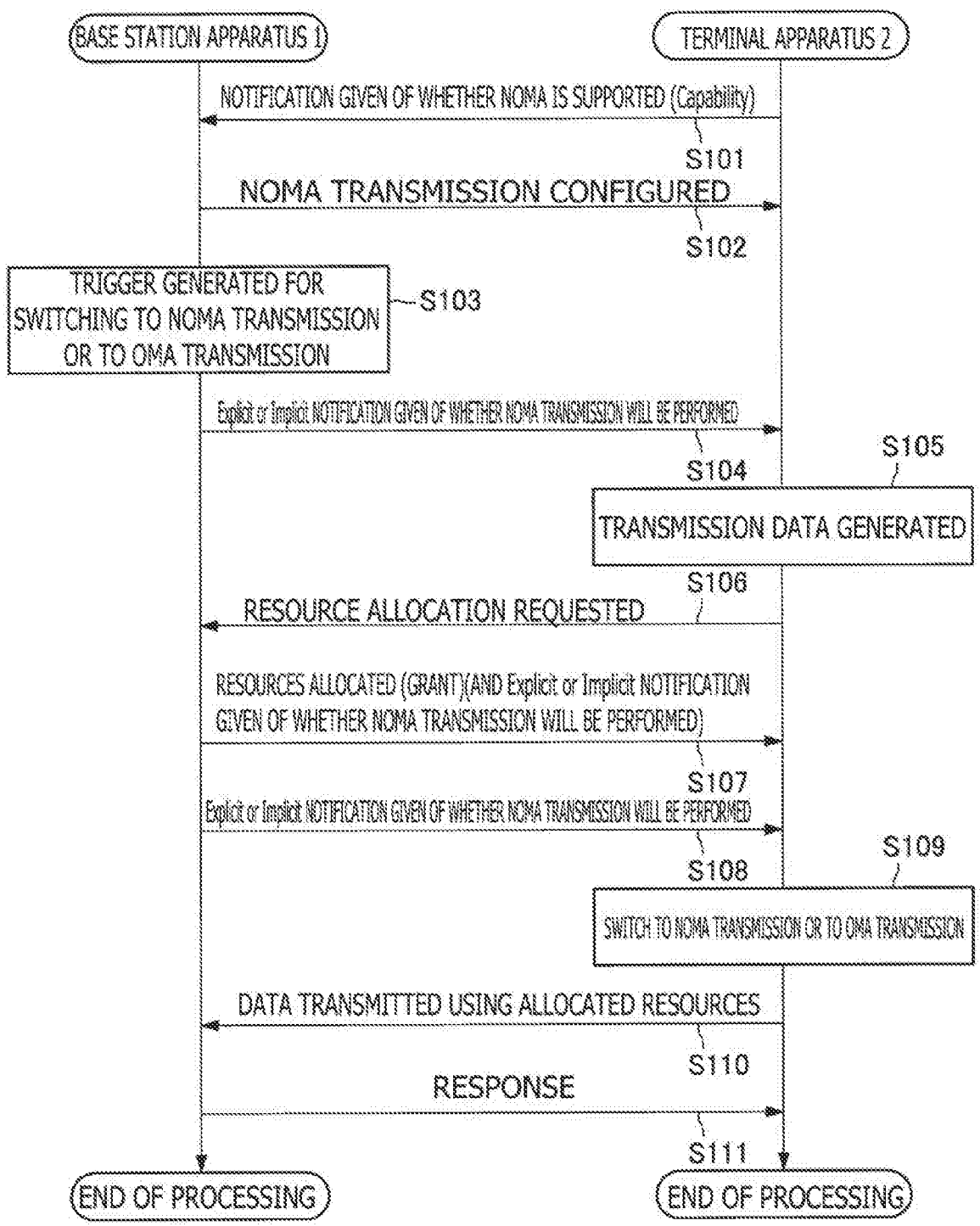
FIG. 19 is a flowchart depicting an exemplary sequence of switching between NOMA transmission and OMA transmission in a case where the terminal apparatus 2 performs grant-based uplink transmission.

FIG. 19 depicts an exemplary sequence of switching between NOMA transmission and OMA transmission in a case where the terminal apparatus 2 performs grant-based uplink transmission. The series of processing is carried out by the control section 103 and by the control section 203, for example. First, the terminal apparatus 2 notifies the base station apparatus 1 whether the terminal apparatus 2 supports NOMA transmission (step S101). In a case where the terminal apparatus 2 supports NOMA transmission, the base station apparatus 1 configures NOMA transmission for the terminal apparatus 2 (step S102). Specifically, the base station apparatus 1 notifies the terminal apparatus 2 whether NOMA transmission is possible or whether NOMA transmission is always performed. In a case where the notification of permission to perform NOMA transmission is transmitted from the base station apparatus 1 to the terminal apparatus 2, the process of switching between NOMA transmission and OMA transmission is performed. For example, suppose that the base station apparatus 1 detects a trigger for switching between NOMA transmission and OMA transmission (step S103). After detecting the trigger, the base station apparatus 1 may immediately notify the terminal apparatus 2 whether to perform NOMA transmission (step S104). When transmission data is generated in the terminal apparatus 2 (step S105), the terminal apparatus 2 outputs a resource allocation request to the base station apparatus 1. The base station apparatus 1 allocates resources to the terminal apparatus 2 (step S107).

Alternatively, the base station apparatus 1 may notify the terminal apparatus 2 whether to perform NOMA transmission subsequent to the resource allocation request in step S106. As another alternative, the base station apparatus 1 may notify the terminal apparatus 2 whether to perform NOMA transmission subsequent to the resource allocation in step S107 (step S108).

In accordance with the notification from the base station apparatus 1, the terminal apparatus 2 selects either NOMA transmission or OMA transmission for transmitting the data to the base station apparatus 1 (step S109). The terminal apparatus 2 transmits the data to the base station apparatus 1 using the allocated resources (step S110). The base station apparatus 1 transmits to the terminal apparatus 2 a response (ACK or NACK) to the data transmission in step S110 (step S111).

The notification of whether to switch to NOMA transmission is given through the use of either explicitly conveyed information or implicit information associated with some other information. Described below are working examples of the trigger for switching between NOMA transmission and OMA transmission in step S103 and working examples of the switching between NOMA transmission and OMA transmission using explicit or implicit information in steps S104, S107, and S108.

Figure 20:
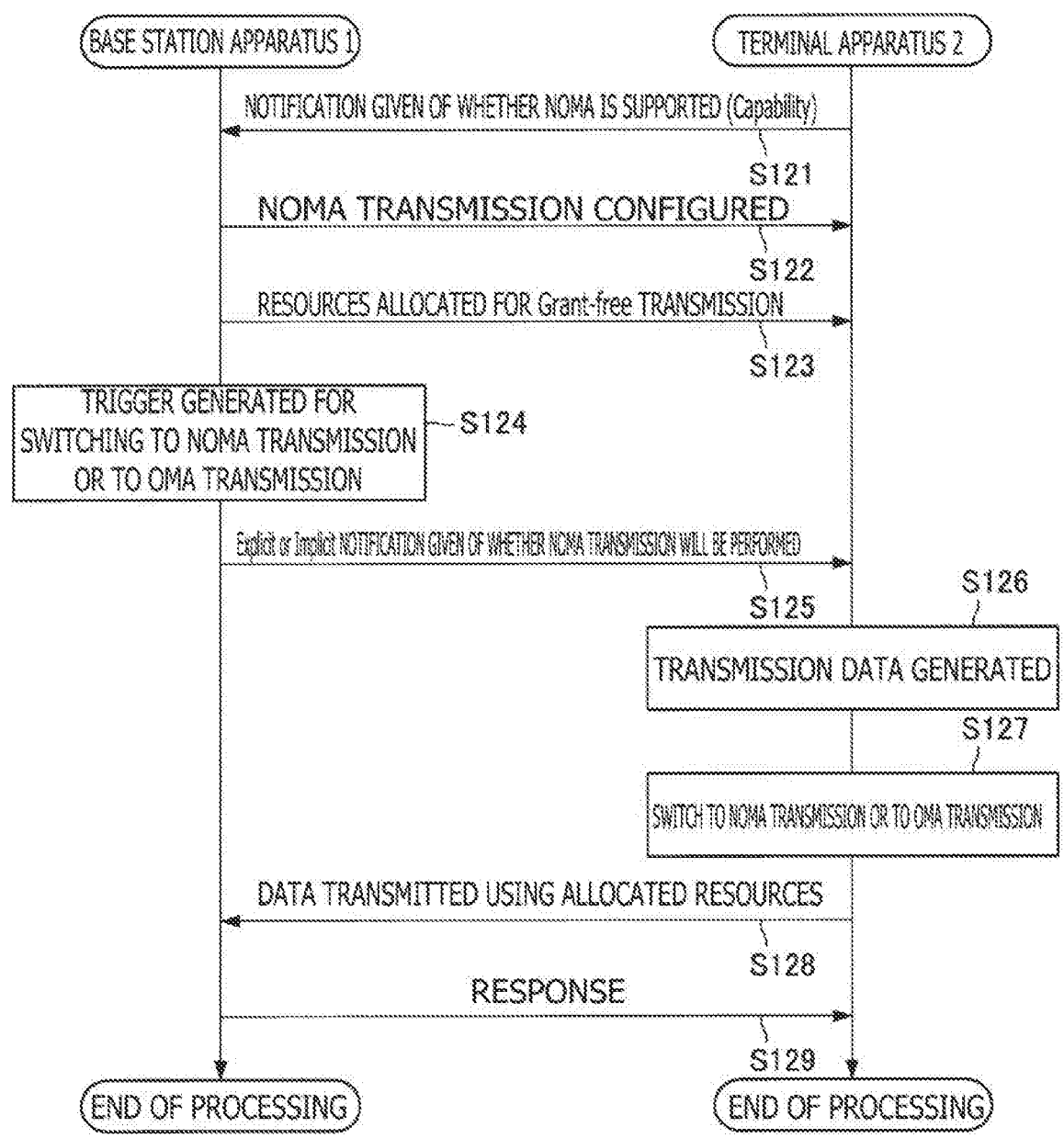
FIG. 20 is a flowchart depicting an exemplary sequence of switching between NOMA transmission and OMA transmission in a case where the terminal apparatus 2 performs grant-free uplink transmission.

FIG. 20 depicts an exemplary sequence of switching between NOMA transmission and OMA transmission in a case where the terminal apparatus 2 performs grant-free uplink transmission. The series of processing is carried out by the control section 103 and by the control section 203, for example. First, the terminal apparatus 2 notifies the base station apparatus 1 whether the terminal apparatus 2 supports NOMA transmission (step S121). In a case where the terminal apparatus 2 supports NOMA transmission, the base station apparatus 1 configures NOMA transmission for the terminal apparatus 2 (step S122). Specifically, the base station apparatus 1 notifies the terminal apparatus 2 whether NOMA transmission is possible or whether NOMA transmission is always performed. In a case where the notification of permission to perform NOMA transmission is transmitted from the base station apparatus 1 to the terminal apparatus 2, the process of switching between NOMA transmission and OMA transmission is carried out. The base station apparatus 1 allocates beforehand the resources for grant-free transmission to the terminal apparatus 2 (step S123). For example, suppose that the base station apparatus 1 detects a trigger for switching between NOMA transmission and OMA transmission (step S124). After detecting the trigger, the base station apparatus 1 notifies the terminal apparatus 2 whether to perform NOMA transmission (step S125). The notification of whether to switch to NOMA transmission is given through the use of either explicitly conveyed information or implicit information associated with some other information.

When transmission data is generated in the terminal apparatus 2 (step S126), the terminal apparatus 2 selects either NOMA transmission or OMA transmission for transmitting the data to the base station apparatus 1 in accordance with the notification from the base station apparatus 1 (step S127). The terminal apparatus 2 transmits the data to the base station apparatus 1 using the resources allocated for grant-free transmission (step S128). The base station apparatus 1 transmits to the terminal apparatus 2 a response (ACK or NACK) to the data transmission in step S128 (step S129).

Described below are working examples of the trigger for switching between NOMA transmission and OMA transmission in step S124 and working examples of the switching between NOMA transmission and OMA transmission using explicit or implicit information in step S125.

Examples of Trigger for Switching Between NOMA Transmission and OMA Transmission Described below are conceivable examples of the trigger for switching between NOMA transmission and OMA transmission in the base station apparatus 1. It is to be noted that these examples are not limitative of how the trigger is activated. The base station apparatus 1 may, using its own discretion, switch between NOMA transmission and OMA transmission.

(1) The Number of Users Accommodated in a Cell

For example, the number of users accommodated in a cell may be used as the trigger. In a case where the number of users accommodated in a cell reaches or exceeds a predetermined user count, there is presumably an increase in the traffic of the entire cell. In this case, the base station apparatus 1 may switch from OMA transmission to NOMA transmission to increase frequency usage efficiency.

(2) The Number of Users in a Beam

For example, the number of users accommodated in a beam may be used as the trigger. In a case where the number of users accommodated in the same beam reaches or exceeds a predetermined user count, there is presumably an increase in the traffic. In this case, the base station apparatus 1 may switch from OMA transmission to NOMA transmission to increase frequency usage efficiency.

(3) Where Uplink Transmission from the Terminal Apparatus was not Correctly Received For example, in a case where uplink transmission from the terminal apparatus 2 was not correctly received and where the transmission was NOMA transmission, the base station apparatus 1 may switch to OMA transmission. There is a possibility that interference from some other terminal apparatus 2 has prevented the base station apparatus 1 from correctly receiving the uplink transmission from the terminal apparatus 2. Thus by switching to OMA transmission free of interference from other terminal apparatuses 2, the base station apparatus 1 is more likely to receive a retransmission correctly.

Working Examples of the Notification of Switching Between NOMA Transmission and OMA Transmission Explained below are working examples of the notification of switching between NOMA transmission and OMA transmission, the notification being given by the base station apparatus 1.

(1) Explicit Notification (1-1) Switching by Explicit Notification Using System Information This working example involves giving notification of switching information using system information. The system information is conveyed by broadcast or multicast. Thus some or all of the terminal apparatuses 2 accommodated in the base station apparatus 1 switch between NOMA transmission and OMA transmission on the basis of the system information.

For example, the information conveyed by the system information may be an information bit indicative of either NOMA transmission or OMA transmission. By broadcast or multicast, the base station apparatus 1 gives the notification using predetermined system information including the information bit indicative of either NOMA transmission or OMA transmission. Upon receipt of the notification from the base station apparatus 1, multiple terminal apparatuses 2 can switch between NOMA transmission and OMA transmission.

There may be a case in which the terminal apparatus 2 is incapable of correctly receiving the system information. The terminal apparatus 2 may be configured not to perform NOMA transmission or OMA transmission in a case where the system information was not correctly received. In a case where the system information was correctly received, the terminal apparatus 2 determines whether to perform NOMA transmission or OMA transmission on the basis of the system information.

There may also be a case in which the system information transmitted from the base station apparatus 1 does not include the information indicative of NOMA transmission or OMA transmission. The terminal apparatus 2 may be configured not to perform NOMA transmission or OMA transmission if the system information does not include such information. In a case where the system information includes such information, the terminal apparatus 2 switches between NOMA transmission and OMA transmission in accordance with the information.

(1-2) Switching by Explicit Notification Through RRC Signaling

This working example involves giving notification of the switching information through RRC signaling. The terminal apparatus 2 performs switching on the basis of the information included in the RRC signaling regarding the switching between NOMA transmission and OMA transmission.

For example, the information conveyed by RRC signaling may include the information bit indicative of NOMA transmission or OMA transmission, or information giving an instruction to switch from the current access method to the other access method. The instruction to switch to the other access method involves, for example, switching to OMA transmission from the current access method of NOMA transmission upon receipt of a switching instruction bit.

There may also be a case in which RRC signaling is not correctly received. In a case where RRC signal was not correctly received but suitable information was conveyed by the system information for example, the terminal apparatus 2 may obey the conveyed information. In a case where the suitable information is not conveyed by the system information or where the system information itself is not received, the terminal apparatus 2 may be configured not to perform NOMA transmission or OMA transmission. Further, there may be a case in which the RRC signal is correctly received but does not include the switching information therein. In that case, if the switching information is conveyed by the system information, the terminal apparatus 2 may be configured to obey the conveyed information. In a case where the switching information is not conveyed by the system information or where the system information itself is not received, the terminal apparatus 2 may be configured not to perform NOMA transmission or OMA transmission.

(1-3) Switching by Explicit Notification Using UE-Specific PDCCH

This working example involves the base station apparatus 1 giving notification of the switching information using a signal transmitted on the UE-specific PDCCH. The signal transmitted on the UE-specific PDCCH is a control signal that may be received by a specific user only.

For example, the base station apparatus 1 may add information indicative of NOMA transmission and OMA transmission to DCI before transmitting the DCI to the terminal apparatus 2. The terminal apparatus 2 switches between NOMA transmission and OMA transmission in accordance with the information conveyed by the DCI.

The base station apparatus 1 may add a bit sequence indicative of NOMA transmission or OMA transmission to an MCS table included in the DCI. As another alternative, the base station apparatus 1 may prepare an MCS table for NOMA or an MCS table for OMA.

The base station apparatus 1 may add a bit sequence indicative of NOMA transmission or OMA transmission or a bit sequence representing MA signatures to a bit sequence denoting the resource allocation. Here, the bit sequence representing the MA signatures may include a bit sequence indicating OMA and a bit sequence denoting an MA signature sequence in NOMA transmission.

Figure 21:
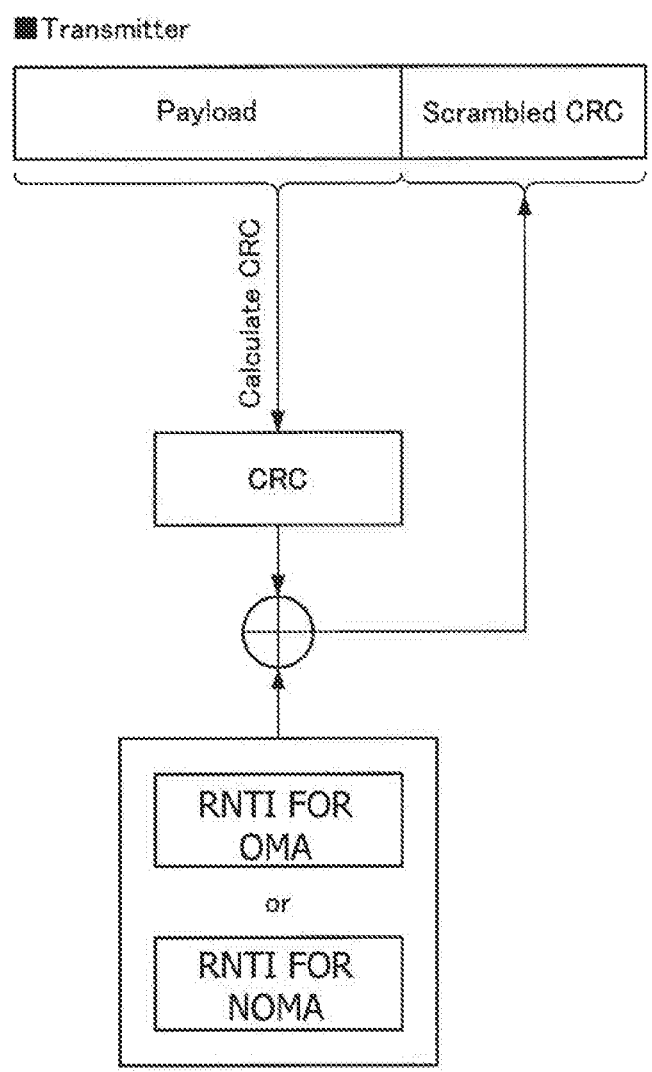
FIG. 21 is an explanatory diagram depicting a working example of how to determine on OMA transmission or on NOMA transmission using RNTI.
Figure 22:
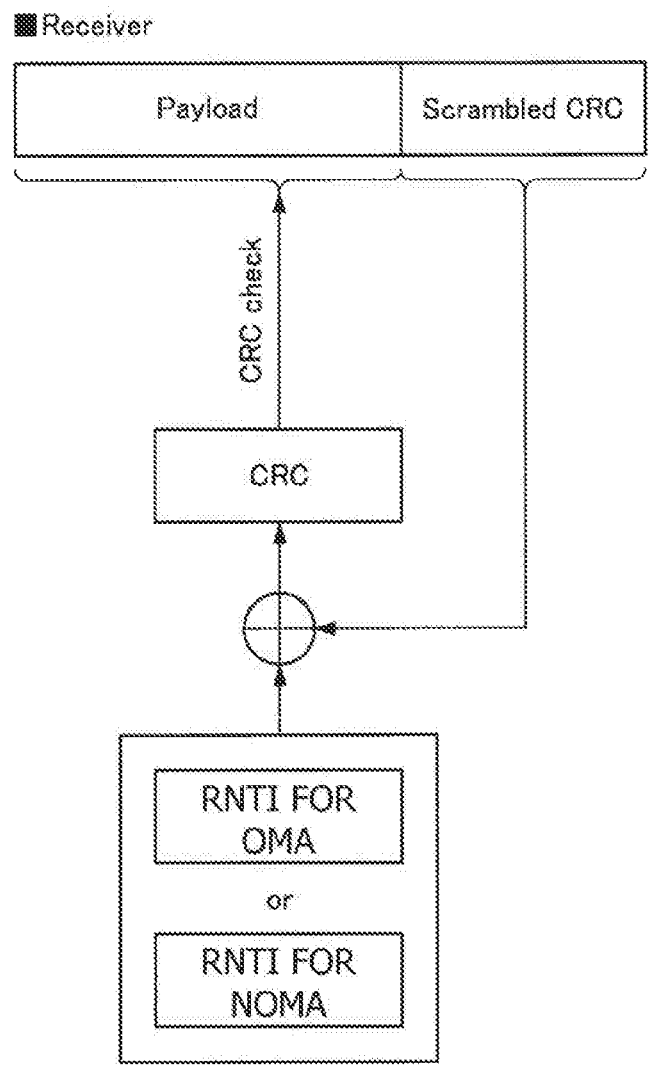
FIG. 22 is an explanatory diagram depicting another working example of how to determine on OMA transmission or on NOMA transmission using RNTI.

The base station apparatus 1 may differentiate the DCI format for OMA transmission and for NOMA transmission. The base station apparatus 1 may prepare a radio network temporary identifier (RNTI) for OMA and another RNTI for NOMA, while the terminal apparatus 2 may determine whether to switch to NOMA transmission or to OMA transmission by carrying out a CRC check on the respective RNTIs subsequent to DCI decoding. FIGS. 21 and 22 depict working examples of how to determine on OMA transmission or on NOMA transmission using the RNTI. FIG. 21 depicts an example of the determination on the transmitting side (i.e., transmitter such as the base station apparatus 1), and FIG. 22 illustrates an example of the determination on the receiving side (i.e., receiver such as the terminal apparatus 2). The base station apparatus 1 calculates the CRC from the payload of the DCI. In the case of designating OMA transmission by uplink, the base station apparatus 1 scrambles the CRC using the RNTI for OMA. When designating NOMA transmission by uplink, the base station apparatus 1 scrambles the CRC using the RNTI for NOMA. The base station apparatus 1 attaches the scrambled CRC to the payload for transmission to the terminal apparatus 2. After decoding the DCI, the terminal apparatus 2 descrambles the CRC using the RNTI for OMA and the RNTI for NOMA and submits what is descrambled to the CRC check. If the DCI has been correctly decoded, the checked CRC turns out to be correct from descrambling with either of the RNTIs. This enables the terminal apparatus 2 to find whether OMA transmission or NOMA transmission is used for uplink transmission.

(1-4) Switching by Explicit Notification Using Group-Common PDCCH

Figure 23:
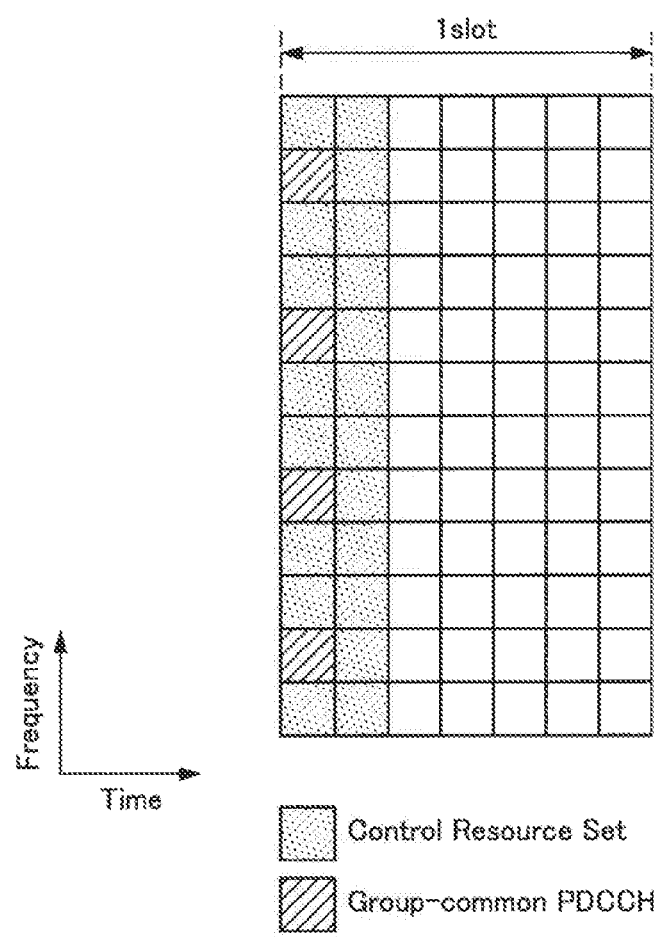
FIG. 23 is an explanatory diagram depicting an example of a group-common PDCCH.

This working example involves giving notification of the switching information using a signal transmitted on the group-common PDCCH. The signal transmitted on the group-common PDCCH is a control signal that can be received by a single or multiple users. FIG. 23 depicts an example of the group-common PDCCH. A control resource set (CORESET) in FIG. 23 is a domain in which the control information is transmitted. The group-common PDCCH is transmitted using part of the CORESET.

For example, the base station apparatus 1 gives notification using group-common DCI that includes the information regarding switching between NOMA transmission and OMA transmission for a single or multiple users. Also, the base station apparatus 1 gives notification using group-common DCI that includes the information regarding switching between NOMA transmission and OMA transmission, the information being common to a single or all of multiple users. The group-common DCI may be transmitted together with other information or may include only the information regarding switching between NOMA transmission and OMA transmission.

The base station apparatus 1 may prepare one RNTI for OMA and another RNTI for NOMA. The terminal apparatus 2 may then determine on switching to NOMA transmission or to OMA transmission by performing CRC checks using the respective RNTIs after decoding of the group-common DCI. Here, the group-common DCI to be scrambled may be either group-common DCI that does not include the information regarding switching between NOMA transmission and OMA transmission or group-common DCI that includes the information regarding switching between NOMA transmission and OMA transmission.

(2) Implicit Notifications (2-1) Switching by Implicit Notification Using Search Space This working example involves allocating the search space separately for NOMA and for OMA and thereby allowing the terminal apparatus 2 to determine on either NOMA transmission or OMA transmission. The terminal apparatus 2 performs blind decoding of the DCI to determine whether the DCI is addressed to the own apparatus. Here, the DCI may be UE-specific DCI or group-common DCI transmitted to multiple terminal apparatuses. In a case where the checked CRC turns out to be correct following the blind decoding, the terminal apparatus 2 determines that the DCI is addressed to the own apparatus. At this time, the terminal apparatus 2 determines on switching to either NOMA transmission or OMA transmission depending on whether the received DCI belongs to the search space for NOMA or to the search space for OMA.

Whereas the search space comes in two types, i.e., common search space and UE-specific search space, the type of the search space may be limited to either of the two types. For example, the search space type may be limited to the UE-specific search space or to the common search space. In a case where the search space type is limited to the UE-specific search space, for example, the terminal apparatus 2 performs blind decoding using the UE-specific search space for NOMA as well as the UE-specific search space for OMA.

Figure 24:
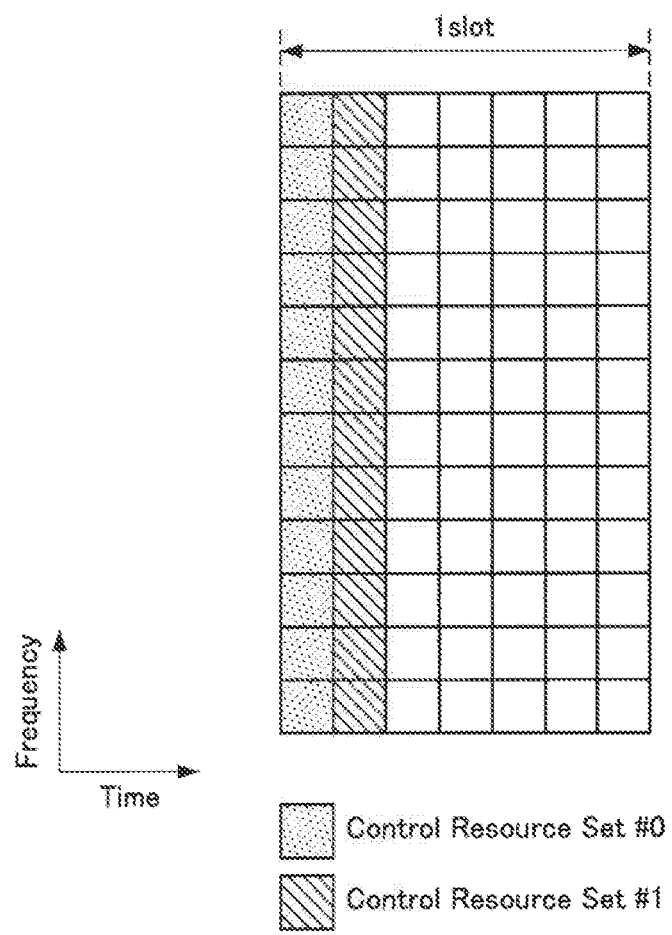
FIG. 24 is an explanatory diagram depicting an example of two CORESETs being included in a band.

The notification may be associated with the CORESET. One CORESET includes one or multiple search spaces. One band includes one or multiple CORESETs. For example, in a case where there are two CORESETs #0 and #1, CORESET #0 may be associated with NOMA transmission and CORESET #1 with OMA transmission. This allows the terminal apparatus 2 to determine on switching to either NOMA transmission or OMA transmission. FIG. 24 depicts an example of two CORESETs being included in a band. Whereas two CORESETs are multiplexed in the time direction in the example of FIG. 24, the CORESETs may be multiplexed in the frequency direction instead.

(2-2) Switching by Implicit Notification Using the Time and Frequency Resources Conveyed by Grant This working example involves switching to NOMA transmission or to OMA transmission depending on the time and frequency resources granted by the base station apparatus 1. If the time and frequency resources granted by the base station apparatus 1 are for NOMA transmission, the terminal apparatus 2 performs NOMA transmission. On the other hand, if the time and frequency resources granted by the base station apparatus 1 are for OMA transmission, the terminal apparatus 2 carries out OMA transmission. The association between the granted time and frequency resources on the one hand and NOMA transmission or OMA transmission on the other hand may be predetermined statically as part of the specifications involved or may be conveyed quasi-statically from the base station apparatus 1 to the terminal apparatus 2. For example, the association may be linked with the index of a subframe or a slot in the time direction, or with either a resource block in the frequency direction or the sources for grant-free transmission. For example, in a case where the grant-free transmission resources are allocated, the terminal apparatus 2 may perform NOMA transmission; otherwise the terminal apparatus 2 may carry out OMA transmission. It is to be noted that what was discussed above is only an example. This working example is applicable to any information regarding the granted time and frequency resources.

(2-3) Switching by Implicit Notification in Accordance with Grant-Free/Grant-Based Transmission This working example involves switching to NOMA transmission or to OMA transmission by associating each of grant-free transmission and grant-based transmission with either NOMA transmission or OMA transmission. For example, in a case where grant-free transmission is associated with NOMA transmission and grant-based transmission with OMA transmission, the terminal apparatus 2 determines on performing NOMA transmission without a grant and on carrying out OMA transmission upon receipt of a grant. The association between the grant-free transmission or grant-based transmission on the one hand and NOMA transmission or OMA transmission on the other hand may be predetermined statically as part of the specifications involved or may be conveyed quasi-statically from the base station apparatus 1 to the terminal apparatus 2. Further, the same transmission method may be allocated to both grant-free transmission and grant-based transmission. For example, in a case where the NOMA transmission method is allocated to both grant-free transmission and grant-based transmission, the terminal apparatus 2 performs both grant-free transmission and grant-based transmission using the NOMA transmission method.

Either or both of grant-free transmission and grant-based transmission may be limited to the NOMA transmission method or to the OMA transmission method. For example, in grant-based transmission, the terminal apparatus 2 may be limited from using the NOMA transmission method. Here, the above example is not limitative of the combinations of cases subject to the limitation.

(2-4) Switching by Implicit Notification Based on Waveforms

This working example involves associating NOMA transmission or OMA transmission with transmittable waveforms for switching between NOMA transmission and OMA transmission. For example, suppose that the terminal apparatus 2 is capable of both OFDM transmission and DFT-s-OFDM transmission. Here, OFDM transmission may be associated with NOMA transmission and DFT-s-OFDM transmission with OMA transmission. This allows the terminal apparatus 2 to determine on performing NOMA transmission in the case of doing OFDM transmission and on carrying out OMA transmission in the case of doing DFT-s-OFDM transmission. The association between the transmittable waveforms on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of the transmittable waveforms. For example, in a case where the NOMA transmission method is allocated to both OFDM transmission and DFT-s-OFDM transmission, the terminal apparatus 2 carries out both OFDM transmission and DFT-s-OFDM transmission using the NOMA transmission method.

As another alternative, a specific waveform may be limited from use for NOMA transmission or for OMA transmission. For example, in DFT-s-OFDM transmission, the terminal apparatus 2 may be limited from using NOMA transmission. Here, the above example is not limitative of the combinations of cases subject to the limitation.

(2-5) Switching by Implicit Notification Using HARQ Processes

This working example involves associating HARQ process numbers with NOMA transmission or with OMA transmission for switching between NOMA transmission and OMA transmission. For example, suppose that the terminal apparatus 2 performs transmission using two HARQ processes #0 and #1. Here, HARQ process #0 may be associated with NOMA transmission and HARQ process #1 with OMA transmission. This allows the terminal apparatus 2 to determine on performing NOMA transmission in the case of sending HARQ process #0 and on carrying out OMA transmission in the case of sending HARQ process #1. The association between the HARQ processes on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of the HARQ numbers. For example, in a case where the NOMA transmission method is allocated to both HARQ process #0 and HARQ process #1, the terminal apparatus 2 performs NOMA transmission using both HARQ processes #0 and #1.

As another alternative, a specific HARQ process may be limited from use for NOMA transmission or for OMA transmission. For example, with HARQ process #0, the terminal apparatus 2 may be limited from using NOMA transmission. Here, the above example is not limitative of the combinations of cases subject to the limitation.

(2-6) Switching by Implicit Notification Using DMRS Sequences

This working example involves associating the DMRS sequence transmitted from the base station apparatus 1 to the terminal apparatus 2 with NOMA transmission or with OMA transmission for switching between NOMA transmission and OMA transmission. For example, suppose that the terminal apparatus 2 receives two DMRS sequences #0 and #1. Here, DMRS sequence #0 may be associated with NOMA transmission and DMRS sequence #1 with OMA transmission. This allows the terminal apparatus 2 to determine on performing NOMA transmission upon receipt of DMRS sequence #0 and on carrying out OMA transmission upon receipt of DMRS sequence #1. The association between the DMRS sequences on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of DMRS sequences. For example, in a case where the NOMA transmission method is allocated to both DMRS sequence #0 and DMRS sequence #1, the terminal apparatus 2 performs NOMA transmission upon receipt of any one of DMRS sequences #0 and #1.

(2-7) Switching by Implicit Notification Using Cells

This working example involves associating cells with NOMA transmission or with OMA transmission for switching between NOMA transmission and OMA transmission. For example, suppose that the terminal apparatus 2 performs transmission and reception using two cells #0 and #1. Here, cell #0 may be associated with NOMA transmission and cell #1 with OMA transmission. This allows the terminal apparatus 2 to determine on performing NOMA transmission in the case of transmission in cell #0 and on carrying out OMA transmission in the case of transmission in cell #1. The association between the cells on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of the cells. For example, in a case where the NOMA transmission method is allocated to both cell #0 and cell #1, the terminal apparatus 2 performs NOMA transmission upon receipt of any one of cells #0 and #1. Further, this working example may be applied to carrier aggregation and to dual connectivity.

As another alternative, a specific cell may be limited from use for NOMA transmission or for OMA transmission. For example, given an Scell (Secondary Cell), the terminal apparatus 2 may be limited from using NOMA transmission. Here, the above example is not limitative of the combinations of cases subject to the limitation.

(2-8) Switching by Implicit Notification Using a Licensed Band/Unlicensed Band

This working example involves associating a licensed band/unlicensed band with NOMA transmission or with OMA transmission for switching between NOMA transmission and OMA transmission. For example, suppose that the terminal apparatus 2 is capable of transmission in the licensed band or in the unlicensed band. Here, the licensed band may be associated with NOMA transmission and the unlicensed band with OMA transmission. This allows the terminal apparatus 2 to determine on performing NOMA transmission in the case of transmission in the licensed band and on carrying out OMA transmission in the case of transmission in the unlicensed band. The association between the licensed band or the unlicensed band on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to both the licensed band and the unlicensed band. For example, where the NOMA transmission method is allocated to both the licensed band and the unlicensed band, the terminal apparatus 2 performs NOMA transmission in the case of transmission using any of the licensed band and the unlicensed band.

Alternatively, either or both of the licensed band and the unlicensed band may be limited from use for NOMA transmission or for OMA transmission. For example, the terminal apparatus 2 may be limited from using NOMA transmission for transmission in the unlicensed band. Here, the above example is not limitative of the combinations of cases subject to the limitation.

(2-9) Switching by Implicit Notification Using Channels Such as the PUCCH and PUSCH This working example involves associating transmission channels such as the PUCCH and PUSCH with NOMA transmission or with OMA transmission for switching between NOMA transmission and OMA transmission. For example, the terminal apparatus 2 performs uplink transmission using the PUCCH or PUSCH. If the PUSCH is associated here with NOMA transmission and the PUCCH with OMA transmission, the terminal apparatus 2 determines on performing NOMA transmission in the case of transmission on the PUSCH and on carrying out OMA transmission in the case of transmission on the PUCCH. The association between the channels such as the PUCCH and PUSCH on the one hand and NOMA transmission or OMA transmission on the other hand may be predetermined statically as part of the specifications involved or may be conveyed quasi-statically from the base station apparatus to the terminal apparatus. Alternatively, the same transmission method may be allocated to some or all of the channels. For example, where the NOMA transmission method is allocated to both the PUCCH and the PUSCH, the terminal apparatus 2 performs NOMA transmission in the case of transmission on any of the PUCCH and PUSCH.

As another alternative, a specific channel may be limited from use for NOMA transmission or for OMA transmission. For example, on the PUCCH, the terminal apparatus 2 may be limited from using NOMA transmission. Here, the above example is not limitative of the combinations of cases subject to the limitation.

As a further alternative, a specific channel may be limited from use for performing NOMA transmission depending on the transmission format in use. For example, if it is assumed that the PUCCH is basically limited to OMA transmission, the terminal apparatus 2 may use NOMA transmission only when sending a scheduling request on the PUCCH. The limitation may be applied to some other information such as ACK/NACK and CSI in addition to the scheduling request.

(2-10) Switching by Implicit Notification Using the Slot and Mini-Slot

This working example involves associating the slot and mini-slot with NOMA transmission or with OMA transmission for switching between NOMA transmission and OMA transmission. For example, the terminal apparatus 2 is assumed to be capable of transmission using the slot and mini-slot. If the mini-slot is associated here with NOMA transmission and the slot with OMA transmission, the terminal apparatus 2 determines on performing NOMA transmission in the case of transmission using the mini-slot and on carrying out OMA transmission in the case of transmission using the slot. The association between the slot and mini-slot on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to both the slot and the mini-slot. For example, where the NOMA transmission method is allocated to both the slot and the mini-slot, the terminal apparatus 2 performs NOMA transmission in the case of transmission using any of the slot and the mini-slot.

Figure 25:
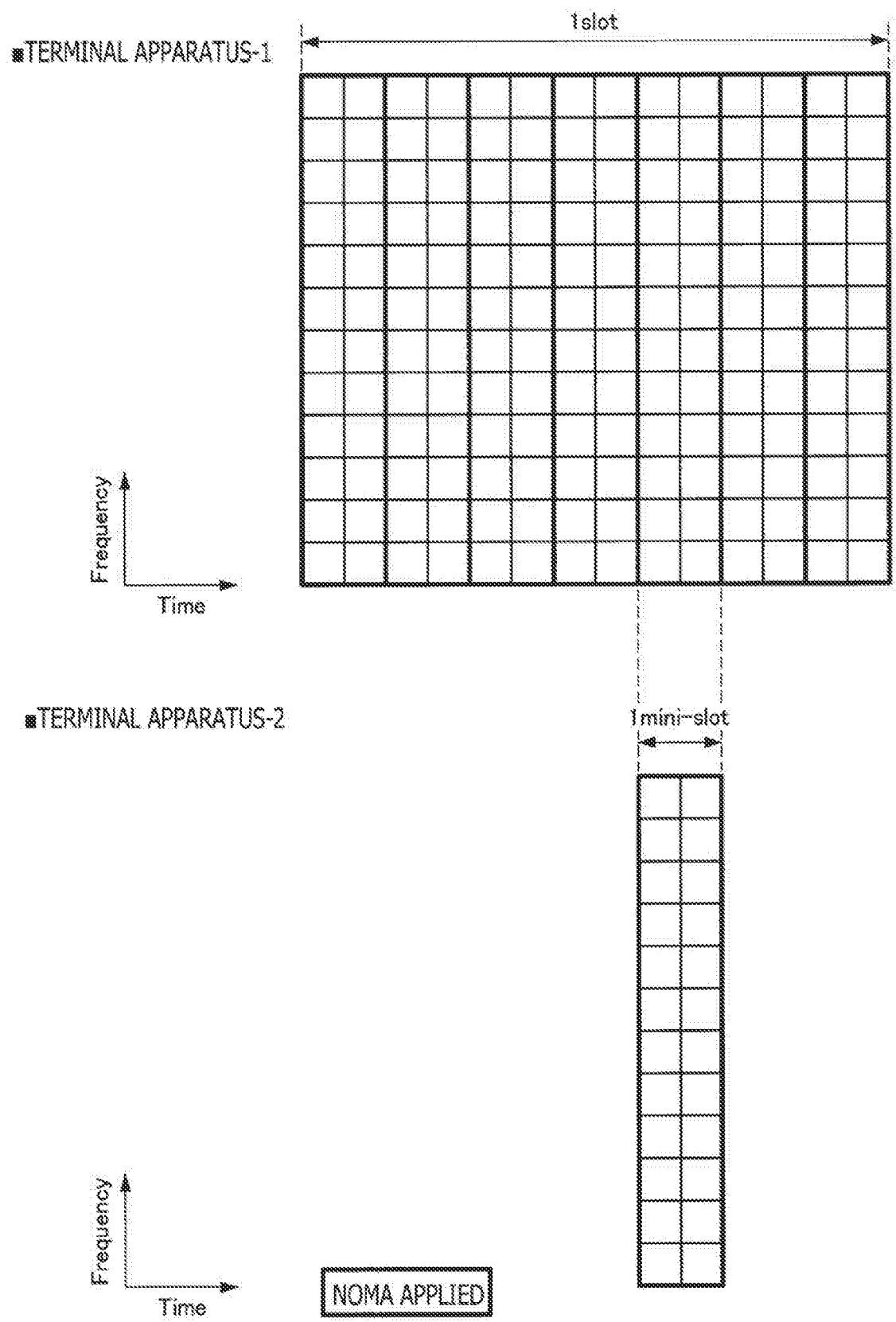
FIG. 25 is an explanatory diagram depicting an example in which NOMA is applied to both a slot and a mini-slot.

FIG. 25 depicts a working example in a case where NOMA is allocated to both the slot and the mini-slot. FIG. 25 thus gives an example in which NOMA is applied to both the slot and the mini-slot. NOMA is applied here to each of the slot and mini-slot domains. It is assumed that a terminal apparatus-1 and a terminal apparatus-2 share the same frequency domain. The terminal apparatus-1 performs transmission using the slot, while the terminal apparatus-2 carries out transmission using the mini-slot. At this time, the domain to which NOMA is applied for the terminal apparatus-1 is made the same as that for the terminal apparatus-2. Thus even if the two terminal apparatuses perform transmission at the same time with the same frequency, the base station apparatus 1 is able to decode what is transmitted using an interference canceller.

Alternatively, either or both of the slot and the mini-slot may be limited from use for NOMA transmission or for OMA transmission. For example, with the mini-slot, the terminal apparatus 2 may be limited from using NOMA transmission. Here, the above example is not limitative of the combinations of cases subject to the limitation.

(2-11) Switching by Implicit Notification Using Subcarrier Spacing

This working example involves associating subcarrier spacing options with NOMA transmission or with OMA transmission for switching between NOMA transmission and OMA transmission. For example, suppose that the terminal apparatus 2 is capable of transmission with subcarrier spacing of 15 kHz and 30 kHz. Here, the subcarrier spacing of 30 kHz may be associated with NOMA transmission and the subcarrier spacing of 15 kHz with OMA transmission. This allows the terminal apparatus 2 to determine on performing NOMA transmission in the case of transmission at 30 kHz and on carrying out OMA transmission in the case of transmission at 15 kHz. The association between the subcarrier spacing options on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of the subcarrier spacing options. For example, where NOMA transmission is allocated to both of the subcarrier spacing options of 15 kHz and 30 kHz, the terminal apparatus 2 performs NOMA transmission in the case of transmission with subcarrier spacing of 15 kHz or of 30 kHz.

As another alternative, a specific subcarrier spacing option may be limited from use for NOMA transmission or for OMA transmission. For example, with subcarrier spacing of 240 kHz, the terminal apparatus 2 may be limited from using NOMA transmission. Given a relatively extensive subcarrier spacing option of 240 kHz, a relatively high frequency band such as a millimeter-wave band may be considered for use, for example. The reason for this is that since relatively abundant frequency resources are presumably usable in relatively high frequency bands, there is a possibility that sufficient resources are made available without recourse to NOMA transmission. Obviously, NOMA transmission may be used in a high frequency band, or NOMA transmission may be utilized with the relatively extensive subcarrier spacing option of 240 kHz. Here, the above example is not limitative of the combinations of cases subject to the limitation.

(2-12) Switching by Implicit Notification Using Parameter Sets

This working example involves associating parameter sets with NOMA transmission or with OMA transmission for switching between NOMA transmission and OMA transmission. For example, suppose that the terminal apparatus 2 is capable of transmission using parameter sets #0 and #1. Here, parameter set #0 may be associated with NOMA transmission and parameter set #1 with OMA transmission. This allows the terminal apparatus 2 to determine on performing NOMA transmission in the case of transmission using parameter set #0 and on carrying out OMA transmission in the case of transmission using parameter set #1. The association between the parameter sets on the one hand and NOMA transmission or OMA transmission on the other hand may be predetermined statically as part of the specifications involved or may be conveyed quasi-statically from the base station apparatus 1 to the terminal apparatus 2. Alternatively, the same transmission method may be allocated to some or all of the parameter sets. For example, where the NOMA transmission method is allocated to both parameter set #0 and parameter set #1, the terminal apparatus 2 performs NOMA transmission in the case of transmission using any one of parameter sets #0 and #1.

As another alternative, a specific parameter set may be limited from use for NOMA transmission or for OMA transmission. For example, with parameter set #0, the terminal apparatus 2 may be limited from using NOMA transmission. Here, the above example is not limitative of the combinations of cases subject to the limitation.

(2-13) Switching by Implicit Notification in Association with RACH Procedures

This working example involves associating a 2-step RACH procedure or a 4-step RACH procedure with NOMA transmission or with OMA transmission for switching between NOMA transmission and OMA transmission. The 4-step RACH procedure is an initial access procedure used in LTE. In the 1st step of the 4-step RACH procedure, the terminal apparatus 2 transmits a preamble to the base station apparatus 1. In the 2nd step, the base station apparatus 1 transmits to the terminal apparatus 2 a response to the receipt of the preamble as well as a grant of resources for use in the 3rd step. In the 3rd step, the terminal apparatus 2 transmits to the base station apparatus 1 the data required for the initialization using the resources granted in the 2nd step. In the 4th step, the base station apparatus 1 gives a response to the terminal apparatus 2. The 2-step RACH procedure, on the other hand, is a RACH procedure that omits the 1st step and 2nd step of the 4-step RACH procedure. In the 1st step of the 2-step RACH procedure, the terminal apparatus 2 transmits both a preamble and the data required for the initialization to the base station apparatus 1. In the 2nd step, the base station apparatus 1 gives a response to the terminal apparatus 2. In the 2-step RACH procedure, multiple terminal apparatuses 2 may transmit their data using the same time and frequency resources. This may raise a possibility that the base station apparatus 1 is unable to decode the data.

Thus in the case of the 2-step RACH procedure, NOMA transmission is used in the 1st step. This allows the base station apparatus 1 to decode the received data even when multiple terminal apparatuses 2 use the same time and frequency resources. In the case of the 4-step RACH procedure, on the other hand, the data transmission in the 3rd step is carried out using the OMA transmission method. As described above, the 2-step RACH procedure is associated with NOMA transmission and the 4-step RACH procedure with OMA transmission for switching between NOMA transmission and OMA transmission.

Obviously, OMA transmission may also be used in the 2-step RACH procedure, and NOMA transmission may be utilized in the 4-step RACH procedure as well.

(3) Switching Based on Cell or Beam Handover

This working example involves switching to NOMA transmission or to OMA transmission in a case where handover is performed from a NOMA transmission-compatible/incompatible cell or beam to another NOMA transmission-compatible/incompatible cell or beam. Although the working example hereunder deals with handover between cells, the example similarly applies to handover between beams. First of all, it is assumed that the base station apparatus 1 of a NOMA transmission-compatible cell transmits a broadcast signal such as that of system information indicative of the compatibility with NOMA transmission. That is, the base station apparatus 1 of a NOMA transmission-incompatible cell does not transmit a signal indicative of the compatibility with NOMA. For example, suppose that the terminal apparatus 2 performs NOMA transmission using a NOMA-compatible cell and that the terminal apparatus 2 carries out handover to another cell. At this time, the terminal apparatus 2 receives a broadcast signal such as that of system information transmitted from the base station apparatus 1 of the handover destination so as to verify whether the destination base station apparatus 1 is compatible with NOMA transmission. If the destination base station apparatus 1 turns out to be compatible with NOMA transmission, the terminal apparatus 2 notifies the base station apparatus 1 of its capability of being compatible with NOMA transmission. The base station apparatus 1 notifies the terminal apparatus 2 whether the terminal apparatus 2 is allowed to perform NOMA transmission. On the other hand, if the base station apparatus 1 of the handover destination is not compatible with NOMA, the terminal apparatus 2 switches from NOMA transmission to OMA transmission and performs OMA transmission.

As described above, the terminal apparatus 2 is able to switch between NOMA transmission and OMA transmission on the basis of diverse information.

Any one of the above working examples may be used alone, or multiple methods of these examples may be practiced in combination. Although the above working examples were described as primarily applicable to cases of uplink, these examples are not limited to uplink but are applicable to cases of sidelink such as device-to-device connection as well as to communications with relay terminals.

2. APPLICATION EXAMPLES

The technology of the present disclosure may be applied to diverse products. For example, the base station apparatus 1 may be implemented as any one of various types of eNB (evolved Node B) such as a macro eNB or a small eNB. The small eNB may be an eNB that covers cells smaller than the macro cells, such as pico eNB, micro eNB, or home (femto) eNB. Alternatively, the base station apparatus 1 may be implemented as some other type of base station, such as the node B or BTS (Base Transceiver Station). The base station apparatus 1 may include a main body (also referred to as the base station device) that controls wireless communication, and one or more RRHs (Remote Radio Heads) arranged at locations different from that of the main body. Further, any one of diverse types of terminals to be discussed below may act as the base station apparatus 1 by executing the base station functions temporarily or semi-permanently.

For example, the terminal apparatus 2 may be implemented as a mobile terminal such as a smartphone, a tablet PC (Personal Computer), a laptop PC, a handheld game terminal, a handheld/dongle type mobile router, or a digital camera; or as a vehicle-mounted terminal such as a car navigation system. Alternatively, the terminal apparatus 2 may be implemented as an MTC (Machine Type Communication) terminal that performs an M2M (Machine To Machine) communication. As another alternative, the terminal apparatus 2 may be a wireless communication module (e.g., an integrated circuit module of a single die) mounted on these terminals.

Application Examples Regarding the Base Station

First Application Example

Figure 26:
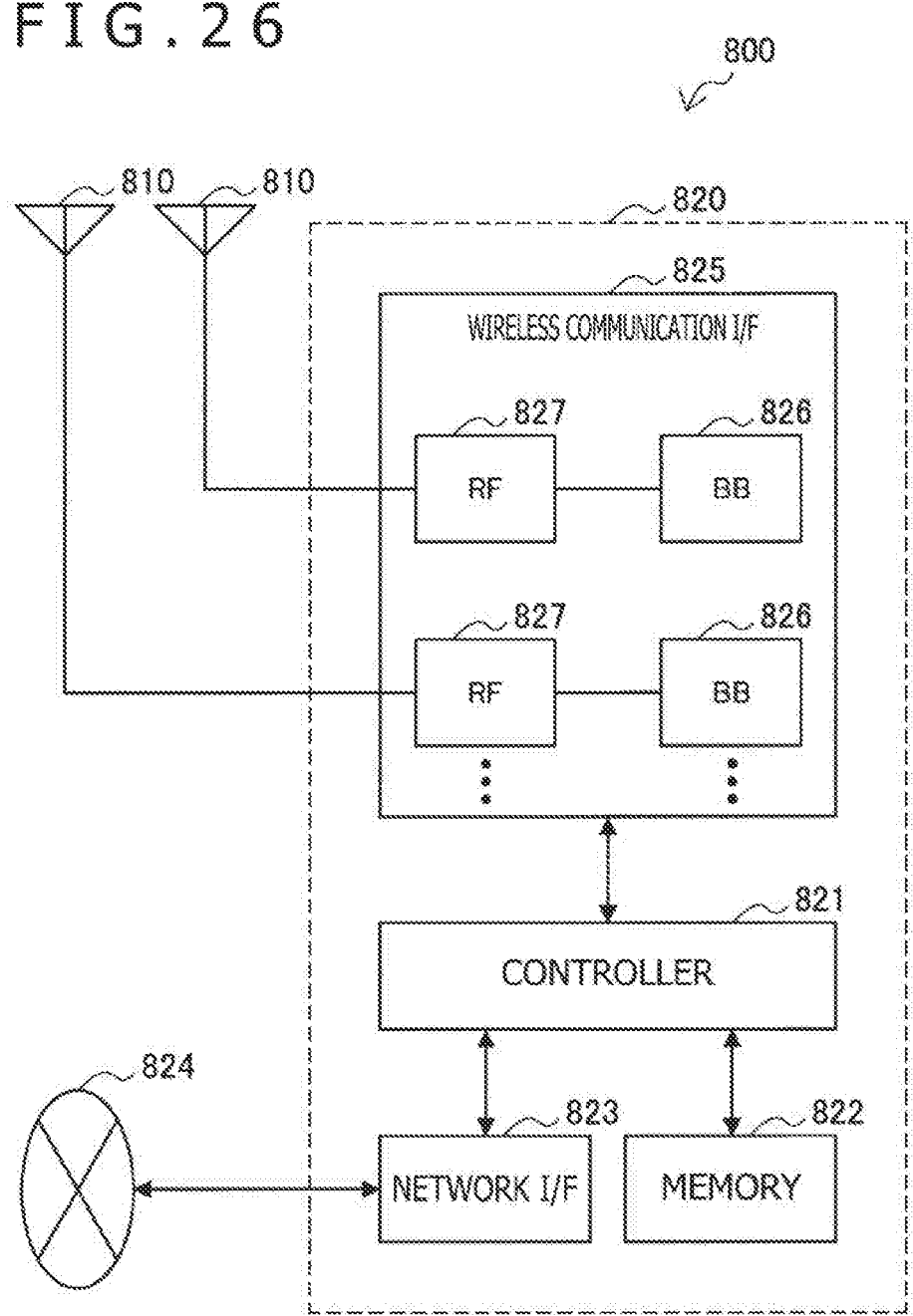
FIG. 26 is a block diagram depicting a first example of a schematic configuration of an eNB to which the technology of the present disclosure may be applied.

FIG. 26 is a block diagram depicting a first example of a schematic configuration of an eNB to which the technology of the present disclosure may be applied. An eNB 800 has one or more antennas 810 and a base station apparatus 820. Each of the antennas 810 and the base station apparatus 820 are interconnected via an RF cable.

Each of the antennas 810 has one or more antenna elements (e.g., multiple antenna elements configuring a MIMO antenna) for use by the base station apparatus 820 in transmitting and receiving wireless signals. The eNB 800 has multiple antennas 810 as depicted in FIG. 26. The multiple antennas 810 may correspond respectively to multiple frequency bands used by the eNB 800. Although FIG. 26 depicts the example in which the eNB 800 includes multiple antennas 810, the eNB 800 may alternatively have a single antenna 810.

The base station apparatus 820 includes a controller 821, a memory 822, a network interface 823, and a wireless communication interface 825.

The controller 821 may be a CPU or a DSP for example. The controller 821 causes the base station apparatus 820 to perform various functions in higher layers. For example, the controller 821 generates data packets out of the data from within a signal processed by the wireless communication interface 825, and transfers the generated packets via the network interface 823. The controller 821 may generates bundled packets by bundling the data from multiple baseband processes and transfers the generated bundled packets. The controller 821 may also have logical functions for executing controls such as radio resource control, radio bearer control, mobility management, admission control, and scheduling. These controls may also be executed in coordination with a nearby eNB or with a core network node. The memory 822 includes a RAM and a ROM, and stores programs and various control data (e.g., terminal list, transmission power data, and scheduling data) executed or operated on by the controller 821.

The network interface 823 is a communication interface that connects the base station apparatus 820 with a core network 824. The controller 821 may communicate with the core network node or with another eNB. In this case, the eNB 800 may be connected with the core network node or with another eNB through a logical interface (e.g., S1 interface or X2 interface). The network interface 823 may be either a wired communication interface or a wireless communication interface for wireless backhaul. In a case where the network interface 823 is a wireless communication interface, the network interface 823 may use for wireless communication a frequency band higher than that used by the wireless communication interface 825.

The wireless communication interface 825 supports a cellular communication system such as LTE (Long Term Evolution) or LTE-Advanced. The wireless communication interface 825 provides wireless connection to a terminal positioned in a cell of the eNB 800 via the antenna 810. The wireless communication interface 825 may typically include a baseband (BB) processor 826 and an RF circuit 827. The BB processor 826 may perform encoding/decoding, modulation/demodulation, and multiplexing/demultiplexing, for example. The BB processor 826 carries out diverse signal processing in different layers (e.g., L1, MAC (Medium Access Control), RLC (Radio Link Control), and PDCP (Packet Data Convergence Control)). The BB processor 826 may have some or all of the above-mentioned logical functions in place of the controller 821. The BB processor 826 may be a module that includes a memory for storing communication control programs, a processor for executing the programs, and related circuits. The functions of the BB processor 826 may be updated by having the above programs updated. Further, the module may be a card or a blade to be inserted into a slot of the base station apparatus 820, or a chip to be mounted on the card or on the blade. On the other hand, the RF circuit 827 may include a mixer, a filter, and an amplifier. The RF circuit 827 transmits and receives wireless signals via the antenna 810.

The wireless communication interface 825 may include multiple BB processors 826 as depicted in FIG. 26. The multiple BB processors 826 may correspond respectively to multiple frequency bands used by the eNB 800, for example. Further, the wireless communication interface 825 may include multiple RF circuits 827 as illustrated in FIG. 26. The multiple RF circuits 827 may correspond respectively to multiple antenna elements, for example. Although FIG. 26 depicts the example in which the wireless communication interface 825 includes the multiple BB processors 826 and the multiple RF circuits 827, the wireless communication interface 825 may alternatively include a single BB processor 826 or a single RF circuit 827.

In the eNB 800 depicted in FIG. 26, one or more components (higher-layer processing section 101 and/or control section 103) included in the base station apparatus 1 explained with reference to FIG. 8 may be implemented in the wireless communication interface 825. Alternatively, at least some of these components may be implemented in the controller 821. As one example, the eNB 800 may be mounted with a module that includes part (e.g., BB processor 826) or all of the wireless communication interface 825 and/or the controller 821. In the module, one or more of the above-mentioned components may be implemented. In this case, the module may store programs for causing the processor to function as one or more of the above components (i.e., programs for causing the processor to execute the operations of one or more of the above components) and execute the programs. As another example, programs for causing the processor to function as one or more of the above components may be installed in the eNB 800, and the wireless communication interface 825 (e.g., BB processor 826) and/or the controller 821 may execute the programs. As described above, the eNB 800, the base station apparatus 820, or the above module may be provided as an apparatus that includes one or more of the above components. The programs for causing the processor to function as one or more of the above components may also be provided. Further, there may be provided a recording medium to and from which the above programs may be recorded and retrieved.

Also in the eNB 800 illustrated in FIG. 26, the reception section 105 and the transmission section 107 explained with reference to FIG. 8 may be implemented in the wireless communication interface 825 (e.g., RF circuit 827). The transmitting/receiving antenna 109 may be implemented in the antenna 810. Further, the interface between the higher-layer processing section 101 on the one hand and the host node or another base station apparatus on the other hand may be implemented in the controller 821 and/or in the network interface 823.

Second Application Example

Figure 27:
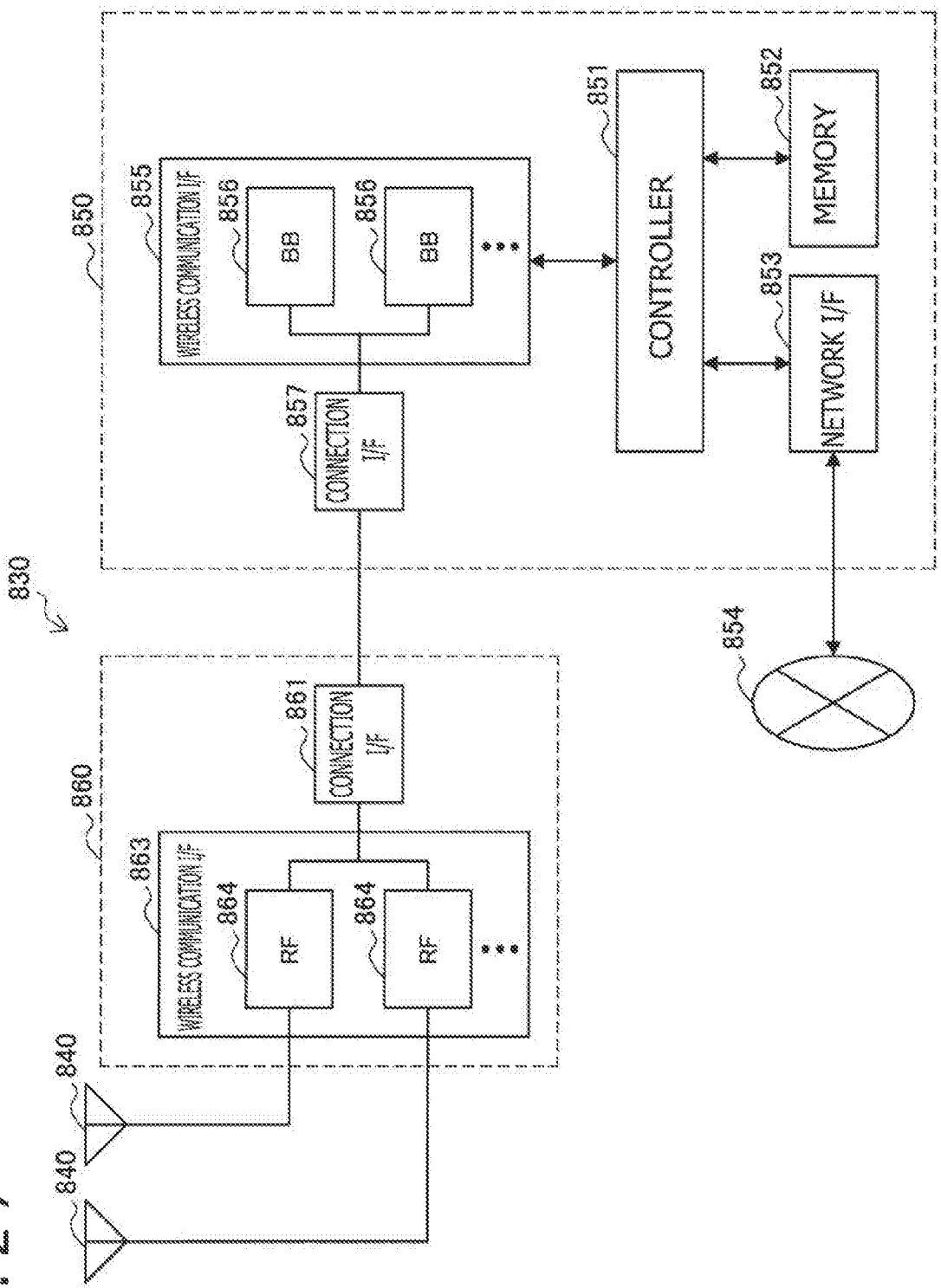
FIG. 27 is a block diagram depicting a second example of the schematic configuration of the eNB to which the technology of the present disclosure may be applied.

FIG. 27 is a block diagram depicting a second example of the schematic configuration of the eNB to which the technology of the present disclosure may be applied. An eNB 830 has one or more antennas 840, a base station apparatus 850, and an RRH 860. Each of the antennas 840 and the RRH 860 may be interconnected via an RF cable. Further, the base station apparatus 850 and the RRH 860 may be interconnected via a high-speed line such as an optical fiber cable.

Each of the antennas 840 has one or multiple antenna elements (e.g., multiple antenna elements configuring a MIMO antenna) for use by the RRH 860 in transmitting and receiving wireless signals. The eNB 830 has multiple antennas 840 as depicted in FIG. 27. The multiple antennas 840 may correspond respectively to multiple frequency bands used by the eNB 830. Although FIG. 27 depicts the example in which the eNB 830 includes the multiple antennas 840, the eNB 830 may alternatively have a single antenna 840.

The base station apparatus 850 includes a controller 851, a memory 852, a network interface 853, a wireless communication interface 855, and a connection interface 857. The controller 851, memory 852, and network interface 853 are similar to the controller 821, memory 822, and network interface 823 explained above with reference to FIG. 26.

The wireless communication interface 855 supports a cellular communication system such as LTE or LTE-Advanced. The wireless communication interface 855 provides wireless connection to a terminal positioned in a sector corresponding to the RRH 860 via the RRH 860 and the antenna 840. The wireless communication interface 855 may typically include a BB processor 856. The BB processor 856 is similar to the BB processor 826 explained with reference to FIG. 26 except that the BB processor 856 is connected with an RF circuit 864 of the RRH 860 via the connection interface 857. The wireless communication interface 855 may include multiple BB processors 856 as depicted in FIG. 27. The multiple BB processors 856 may correspond respectively to multiple frequency bands used by the eNB 830, for example. Although FIG. 27 depicts the example in which the wireless communication interface 855 includes the multiple BB processors 856, the wireless communication interface 855 may alternatively include a single BB processor 856.

The connection interface 857 is an interface that connects the base station apparatus 850 (wireless communication interface 855) with the RRH 860. Alternatively, the connection interface 857 may be a communication module that connects the base station apparatus 850 (wireless communication interface 855) with the RRH 860 via the above-mentioned high-speed line for communication therebetween.

Also, the RRH 860 has a connection interface 861 and a wireless communication interface 863.

The connection interface 861 is an interface that connects the RRH 860 (wireless communication interface 863) with the base station apparatus 850. Alternatively, the connection interface 861 may be a communication module for communication via the above-mentioned high-speed line.

The wireless communication interface 863 transmits and receives wireless signals via the antenna 840. The wireless communication interface 863 may typically include the RF circuit 864. The RF circuit 864 may include a mixer, a filter, and an amplifier. The RF circuit 864 transmits and receives wireless signals via the antenna 840. The wireless communication interface 863 may include multiple RF circuits 864 as depicted in FIG. 27. The multiple RF circuits 864 may correspond respectively to multiple antenna elements, for example. Although FIG. 27 depicts the example in which the wireless communication interface 863 includes the multiple RF circuits 864, the wireless communication interface 863 may alternatively include a single RF circuit 864.

In the eNB 830 depicted in FIG. 27, one or more components (higher-layer processing section 101 and/or control section 103) included in the base station apparatus 1 explained with reference to FIG. 8 may be implemented in the wireless communication interface 855 and/or in the wireless communication interface 863. Alternatively, at least some of these components may be implemented in the controller 851. As one example, the eNB 830 may be mounted with a module that includes part (e.g., BB processor 856) or all of the wireless communication interface 855 and/or the controller 851. In the module, one or more of the above-mentioned components may be implemented. In this case, the module may store programs for causing the processor to function as one or more of the above components (i.e., programs for causing the processor to execute the operations of one or more of the above components) and execute the programs. As another example, programs for causing the processor to function as one or more of the above components may be installed in the eNB 830, and the wireless communication interface 855 (e.g., BB processor 856) and/or the controller 851 may execute the programs. As described above, the eNB 830, the base station apparatus 850, or the above module may be provided as an apparatus that includes one or more of the above components. The programs for causing the processor to function as one or more of the above components may also be provided. Further, there may be provided a recording medium to and from which the above programs may be recorded and retrieved.

Also in the eNB 830 illustrated in FIG. 27, the reception section 105 and the transmission section 107 explained with reference to FIG. 8 may be implemented in the wireless communication interface 863 (e.g., RF circuit 864). The transmitting/receiving antenna 109 may be implemented in the antenna 840. Further, the interface between the higher-layer processing section 101 on the one hand and the host node or another base station apparatus on the other hand may be implemented in the controller 851 and/or in the network interface 853.

Application Examples Regarding the Terminal Apparatus

First Application Example

Figure 28:
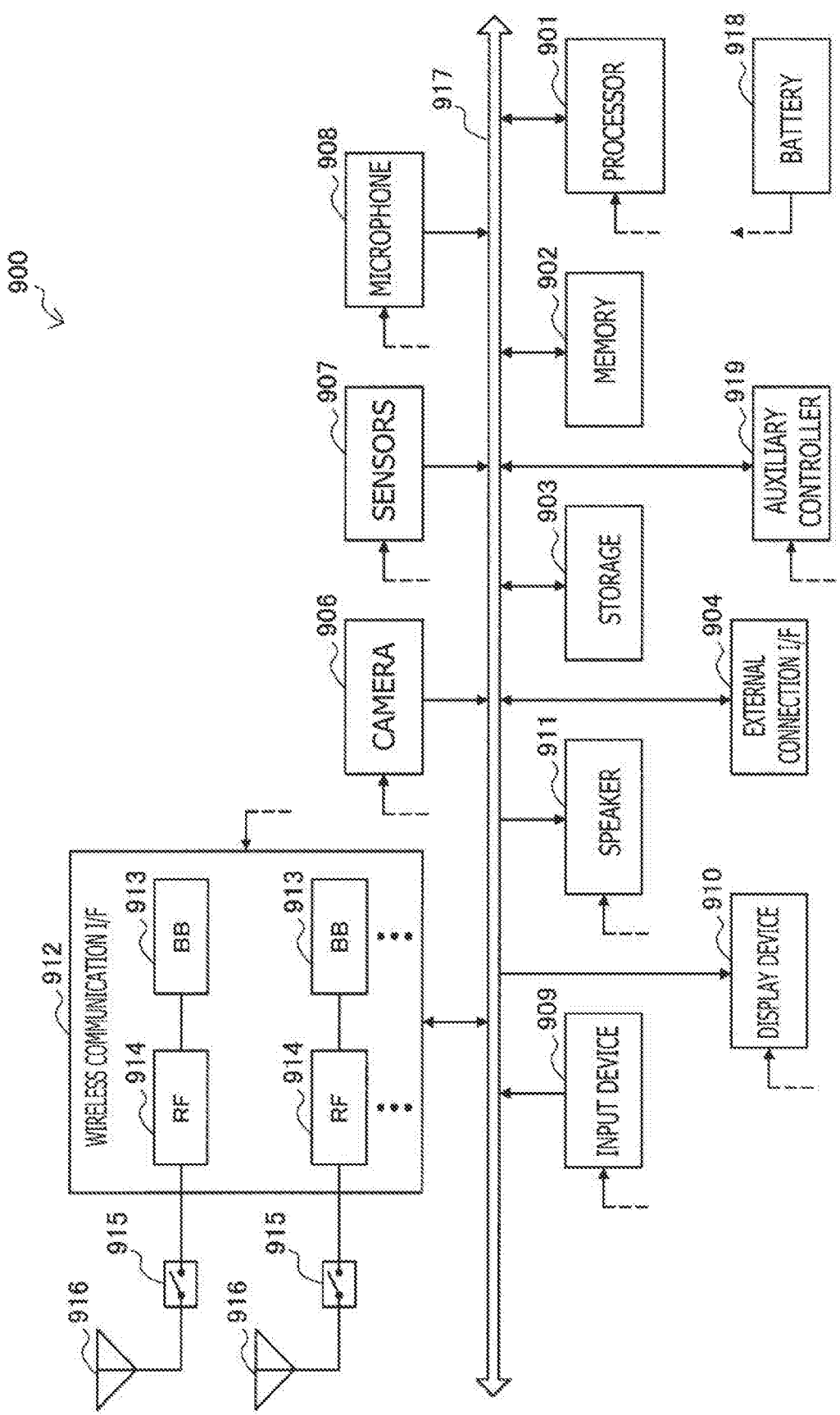
FIG. 28 is a block diagram depicting an example of a schematic configuration of a smartphone 900 to which the technology of the present disclosure may be applied.

FIG. 28 is a block diagram depicting an example of the schematic configuration of a smartphone 900 to which the technology of the present disclosure may be applied. The smartphone 900 includes a processor 901, a memory 902, a storage 903, an external connection interface 904, a camera 906, sensors 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be a CPU or a system-on-chip (SoC). The processor 901 controls the functions in the application layer and in other layers of the smartphone 900. The memory 902 includes a RAM and a ROM. The memory 902 stores the programs and data executed or operated on by the processor 901. The storage 903 may include storage media such as a semiconductor memory or a hard disc. The external connection interface 904 is an interface that connects an external device such as a memory card or a universal serial bus (USB) device with the smartphone 900.

The camera 906 includes an imaging element such as a CCD (Charge Coupled Device) or a CMOS (Complementary Metal Oxide Semiconductor), for example. The camera 906 generates captured images. The sensors 907 may include a group of sensors such as a positioning sensor, a gyro sensor, a geomagnetic sensor, and an acceleration sensor for example. The microphone 908 converts the sound input to the smartphone 900 into an audio signal. The input device 909 may include, for example, touch sensors, a keypad, a keyboard, buttons, or switches for detecting touches on a screen of the display device 910. The input device 909 accepts operations or information performed or input by a user. The display device 910 has the screen such as a liquid crystal display (LCD) or an organic light-emitting diode (OLED) display. The display device 910 displays images output from the smartphone 900. The speaker 911 converts the audio signal output from the smartphone into sounds.

The wireless communication interface 912 supports a cellular communication system such as LTE or LTE-Advanced. The wireless communication interface 912 performs wireless communication. The wireless communication interface 912 may typically include a BB processor 913 and an RF circuit 914. The BB processor 913 may perform encoding/decoding, modulation/demodulation, and multiplexing/demultiplexing, for example. The BB processor 913 carries out diverse signal processing for wireless communication. On the other hand, the RF circuit 914 may include a mixer, a filter, and an amplifier. The RF circuit 914 transmits and receives wireless signals via the antenna 916. The wireless communication interface 912 may be a one-chip module that integrates the BB processor 913 and the RF circuit 914. As illustrated in FIG. 28, the wireless communication interface 912 may include multiple BB processors 913 and multiple RF circuits 914. Although FIG. 28 depicts the example in which the wireless communication interface 912 includes the multiple BB processors 913 and the multiple RF circuits 914, the wireless communication interface 912 may alternatively include a single BB processor 913 or a single RF circuit 914.

Further, the wireless communication interface 912 may support other types of wireless communication systems such as a short-range wireless communication system, a close proximity wireless communication system, or a wireless LAN (Local Area Network) system in addition to the cellular communication system. In such a case, the wireless communication interface 912 may include the BB processor 913 and the RF circuit 914 for each of the wireless communication systems.

Each of the antenna switches 915 is used to switch connection points to which to connect multiple circuits (e.g., circuits for different wireless communication systems) included in the wireless communication interface 912.

Each of the antennas 916 has one or more antenna elements (e.g., multiple antenna elements configuring a MIMO antenna) for use by the wireless communication interface 912 in transmitting and receiving wireless signals. The smartphone 900 may have multiple antennas 916 as depicted in FIG. 28. Although FIG. 28 depicts the example in which the smartphone 900 includes the multiple antennas 916, the smartphone 900 may alternatively have a single antenna 916.

Further, the smartphone 900 may have the antenna 916 for each different wireless communication system. In that case, the antenna switches 915 may be omitted from the configuration of the smartphone 900.

The bus 917 interconnects the processor 901, memory 902, storage 903, external connection interface 904, camera 906, sensors 907, microphone 908, input device 909, display device 910, speaker 911, wireless communication interface 912, and auxiliary controller 919. The battery 918 supplies power to each of the blocks of the smartphone 900 depicted in FIG. 28 via feeder lines partially indicated by broken lines in the drawing. The auxiliary controller 919 causes the smartphone 900 to activate its minimum functions in sleep mode, for example.

In the smartphone 900 depicted in FIG. 28, one or more components (higher-layer processing section 201 and/or control section 203) included in the terminal apparatus 2 explained with reference to FIG. 9 may be implemented in the wireless communication interface 912. Alternatively, at least some of these components may be implemented in the processor 901 or in the auxiliary controller 919. As one example, the smartphone 900 may be mounted with a module that includes part (e.g., BB processor 913) or all of the wireless communication interface 912, the processor 901, and/or the controller 919. In the module, one or more of the above-mentioned components may be implemented. In this case, the module may store programs for causing the processor to function as one or more of the above components (i.e., programs for causing the processor to execute the operations of one or more of the above components) and execute the programs. As another example, programs for causing the processor to function as one or more of the above components may be installed in the smartphone 900, with the wireless communication interface 912 (e.g., BB processor 913), processor 901, and/or auxiliary controller 919 executing the programs. As described above, the smartphone 900 or the above module may be provided as an apparatus that includes one or more of the above components. The programs for causing the processor to function as one or more of the above components may also be provided. Further, there may be provided a recording medium to and from which the above programs may be recorded and retrieved.

Furthermore, in the smartphone 900 depicted in FIG. 28, the reception section 205 and the transmission section 207 explained with reference to FIG. 9 may be implemented in the wireless communication interface 912 (e.g., RF circuit 914). The transmitting/receiving antenna 209 may be implemented in the antenna 916.

Second Application Example

FIG. 29 is a block diagram depicting an example of the schematic configuration of a car navigation system 920 to which the technology of the present disclosure may be applied. The car navigation system 920 includes a processor 921, a memory 922, a GPS (Global Positioning System) module 924, sensors 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or an SoC, for example. The processor 921 controls the navigation function and other functions of the car navigation system 920. The memory 922 includes a RAM and a ROM. The memory 922 stores the programs and data executed or operated on by the processor 921.

The GPS module 924 measures the position of the car navigation system 920 (e.g., in latitude, longitude, and altitude) using GPS signals received from GPS satellites. The sensors 925 may include a group of sensors such as a gyro sensor, a geomagnetic sensor, and an atmospheric pressure sensor for example. The data interface 926 is connected, for example, with a vehicle-mounted network 941 via a terminal, not depicted. The data interface 926 acquires data such as vehicle speed data generated on the vehicle side.

The content player 927 reproduces content stored on a storage medium (e.g., CD or DVD) inserted in the storage medium interface 928. The input device 929 includes, for example, touch sensors, buttons, or switches for detecting touches on a screen of the display device 930. The input device 929 accepts operations or information performed or input by a user. The display device 930 has the screen such as an LCD or OLED display. The display device 930 displays images of the navigation function or of reproduced content. The speaker 931 outputs sounds of the navigation function or of reproduced content.

The wireless communication interface 933 supports a cellular communication system such as LTE or LTE-Advanced. The wireless communication interface 933 performs wireless communication. The wireless communication interface 933 may typically include a BB processor 934 and an RF circuit 935. The BB processor 934 may perform encoding/decoding, modulation/demodulation, and multiplexing/demultiplexing, for example. The BB processor 934 carries out diverse signal processing for wireless communication. On the other hand, the RF circuit 935 may include a mixer, a filter, and an amplifier. The RF circuit 935 transmits and receives wireless signals via the antenna 937. The wireless communication interface 933 may be a one-chip module that integrates the BB processor 934 and the RF circuit 935. As illustrated in FIG. 29, the wireless communication interface 933 may include multiple BB processors 934 and multiple RF circuits 935. Although FIG. 29 depicts the example in which the wireless communication interface 933 includes the multiple BB processors 934 and the multiple RF circuits 935, the wireless communication interface 933 may alternatively include a single BB processor 934 or a single RF circuit 935.

Furthermore, the wireless communication interface 933 may support other types of wireless communication systems such as a short-range wireless communication system, a close proximity wireless communication system, or a wireless LAN system in addition to the cellular communication system. In such a case, the wireless communication interface 933 may include the BB processor 934 and the RF circuit 935 for each of the wireless communication systems.

Each of the antenna switches 936 is used to switch connection points to which to connect multiple circuits (e.g., circuits for different wireless communication systems) included in the wireless communication interface 933.

Each of the antennas 937 has one or more antenna elements (e.g., multiple antenna elements configuring a MIMO antenna) for use by the wireless communication interface 933 in transmitting and receiving wireless signals. The car navigation system 920 may have multiple antennas 937 as depicted in FIG. 29. Although FIG. 29 depicts the example in which the car navigation system 920 includes the multiple antennas 937, the car navigation system 920 may alternatively have a single antenna 937.

Further, the car navigation system 920 may have the antenna 937 for each of the wireless communication systems. In that case, the antenna switches 936 may be omitted from the configuration of the car navigation system 920.

The battery 938 supplies power to each of the blocks of the car navigation system 920 depicted in FIG. 29 via feeder lines partially indicated by broken lines in the drawing. Furthermore, the battery 938 accumulates power supplied from the vehicle side.

In the car navigation system 920 depicted in FIG. 29, one or more components (higher-layer processing section 201 and/or control section 203) included in the terminal apparatus 2 explained with reference to FIG. 9 may be implemented in the wireless communication interface 933. Alternatively, at least some of these components may be implemented in the processor 921. As one example, the car navigation system 920 may be mounted with a module that includes part (e.g., BB processor 934) or all of the wireless communication interface 933 and/or the processor 921. In the module, one or more of the above-mentioned components may be implemented. In this case, the module may store programs for causing the processor to function as one or more of the above components (i.e., programs for causing the processor to execute the operations of one or more of the above components) and execute the programs. As another example, programs for causing the processor to function as one or more of the above components may be installed in the car navigation system 920, with the wireless communication interface 933 (e.g., BB processor 934) and/or the processor 921 executing the programs. As described above, the car navigation system 920 or the above module may be provided as an apparatus that includes one or more of the above components. The programs for causing the processor to function as one or more of the above components may also be provided. Further, there may be provided a recording medium to and from which the above programs may be recorded and retrieved.

Furthermore, in the car navigation system 920 depicted in FIG. 29, for example, the reception section 205 and the transmission section 207 explained with reference to FIG. 9 may be implemented in the wireless communication interface 933 (e.g., RF circuit 935). The transmitting/receiving antenna 209 may be implemented in the antenna 937.

Further, the technology of the present disclosure may be implemented as a vehicle-mounted system (or vehicle) 940 that includes one or more of the blocks of the above-described car navigation system 920, the vehicle-mounted network 941, and a vehicle-side module 942. The vehicle-side module 942 generates vehicle-side data such as vehicle speed, engine revolutions, or failure information, and outputs the generated data to the vehicle-mounted network 941.

Incidentally, what was referred to as the eNB in the foregoing description may also be a gNB (gNodeB, next Generation NodeB).

3. CONCLUSION

As described above, the embodiment of the present disclosure provides the base station apparatus 1 that gives notification of information for carrying out switching between OMA transmission and NOMA transmission, and the terminal apparatus 2 that switches to OMA transmission or to NOMA transmission on the basis of the information conveyed from the base station apparatus 1.

The steps of the processes executed by the apparatuses in the foregoing description need not necessarily be carried out chronologically, i.e., as per the sequences depicted in appended sequence diagrams or flowcharts. For example, the steps constituting the process carried out by each of the apparatuses may be processed in parallel or in a sequence different from that of the corresponding flowchart.

Further, it is possible to prepare computer programs for causing the hardware such as the CPU, ROM, and RAM in each apparatus to execute functions equivalent to those of the configurations of the above-described apparatuses. It is also possible to provide storage media on which to store the computer programs. Where each of the functional blocks found in appended functional block diagrams is configured with hardware, the series of the processes may be implemented using such hardware.

Whereas some preferred embodiments of the present disclosure have been described above in detail with reference to the accompanying drawings, these embodiments are not limitative of this disclosure. It is obvious that those skilled in the art will easily conceive variations or alternatives of the disclosure within the scope of the technical idea stated in the appended claims. It is to be understood that such variations, alternatives and other ramifications also fall within the technical scope of the present disclosure.

The advantageous effects stated in this description are only explanatory or illustrative and are not limitative of the present technology. That is, in addition to or in place of the above-described advantageous effects, the technology of the present disclosure may provide other advantageous effects that will be obvious to those skilled in the art in view of the above description.

The present disclosure may be implemented preferably in the following configurations:

(1)

A communication apparatus including:
an acquisition section configured to acquire information from an apparatus in wireless communication; and
a control section configured to select either orthogonal multiple access communication or non-orthogonal multiple access communication for communication with the apparatus on the basis of the information acquired by the acquisition section.

(2)

The communication apparatus as stated in paragraph (1) above, in which
the control section selects either orthogonal multiple access communication or non-orthogonal multiple access communication on the basis of control information acquired by the control section, the control information explicitly designating either orthogonal multiple access communication or non-orthogonal multiple access communication.

(3)

The communication apparatus as stated in paragraph (2) above, in which the control information is conveyed by means of system information.

(4)

The communication apparatus as stated in paragraph (2) above, in which the control information is conveyed by means of RRC signaling.

(5)

The communication apparatus as stated in paragraph (2) above, in which the control information is conveyed by means of a physical downlink control channel.

(6)

The communication apparatus as stated in paragraph (5) above, in which
the control information permits selection of either orthogonal multiple access communication or non-orthogonal multiple access communication on the basis of a result of decoding encoded information using ID information for orthogonal multiple access communication and ID information for non-orthogonal multiple access communication.

(7)

The communication apparatus as stated in paragraph (1) above, in which
the control section selects either orthogonal multiple access communication or non-orthogonal multiple access communication on the basis of non-control information acquired by the acquisition section, the non-control information not explicitly designating either orthogonal multiple access communication or non-orthogonal multiple access communication.

(8)

The communication apparatus as stated in paragraph (7) above, in which the control section selects either orthogonal multiple access communication or non-orthogonal multiple access communication in accordance with the position of a search space in which downlink control information existed.

(9)
The communication apparatus as stated in paragraph (7) above, in which
the control section selects either orthogonal multiple access communication or non-orthogonal multiple access communication in accordance with the position of a resource allocated by the apparatus.

(10)
The communication apparatus as stated in paragraph (7) above, in which
the control section selects either orthogonal multiple access communication or non-orthogonal multiple access communication depending on whether a communication system involving grant-based transmission from the apparatus or a communication system involving grant-free transmission from the apparatus is in use.

(11)
The communication apparatus as stated in paragraph (7) above, in which
the control section selects either orthogonal multiple access communication or non-orthogonal multiple access communication in accordance with the type of a slit used for transmission to the apparatus.

(12)
The communication apparatus as stated in paragraph (7) above, in which
the control section selects either orthogonal multiple access communication or non-orthogonal multiple access communication in accordance with the type of a channel used in transmission from the apparatus.

(13)
The communication apparatus as stated in paragraph (7) above, in which
the control section selects either orthogonal multiple access communication or non-orthogonal multiple access communication in accordance with the type of a random access channel procedure used for transmission to the apparatus.

(14)
The communication apparatus as stated in any one of paragraphs (1) to (13) above, in which
the control section controls wireless communication with the apparatus using a communication system involving grant-free transmission.

(15)
The communication apparatus as stated in any one of paragraphs (1) to (14) above, in which
the information acquired by the acquisition section is transmitted in a case where the number of terminals accommodated in a cell of the apparatus reaches or exceeds a predetermined terminal count.

(16)
The communication apparatus as stated in any one of paragraphs (1) to (14) above, in which
the information acquired by the acquisition section is transmitted in a case where the number of terminals accommodated in a beam emitted by the apparatus reaches or exceeds a predetermined terminal count.

(17)
The communication apparatus as stated in any one of paragraphs (1) to (14) above, in which
the information acquired by the acquisition section includes information for switching from non-orthogonal multiple access communication to orthogonal multiple access communication, the information being transmitted in a case where the apparatus is unable to receive data by non-orthogonal multiple access communication.

(18)
The communication apparatus as stated in any one of paragraphs (1) to (17) above, in which
the information acquired by the acquisition section indicates whether non-orthogonal multiple access communication is supported.

(19)
A communication method including:
causing a processor to acquire information from an apparatus in wireless communication; and
causing the processor to select either orthogonal multiple access communication or non-orthogonal multiple access communication for communication with the apparatus on the basis of the acquired information.

(20)
A computer program for causing a computer to perform:
acquisition of information from an apparatus in wireless communication; and
selection of either orthogonal multiple access communication or non-orthogonal multiple access communication for communication with the apparatus on the basis of the acquired information.

REFERENCE SIGNS LIST

1 Base station apparatus
2 Terminal apparatus

The invention claimed is:
1. A communication apparatus, comprising:
circuitry configured to:
  acquire first information from a base station via wireless communication;
  acquire second information, wherein the second information is different from the first information; and
  select one of orthogonal multiple access (OMA) communication or non-orthogonal multiple access (NOMA) communication for communication with the base station, wherein
    the selection of the one of the OMA communication or the NOMA communication is based on each of the acquired first information and the acquired second information,
    the acquired second information implicitly designates the one of the OMA communication or the NOMA communication,
    the acquired second information includes information indicating a type of a slot associated with transmission to the base station,
    the OMA communication is a third step of a 4-step RACH procedure in which the communication apparatus transmits data required for initialization to the base station,
    the data is transmitted using resources granted in a second step of the 4-step RACH procedure, and
    the NOMA communication is a first step of a 2-step RACH procedure in which the communication apparatus transmits each of a preamble and the data required for the initialization to the base station.

2. The communication apparatus according to claim 1, the circuitry is further configured to switch the one of the OMA communication or the NOMA communication based on time resources and frequency resources granted by the base station.

3. The communication apparatus according to claim 1, wherein the first information is conveyed as system information or RRC signaling.

4. The communication apparatus according to claim 1, wherein the circuitry is further configured to select the one of the OMA communication or the NOMA communication based on a position of a search space in which downlink control information existed.

5. The communication apparatus according to claim 1, wherein the circuitry is further configured to select the one of the OMA communication or the NOMA communication based on a position of a resource allocated by the base station.

6. The communication apparatus according to claim 1, wherein the circuitry is further configured to select the one of the OMA communication or the NOMA communication based on one of:
   a communication system that involves grant-based transmission from the base station is in use, or
   a communication system that involves grant-free transmission from the base station is in use.

7. The communication apparatus according to claim 1, wherein the circuitry is further configured to select the one of the OMA communication or the NOMA communication based on a type of a channel associated with transmission from the base station.

8. The communication apparatus according to claim 1, wherein the circuitry is further configured to select the one of the OMA communication or the NOMA communication based on a type of a random access channel procedure associated with the transmission to the base station.

9. The communication apparatus according to claim 1, wherein the circuitry is further configured to control the wireless communication with the base station based on a communication system that involves grant-free transmission.

10. The communication apparatus according to claim 1, wherein the acquired first information is transmitted by the base station based on a number, of terminals accommodated in a cell of the base station, that is equal to or greater than a terminal count.

11. The communication apparatus according to claim 1, wherein the acquired first information is transmitted by the base station based on a number, of terminals accommodated in a beam emitted by the base station, that is equal to or greater than a terminal count.

12. The communication apparatus according to claim 1, wherein
    the acquired first information includes information that corresponds to switch from the NOMA communication to the OMA communication, and
    the acquired first information is transmitted by the base station in a case where the base station is unable to receive the data by the NOMA communication.

13. The communication apparatus according to claim 1, wherein the acquired first information indicates whether the NOMA communication is supported.

14. A communication method, comprising:
    acquiring first information from a base station via wireless communication;
    acquiring second information, wherein the second information is different from the first information; and
    selecting one of orthogonal multiple access (OMA) communication or non-orthogonal multiple access (NOMA) communication for communication with the base station, wherein
        the selection of the one of the OMA communication or the NOMA communication is based on each of the acquired first information and the acquired second information,
        the acquired second information implicitly designates the one of the OMA communication or the NOMA communication,
        the acquired second information includes information indicating a type of a slot associated with transmission to the base station,
        the OMA communication is a third step of a 4-step RACH procedure in which a communication apparatus transmits data required for initialization to the base station,
        the data is transmitted using resources granted in a second step of the 4-step RACH procedure, and
        the NOMA communication is a first step of a 2-step RACH procedure in which the communication apparatus transmits each of a preamble and the data required for the initialization to the base station.

15. A non-transitory computer-readable medium having stored thereon, computer-executable instructions which, when executed by a computer, cause the computer to execute operations, the operations comprising:
    acquiring first information from a base station via wireless communication;
    acquiring second information, wherein the second information is different from the first information; and
    selecting one of orthogonal multiple access (OMA) communication or non-orthogonal multiple access (NOMA) communication for communication with the base station, wherein
        the selection of the one of the OMA communication or the NOMA communication is based on each of the acquired first information and the acquired second information,
        the acquired second information implicitly designates the one of the OMA communication or the NOMA communication,
        the acquired second information includes information indicating a type of a slot associated with transmission to the base station,
        the OMA communication is a third step of a 4-step RACH procedure in which a communication apparatus transmits data required for initialization to the base station,
        the data is transmitted using resources granted in a second step of the 4-step RACH procedure, and
        the NOMA communication is a first step of a 2-step RACH procedure in which the communication apparatus transmits each of a preamble and the data required for the initialization to the base station.

16. A communication apparatus, comprising:
    circuitry configured to:
        acquire first information from a base station via wireless communication, wherein the first information is acquired based on a number, of terminals accommodated in a cell of the base station, that is equal to or greater than a terminal count; and
        select, based on the acquired first information, one of orthogonal multiple access (OMA) communication or non-orthogonal multiple access (NOMA) communication for communication with the base station, wherein the OMA communication is a third step of a 4-step RACH procedure in which the communication apparatus transmits data required for initialization to the base station, the data is transmitted using resources granted in a second step of the 4-step RACH procedure, and the NOMA communication is a first step of a 2-step RACH procedure in which the communication apparatus transmits each of a preamble and the data required for the initialization to the base station.

* * * * *